United States Patent
De Toro et al.

(10) Patent No.: US 9,547,093 B2
(45) Date of Patent: Jan. 17, 2017

(54) RADIATION CAMERA SYSTEM AND METHOD

(71) Applicant: Canberra France SAS, Saint Quentin en Yvelines (FR)

(72) Inventors: Daniel De Toro, Cassagnes (FR); Nabil Menaa, Nanterre (FR); Roger Abou-Khalil, Paris (FR); Philippe Talent, Saint Quentin en Yvelines (FR); Florent Bonnet, Tours (FR); Audrey Patoz, Beaulieu les Loches (FR); Christian Duloisy, Saint Quentin en Yvelines (FR); Khalil Amgarou, Saint Quentin en Yvelines (FR)

(73) Assignee: CANBERRA FRANCE SAS, Saint Quentin en Yvelines (FR)

( * ) Notice: Subject to any disclaimer, the term of this patent is extended or adjusted under 35 U.S.C. 154(b) by 0 days.

(21) Appl. No.: 14/547,990

(22) Filed: Nov. 19, 2014

(65) Prior Publication Data
US 2015/0338533 A1 Nov. 26, 2015

(30) Foreign Application Priority Data
May 26, 2014 (FR) .................................. 14 01205

(51) Int. Cl.
*G01J 1/42* (2006.01)
*G01T 7/00* (2006.01)
(Continued)

(52) U.S. Cl.
CPC .............. *G01T 7/00* (2013.01); *G01T 1/2978* (2013.01); *H04N 5/225* (2013.01)

(58) Field of Classification Search
CPC .............. G01J 9/00; G01J 1/4228; G01J 3/02; G01J 3/2803; G01J 3/36
See application file for complete search history.

(56) References Cited

U.S. PATENT DOCUMENTS 4,595,014 A 6/1986 Barrett et al.
5,163,521 A * 11/1992 Pustanyk .................. E21B 7/04
175/107
(Continued)

OTHER PUBLICATIONS

P.T. Durrant et al., "The application of pinhole and coded aperture imaging in the nuclear environment," Nuclear Instruments & Methods in Physics Research, Section A: Accelerators, Spectrometers, Detectors, and Associated Equipment, Elsevier BV *North-Holland, NL, vol. 422, No. 1-3, Feb. 11, 1999, pp. 667-671, XP004161916 ISSN: 0168-9002, DOI: 10.1016/S0168-9002 (98) 01014-6 *p. 668, col. 1, lines 34-37.
(Continued)

*Primary Examiner* — David Porta
*Assistant Examiner* — Mamadou Faye
(74) *Attorney, Agent, or Firm* — Kevin M. Klughart; David W. Carstens; Carstens & Cahoon, LLP

(57) ABSTRACT

A radiation camera system and method incorporating a radiation sensor/detector (RSD) and automated operation of coded camera aperture masks (CAMs) is disclosed that may be advantageously applied to real-time tracking of radiological hot spots in crisis, maintenance, decontamination, and/or maintenance scenarios. The system/method integrates automated camera RSD positioning, CAM identification, and CAM rotation. The system incorporates computerized controls in conjunction with remotely controlled horizontal/vertical tilting motors to direct the RSD aperture position and view of the RSD. CAMs may be installed in the camera manually and are automatically identified by the system via the use of encoding magnets that are detected using a Hall-effect sensor. The CAMs may be rotated after installation in the camera by computer control to predefined positions such as "mask" and "anti-mask" to affect the desired degree of radiation screening to be applied to the RSD.

60 Claims, 64 Drawing Sheets

(51) Int. Cl.
   *G01T 1/29* (2006.01)
   *H04N 5/225* (2006.01)

(56) References Cited

U.S. PATENT DOCUMENTS

| | | | | |
|---|---|---|---|---|
| 5,461,657 A | * | 10/1995 | Hayashida | G03F 7/70058 378/145 |
| 5,557,107 A | * | 9/1996 | Carcreff | G01T 1/1648 250/361 R |
| 5,606,165 A | * | 2/1997 | Chiou | G01T 1/167 250/363.06 |
| 6,249,311 B1 | * | 6/2001 | Rouse, Jr. | H04N 5/23209 348/164 |
| 6,815,687 B1 | * | 11/2004 | Branch-Sullivan | H01L 27/14658 250/330 |
| 7,391,028 B1 | * | 6/2008 | Rubenstein | G01T 1/11 250/370.08 |
| 2002/0075990 A1 | * | 6/2002 | Lanza | G01T 1/295 378/2 |
| 2004/0041941 A1 | * | 3/2004 | Takeshita | H04N 9/735 348/371 |
| 2006/0108509 A1 | | 5/2006 | Frangioni et al. | |
| 2008/0128625 A1 | * | 6/2008 | Lamadie | G01T 1/295 250/361 R |
| 2008/0135767 A1 | * | 6/2008 | Le Goaller | G01T 7/00 250/363.02 |
| 2009/0078881 A1 | * | 3/2009 | Dangendorf | G01T 1/201 250/390.11 |
| 2012/0328071 A1 | * | 12/2012 | Katsumata | A61B 6/14 378/4 |
| 2013/0094627 A1 | * | 4/2013 | Lalleman | G01V 5/0016 378/87 |
| 2014/0208800 A1 | * | 7/2014 | McCann | C03B 5/2356 65/29.18 |
| 2014/0267879 A1 | * | 9/2014 | Loukusa | G03B 17/18 348/345 |

OTHER PUBLICATIONS

Amgarou Khalil et al., "Evaluation of the next generation gamma imager," 2013 3rd International Conference on Advancements in Nuclear Instrumentation, Measurement Methods and Their Applications (ANIMMA), ieee, Jun. 23, 2013, pp. 1-6, XP032560838, DOI: 10.1109/ANIMMA.2013.6728051 [retrieved on Jan. 29, 2014] *figure 2*, *p. 2, col. 2, lines 1-6.
Extended European Search Report for European Application No. 15162056.4 dated Nov. 10, 2015.

* cited by examiner

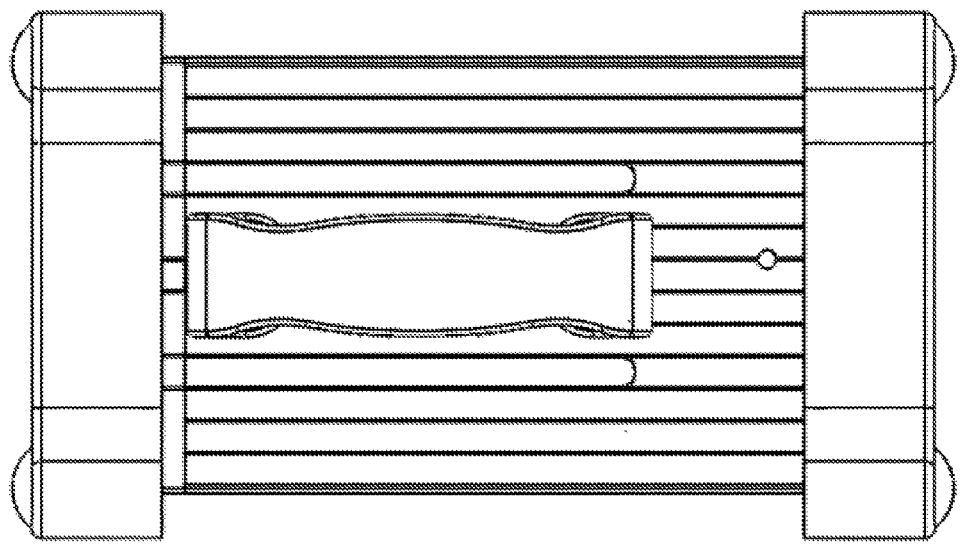
FIG. 3
0300

1100

1500

FIG. 17
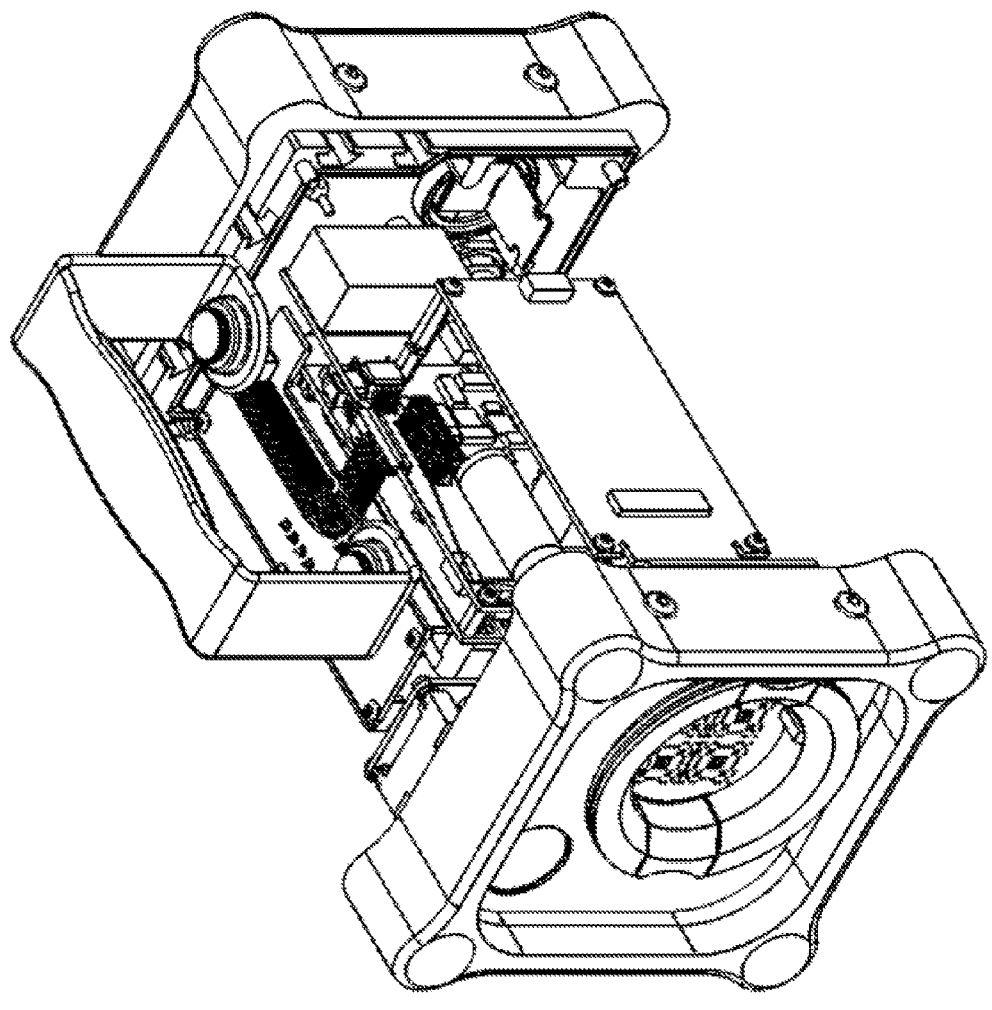
1700

2400

FIG. 26
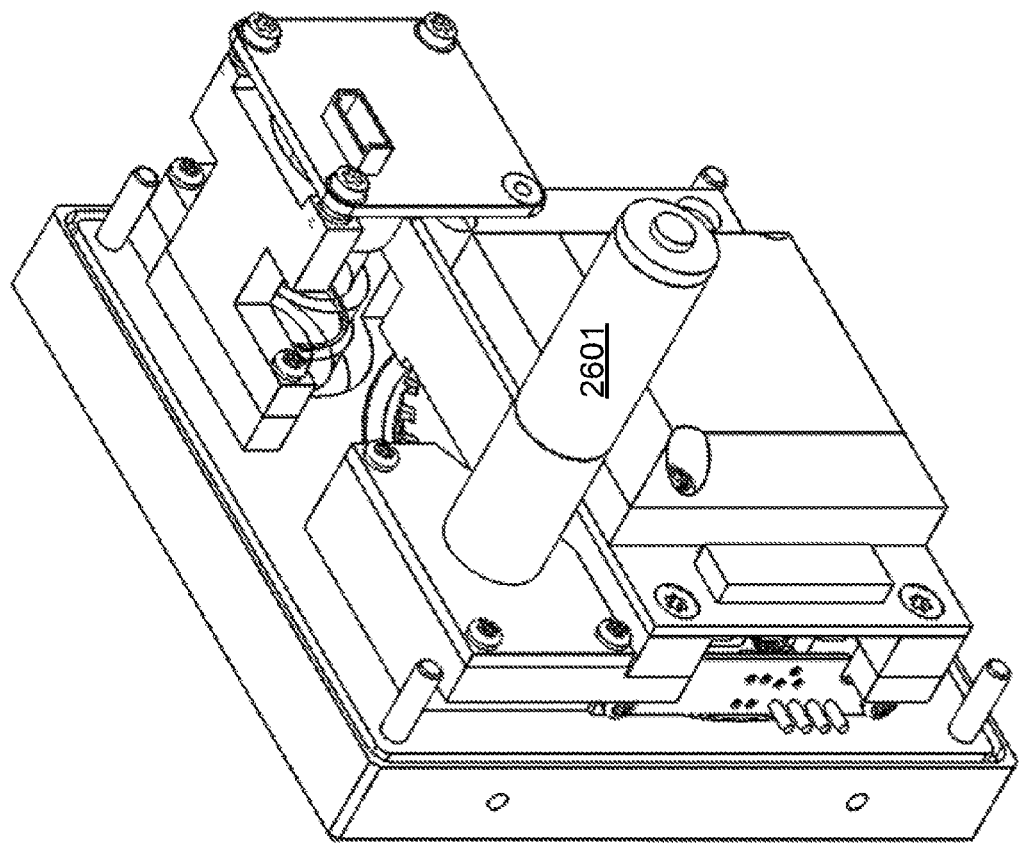

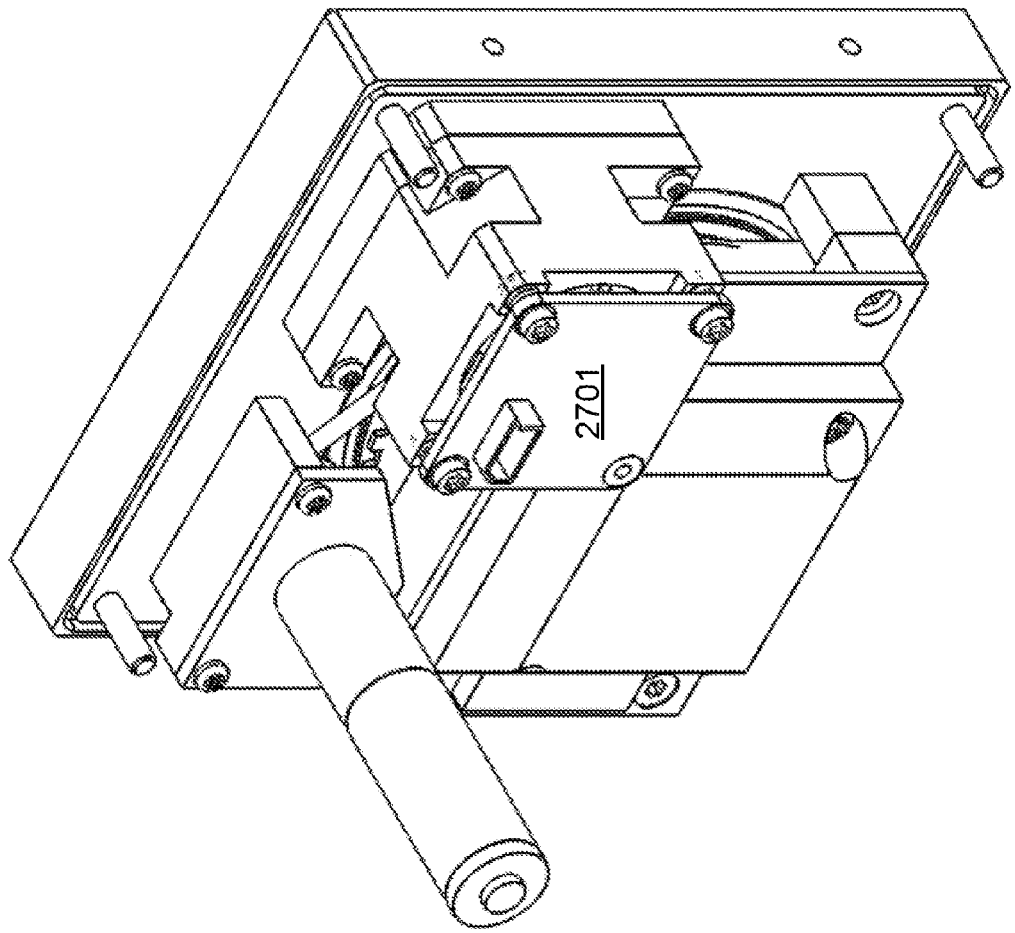
FIG. 27

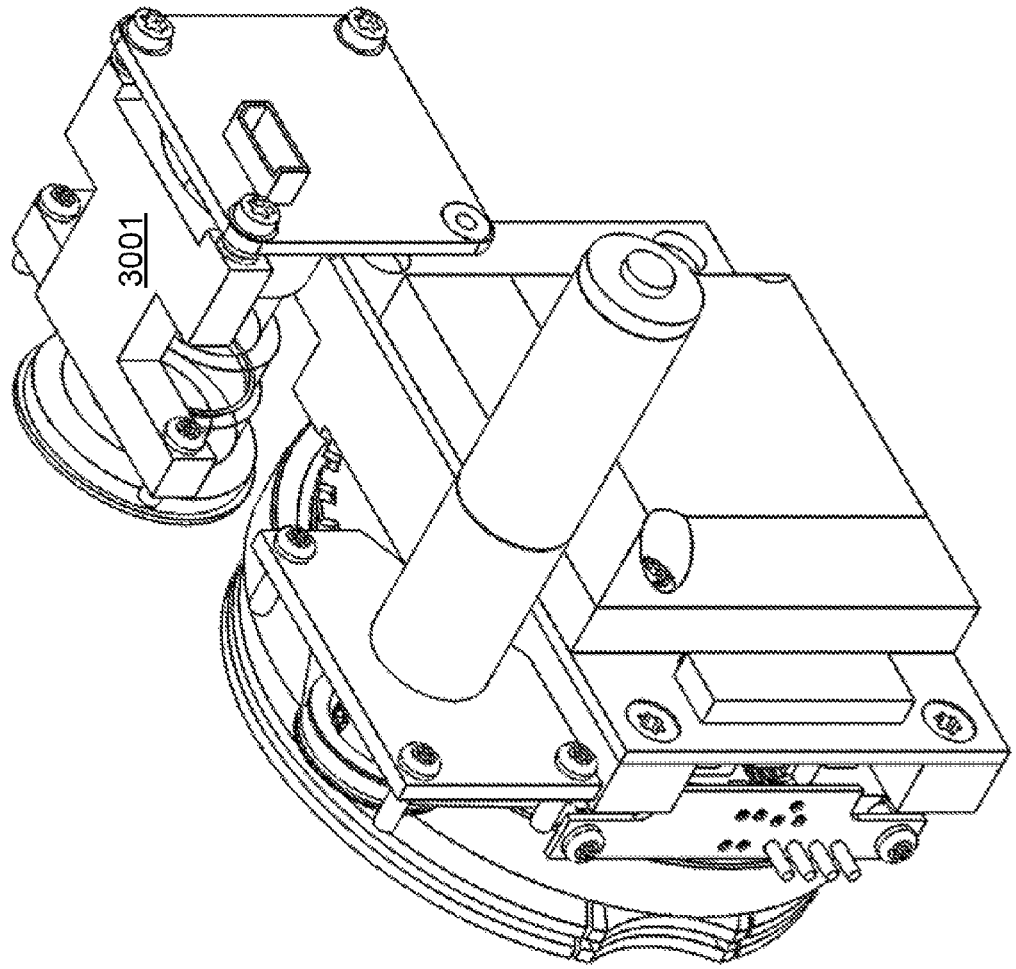
FIG. 30

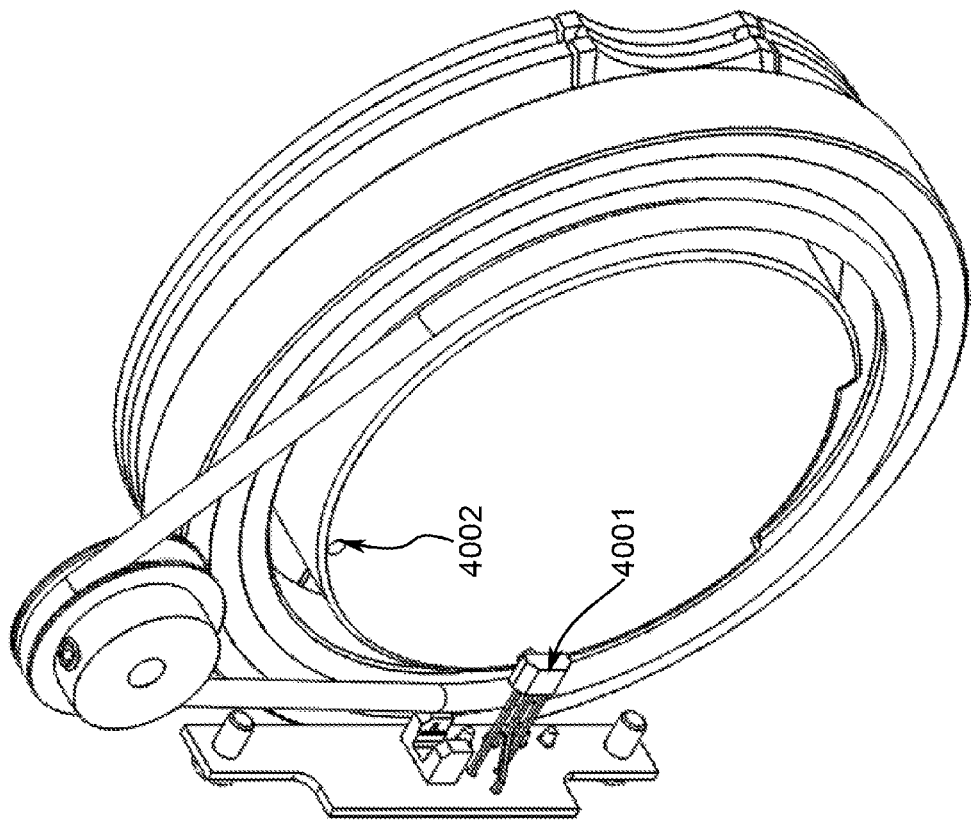
FIG. 40

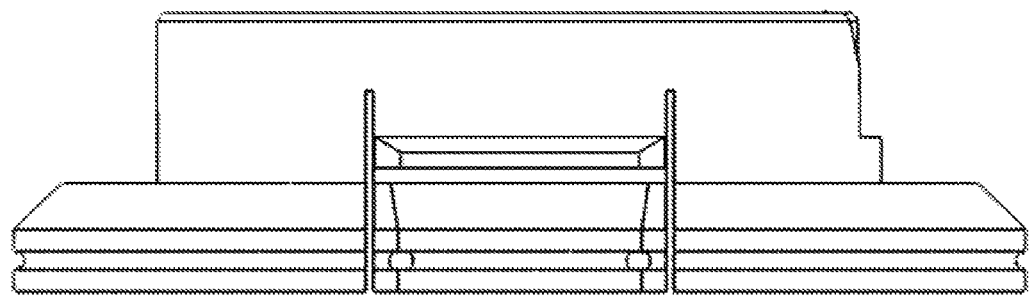
FIG. 45

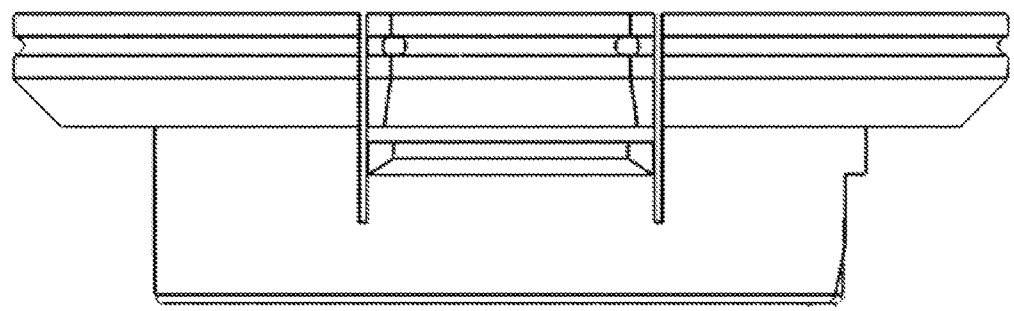
FIG. 46

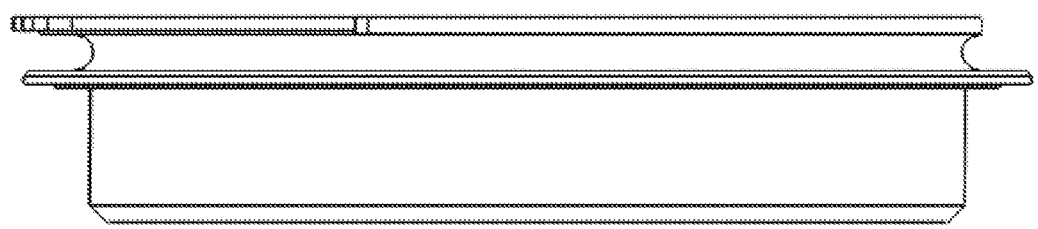
FIG. 53

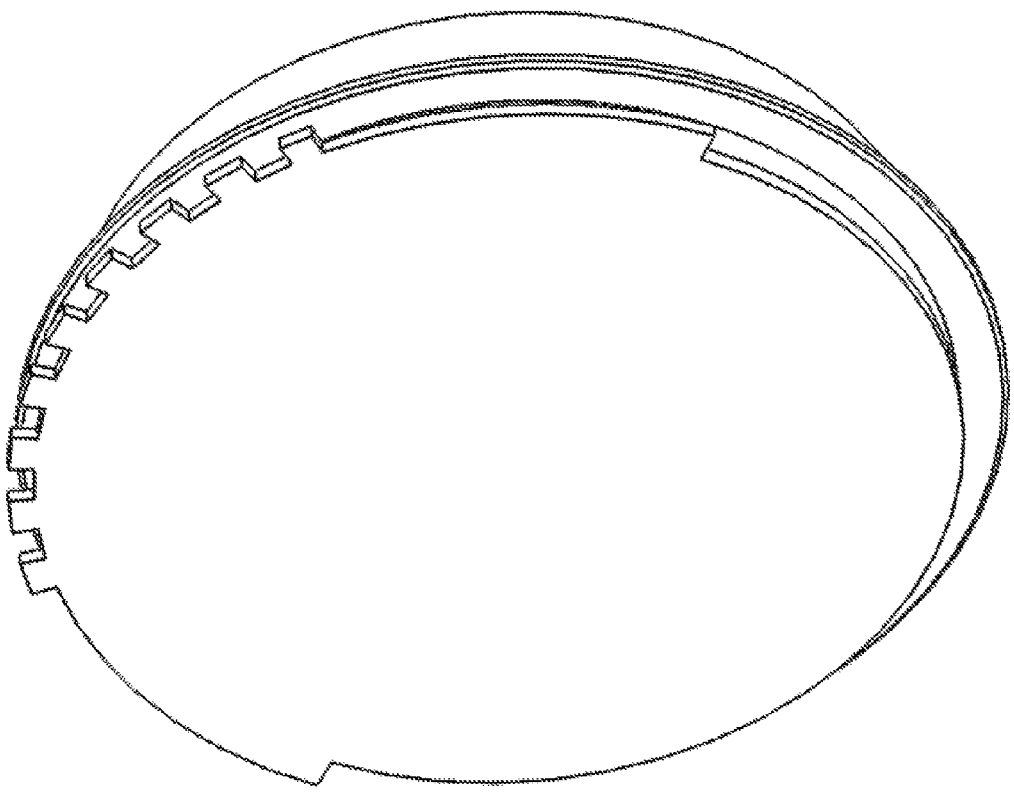
FIG. 56

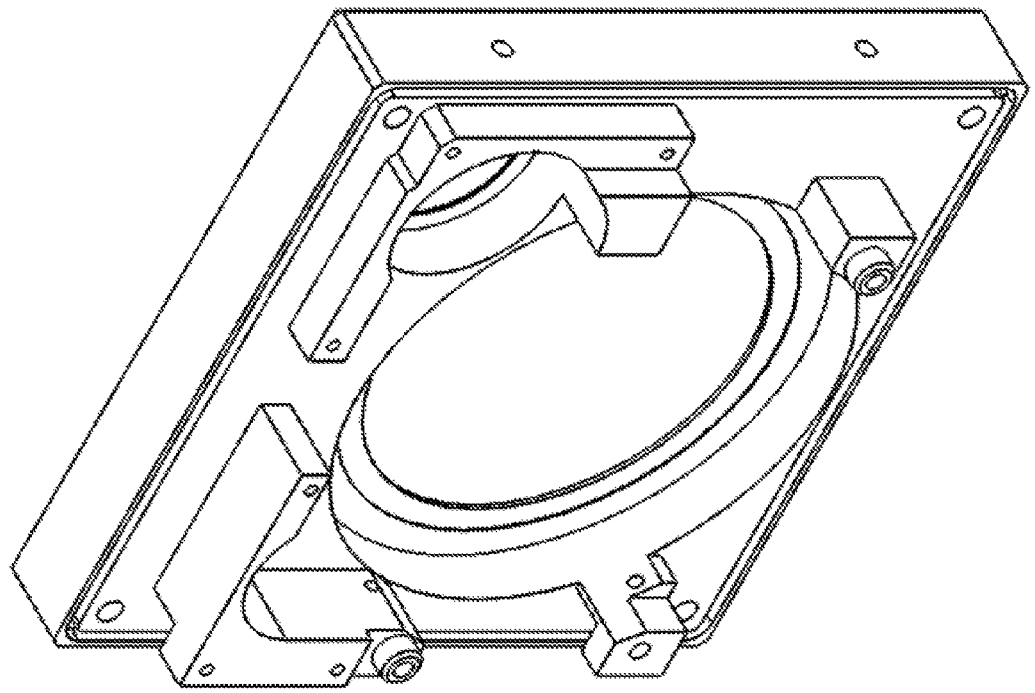
FIG. 60

RADIATION CAMERA SYSTEM AND METHOD

CROSS REFERENCE TO RELATED APPLICATIONS

This application claims benefit under 35 U.S.C. §120 and incorporates by reference French Patent Application for RADIATION CAMERA SYSTEM AND METHOD (Systeme et procédé de camera pour radiations) by applicant Canberra France SAS and inventors Daniel (nmn) DE TORO, Nabil (nmn) MENAA, Roger (nmn) ABOU-KHALIL, Philippe (nmn) TALENT, Florent (nmn) BONNET, Audrey (nmn) PATOZ, Christian (nmn) DULOISY, and Khalil (nmn) AMGAROU, filed electronically with the French patent office on May 26, 2014, with serial number 14/01205.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for detecting radiation, and without limitation, systems and methods configured to detect gamma radiation in crisis management, maintenance, decontamination, and decommissioning scenarios. Without limiting the scope of the present invention, the general field of invention scope may fall into one or more U.S. patent classifications including: 250/363.02; 250/252.1; 250/363.09; 250/369; 600/436; 250/363.01; 250/363.02; 250/363.1; 600/1; 600/2; 600/3; and 600/407.

PRIOR ART AND BACKGROUND OF THE INVENTION

Prior Art System Context

Real-time tracking of radioactive hotspots is of prime concern in the context of national security regarding the crisis management of radiological emergency situations such as terrorist attacks and maintenance of border security. The need for real-time radiological imaging is also of great importance in nuclear facilities such as nuclear power plants or high-energy research accelerators, especially at the end of their life-cycle where the operational radiological protection is permanently needed during the different tasks of maintenance, decontamination, and decommissioning.

Deficiencies in the Prior Art

The prior art as detailed above suffers from the following deficiencies:
  Prior art radiation camera systems and methods typically involve excessive manual operations during the setup phase of camera operation.
  Prior art radiation camera systems and methods typically involve excessive manual operations during the measurement phase of camera operation.
  Prior art radiation camera systems and methods do not permit panoramic scanning of target areas for large volume radiation measurements.
  Prior art radiation camera systems and methods do not permit horizontal panning (azimuthal rotation) of the camera.
  Prior art radiation camera systems and methods do not permit vertical tilting of the camera.
  Prior art radiation camera systems and methods do not permit automated detection of camera aperture masks applied to the camera.
  Prior art radiation camera systems and methods do not permit automated rotational orientation of camera aperture masks applied to the camera.
  Prior art radiation camera systems and methods do not permit automated identification of camera aperture masks applied to the camera.
  Prior art radiation camera systems and methods do not permit measurement traceability for data collected by the camera.

While some of the prior art may teach some solutions to several of these problems, the core issue of remote radiation camera control with automated operation of radiation detection masking has not been solved by the prior art.

OBJECTIVES OF THE INVENTION

Accordingly, the objectives of the present invention are (among others) to circumvent the deficiencies in the prior art and affect the following objectives in the context of a radiation camera system and method:
  (1) Provide for a radiation camera system and method that reduces manual operations during the setup phase of camera operation.
  (2) Provide for a radiation camera system and method that reduces manual operations during the measurement phase of camera operation.
  (3) Provide for a radiation camera system and method that permits panoramic scanning of target areas for large volume radiation measurements.
  (4) Provide for a radiation camera system and method that permits horizontal panning of the camera.
  (5) Provide for a radiation camera system and method that permits vertical tilting of the camera.
  (6) Provide for a radiation camera system and method that permits automated detection of camera aperture masks applied to the camera.
  (7) Provide for a radiation camera system and method that permits automated rotational orientation of camera aperture masks applied to the camera.
  (8) Provide for a radiation camera system and method that permits automated identification of camera aperture masks applied to the camera.

(9) Provide for a radiation camera system and method that permits enhanced operator safety when installing and operating the camera.

(10) Provide for a radiation camera system and method that permits measurement traceability for data collected by the camera.

While these objectives should not be understood to limit the teachings of the present invention, in general these objectives are achieved in part, or in whole, by the disclosed invention that is discussed in the following sections. One skilled in the art will no doubt be able to select aspects of the present invention as disclosed to affect any combination of the objectives described above.

BRIEF SUMMARY OF THE INVENTION

The present invention encompasses a lightweight radiation camera system that provides for a modular system for automated application of coded camera aperture masks (CAMs) during the radiation imaging process. The system generally comprises the following elements:
- (a) radiation sensor/detector (RSD);
- (b) coded camera aperture mask (CAM);
- (c) mask rotation motor (MRM);
- (d) rotation detection sensor (RDS);
- (e) radiation camera enclosure (RCE); and
- (f) computing control device (CCD).

The RCE is configured to mechanically couple the RSD, the CAM, the MRM, the RDS, and the CCD in a portable housing. The CAM is configured to cover the RSD (typically constructed as a gamma ray image sensor) and collimate (or in some embodiments filter the amount of) radiation external to the RCE that is presented to the RSD. The MRM is configured to rotate the CAM under direction of the CCD and thus permit the CAM to modify the radiation levels impinging on the RSD.

The CAM further comprises coded identification indicia (CII) to uniquely identify the CAM and provide information on the type of aperture mask being applied to the RSD. The CAM further comprises a plurality of rotation indicia that identify the current rotation angle of the CAM. These may take a variety of forms and are generally inspected using an RDS optical sensor as the CAM rotates. The RDS is configured to detect the rotation indicia and thus permit the CCD to have knowledge of the rotation angle of the CAM.

The CCD is configured to capture detected radiation data from the RSD and transmit the detected radiation data via a digital communications medium (DCM) to a host computer system (HCS). The CCD is also configured to receive rotation commands from the HCS via the DCM and operate the MRM in response to the rotation commands. This allows rotational positioning of the CAM via the HCS. The CCD is also configured to capture rotation data from the RDS and transmit the rotation data via the DCM to the HCS.

BRIEF DESCRIPTION OF THE DRAWINGS

For a fuller understanding of the advantages provided by the invention, reference should be made to the following detailed description together with the accompanying drawings wherein:

FIG. 3 illustrates a top view of a preferred exemplary system embodiment;

FIG. 17 illustrates a top right front perspective view of a preferred exemplary system embodiment depicting internal components and construction;

FIG. 26 illustrates a top right back perspective view of a preferred exemplary system embodiment depicting front panel assembly detail;

FIG. 27 illustrates a top left back perspective view of a preferred exemplary system embodiment depicting front panel assembly detail;

FIG. 30 illustrates a top right back perspective view of a preferred exemplary system embodiment depicting front panel assembly detail with the external front panel wall removed;

FIG. 40 illustrates a top left rear perspective view of a preferred exemplary system embodiment depicting front panel assembly detail of the CAM (with rear cover removed), rotation detection sensor (RDS), and coded identification indicia (CII) sensor and magnetic inserts for CAM identification;

FIG. 45 illustrates a right side view of a preferred exemplary modular plastic holder (MPH) used to retain a coded camera aperture mask (CAM);

FIG. 46 illustrates a left side view of a preferred exemplary modular plastic holder (MPH) used to retain a coded camera aperture mask (CAM);

FIG. 53 illustrates a side view of an exemplary integrated ball bearing support for the CAM within the MPH;

FIG. 56 illustrates a back left perspective view of an exemplary integrated ball bearing support for the CAM within the MPH;

FIG. 60 illustrates a rear perspective view of an exemplary camera front panel wall useful in some preferred invention embodiments;

DESCRIPTION OF THE PRESENTLY PREFERRED EXEMPLARY EMBODIMENTS

Figure 1:
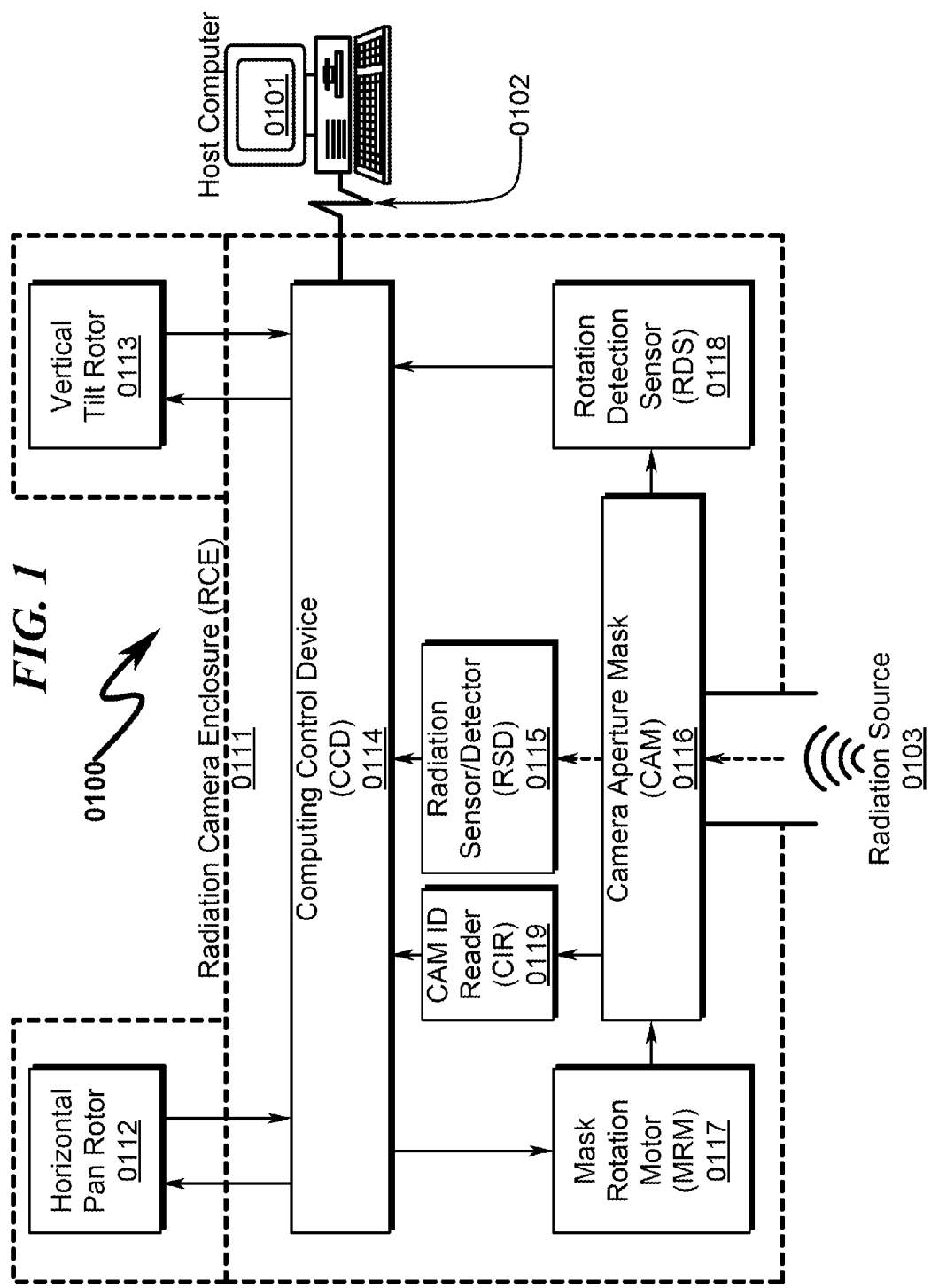
FIG. 1 illustrates a system block diagram depicting a preferred exemplary invention system embodiment.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RADIATION CAMERA SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

CAM Type Not Limitive

The present invention may incorporate a wide variety of camera aperture masks (CAMs) in the construction of the overall system. While examples illustrated herein include an aperture mask with rank 13 and 2 mm thickness, aperture mask with rank 7 and 4 mm thickness, and aperture mask with rank 7 and 8 mm thickness, the present invention is not limited to these particular CAM variations and may incorporate any type of CAM configuration.

Coded Identification Indicia (CII) Not Limitive

The present invention may incorporate a coded identification indicia (CII) within the camera aperture mask (CAM) structure to identify the type of aperture mask being installed in the camera. While a preferred methodology of performing this identification is discussed herein, the present invention makes no limitation on the specific type of CII technology that may be used to accomplish this function.

Rotation Indicia Not Limitive

The present invention may incorporate a plurality of rotation indicia within the camera aperture mask (CAM) structure to identify the current rotation angle of the CAM with respect to the overall camera system. While a preferred methodology of rotation angle determination is discussed herein, the present invention makes no limitation on the specific type of angle determination technology that may be used to accomplish this function.

Collimated CAM Not Limitive

The CAM is configured to cover the RSD (typically constructed as a gamma ray image sensor) and collimate (or in some embodiments filter the amount of) radiation external to the RCE that is presented to the RSD. Thus, the term "collimate" should be viewed broadly to include some situations in which the CAM includes a radiation filtering function.

Horizontal Panning/Vertical Tilting Not Limitive

The present invention may utilize motors to position the camera system in a coordinate system including provisions for horizontal panning (azimuthal positioning) and vertical tilting (altitude positioning). One skilled in the art will recognize that a wide variety of coordinate systems may be utilized to position the camera system and that these exemplary positioning systems are only exemplary of a wide variety of possibilities.

System Overview (0100) The present invention may be summarized as depicted in the application context system block diagram of FIG. 1 (0100). Here the system is configured to communicate with a host computer system (HCS) (0101) via a wired or wireless communication link (0102) and detect radiation from a radiation source (0103). The system as depicted is enclosed in a radiation camera enclosure (RCE) (0111) which may be optionally articulated via a horizontal pan rotor/motor (HPM) (0112) and/or a vertical tilting rotor/motor (VTM) (0113). The HPM (0112) and/or VTM (0113) may be controlled by a computing control device (CCD) (0114) as directed by the HCS (0101), or in some circumstances autonomously controlled by the CCD (0114) without direction from the HCS (0101).

The RCE (0111) mechanically integrates major components of the system that may include a computing control device (CCD) (0114) that communicates with the HCS (0101) and coordinates activity within the system. The CCD (0114) receives radiation imaging data from a radiation sensor/detector (RSD) (0115) that is screened by a coded camera aperture mask (CAM) (0116) that is mounted on the RCE (0111). The CAM (0116) may be rotated by a mask rotation motor (MRM) (0117) and contains rotation indicia that may be inspected by a rotation detection sensor (RDS) (0118) that senses the angle at which the CAM (0116) has been rotated by the MRM (0117). The MRM (0117) may be controlled by the CCD (0114) and the angular position of the CAM (0116) determined by the RDS (0118) may be read by the CCD (0114). Via communication with the HCS (0101), the CCD (0114) may activate the MRM (0117) to angularly position the CAM (0116) and verify this position by inspection of angular position readings from the RDS (0118).

The system is configured to permit a variety of CAM (0116) masking apertures to be affixed to the RCE (0111) for the purposes of radiation imaging operations by the RSD (0115). The CAM (0116) includes coded identification indicia (CII) that may be read by a CAM ID reader (CIR) (0119). The CII read from the CAM (0116) may be transmitted to the CCD (0114) via the CIR (0119) and communicated to the HCS (0101) via the wired/wireless communication link (0102). In this manner, the HCS (0101) may both determine the type of CAM (0116) installed in the radiation camera but also properly interpret the radiation imaging data retrieved from the RSD (0115) based on the angular rotation of the CAM (0116) based on activation of the MRM (0117) as determined by the RDS (0118).

The CAM (0116) masking apertures may be configured to support a variety of data collection modes including "masking" and "anti-masking" so that activation of the MRM (0117) may position each of these positional modes for radiation imaging operations. While these positions are typically orthogonal to each other, there may be situations in which these two positions may be at angles other than 90-degrees from each other.

Method Overview (0200)

Figure 2:
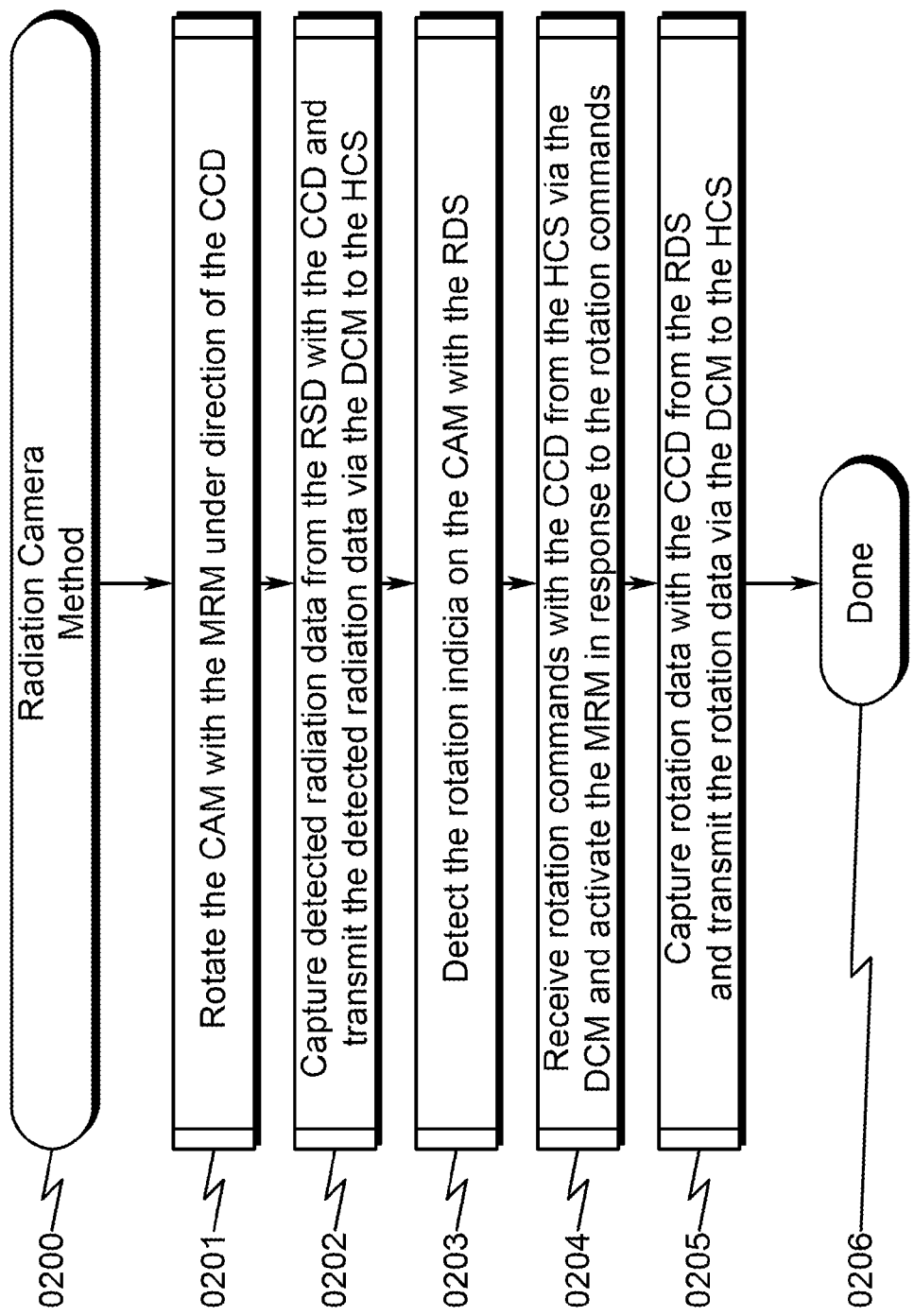
FIG. 2 illustrates a flowchart depicting a preferred exemplary invention method embodiment.
Figure 4:
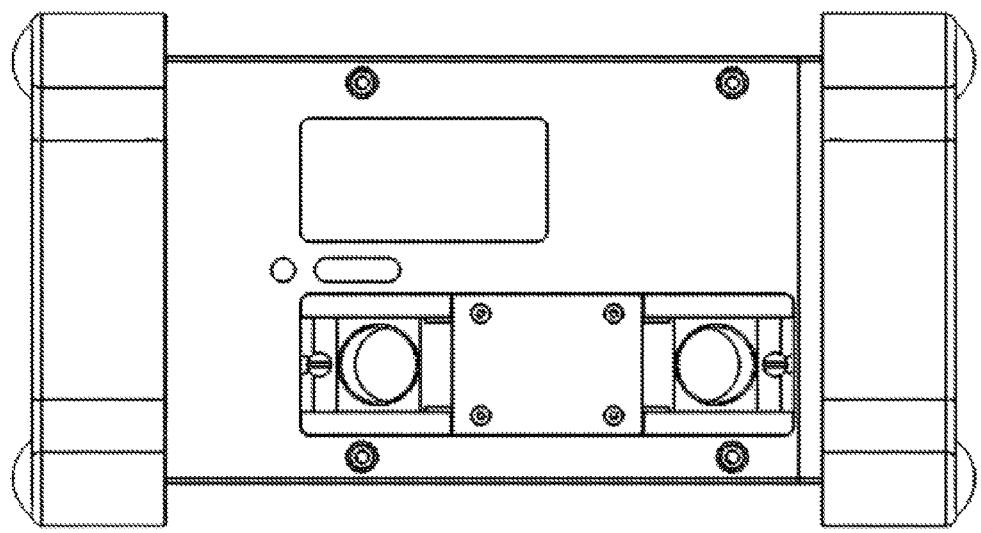
FIG. 4 illustrates a bottom view of a preferred exemplary system embodiment.

Associated with the exemplary system overview described in FIG. 1 (0100) is a radiation camera method as depicted in FIG. 2 (0200) that comprises the following steps:
(1) rotating the CAM with the MRM under direction of the CCD (0201);
(2) capturing detected radiation data from the RSD with the CCD and transmitting the detected radiation data via the DCM to the HCS (0202);
(3) detecting the rotation indicia on the CAM with the RDS (0203);
(4) receiving rotation commands with the CCD from the HCS via the DCM and activating the MRM in response to the rotation commands (0204); and
(5) capturing rotation data with the CCD from the RDS and transmitting the rotation data via the DCM to the HCS (0205).

One skilled in the art will recognize that these method steps may be augmented or rearranged without limiting the teachings of the present invention. This general method summary may be augmented by the various elements described herein to produce a wide variety of invention embodiments consistent with this overall design description.

RSD and Photo Camera Integration

In some preferred invention embodiments, the radiation sensor/detector (RSD) may be integrated in a CMOS integrated circuit. This CMOS integrated circuit may also incorporate in some preferred embodiments a photo camera imaging sensor (CIS) that is sensitive to ambient light. This combination permits both radiation sensor imaging information and visual light imaging information to be simultaneously collected and transmitted by the computing control device (CCD) to a host computer system (HCS) via wired or wireless digital communication medium (DCM). In some other preferred invention embodiments, a separate CIS may be utilized to capture the scene associated with the RSD imaging measurement. In either example, the CIS data may be forwarded to the CCD and onto the HCS for viewing and archival purposes.

Typical System Construction (0300)-(2400)

Figure 24:
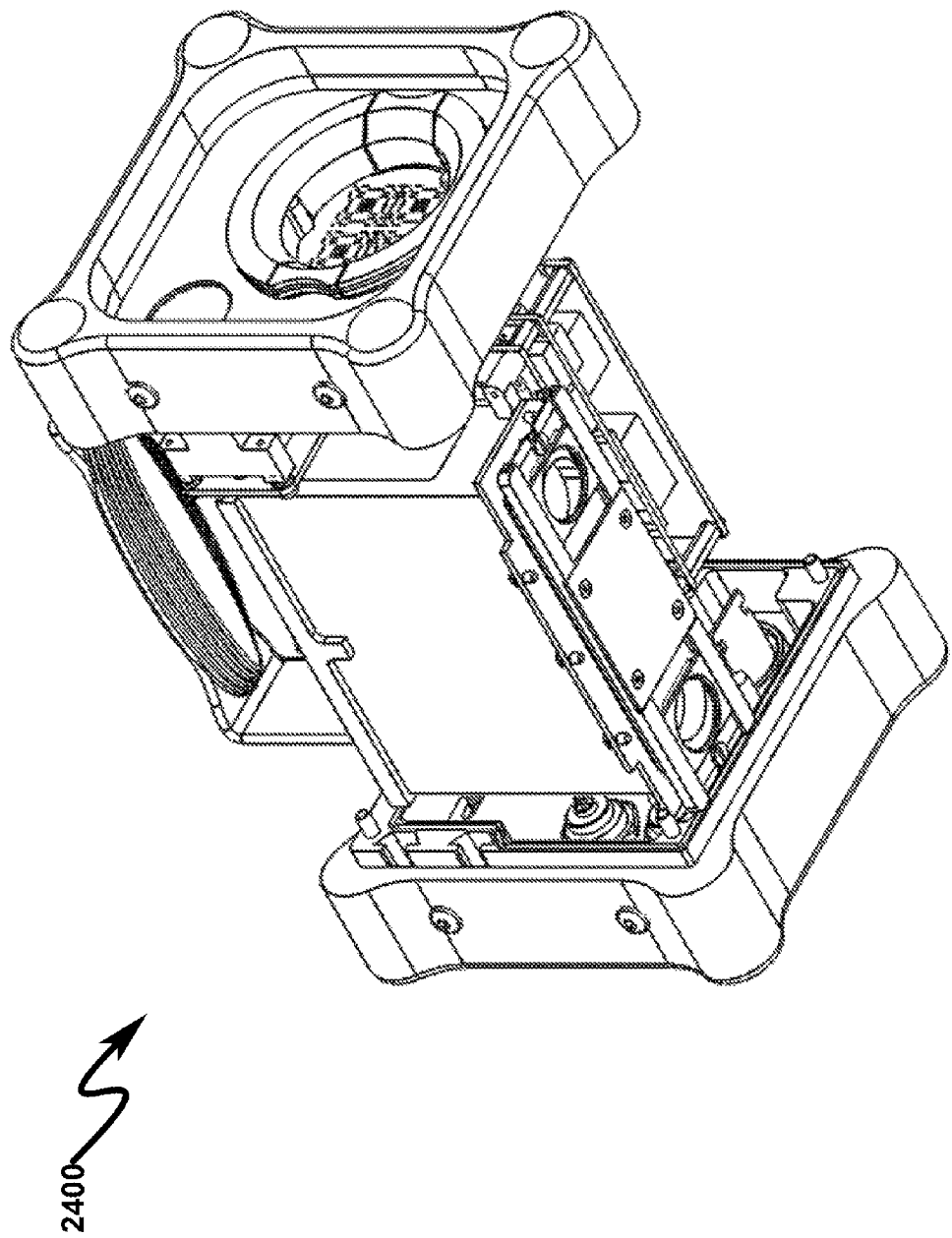
FIG. 24 illustrates a bottom left front perspective view of a preferred exemplary system embodiment depicting internal components and construction.

As generally depicted in the typical system construction views of FIG. 3 (0300)-FIG. 24 (2400), the present invention is designed to be compact (with some preferred embodiments less than 9×9×17 cm), lightweight (with some preferred embodiments less than 2.3 kg), water-proof, and dust-proof. The system as depicted is generally protected against unpredictable vibrations, shocks, and inadvertent dropping. The exemplary embodiment as depicted is easy to clean (especially in the cases of unwanted radioactive contamination) and incorporates a microcontroller (CCD) board and associated hardware electronics (CPU unit, internal memory, clock generator, flash disk, and several I/O peripherals), and embedded software stored on a computer readable medium.

Figure 5:
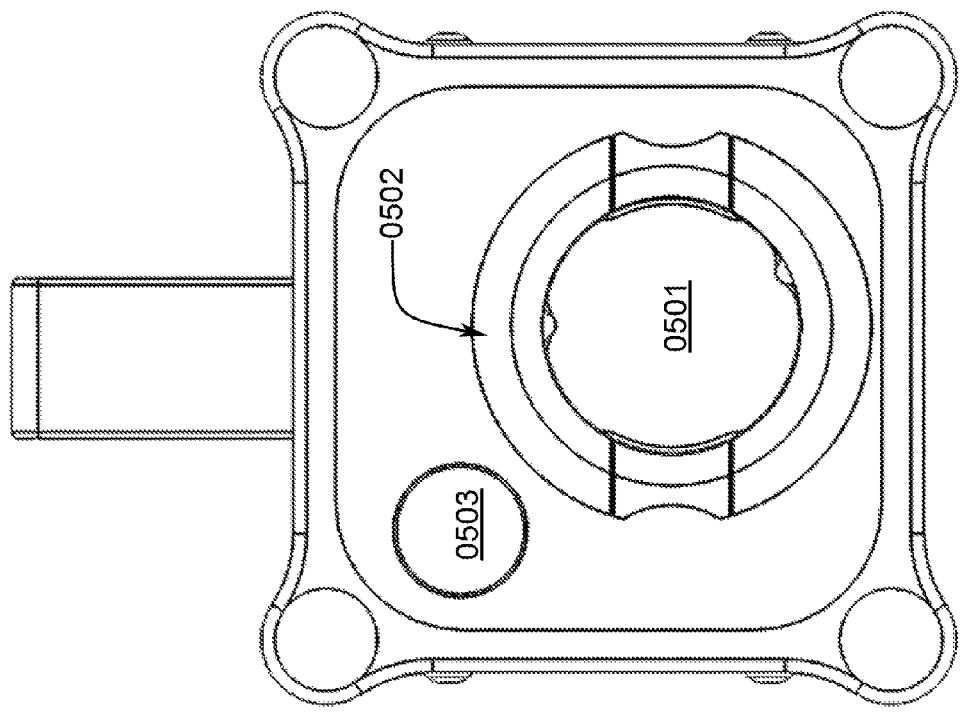
FIG. 5 illustrates a front view of a preferred exemplary system embodiment.
Figure 8:
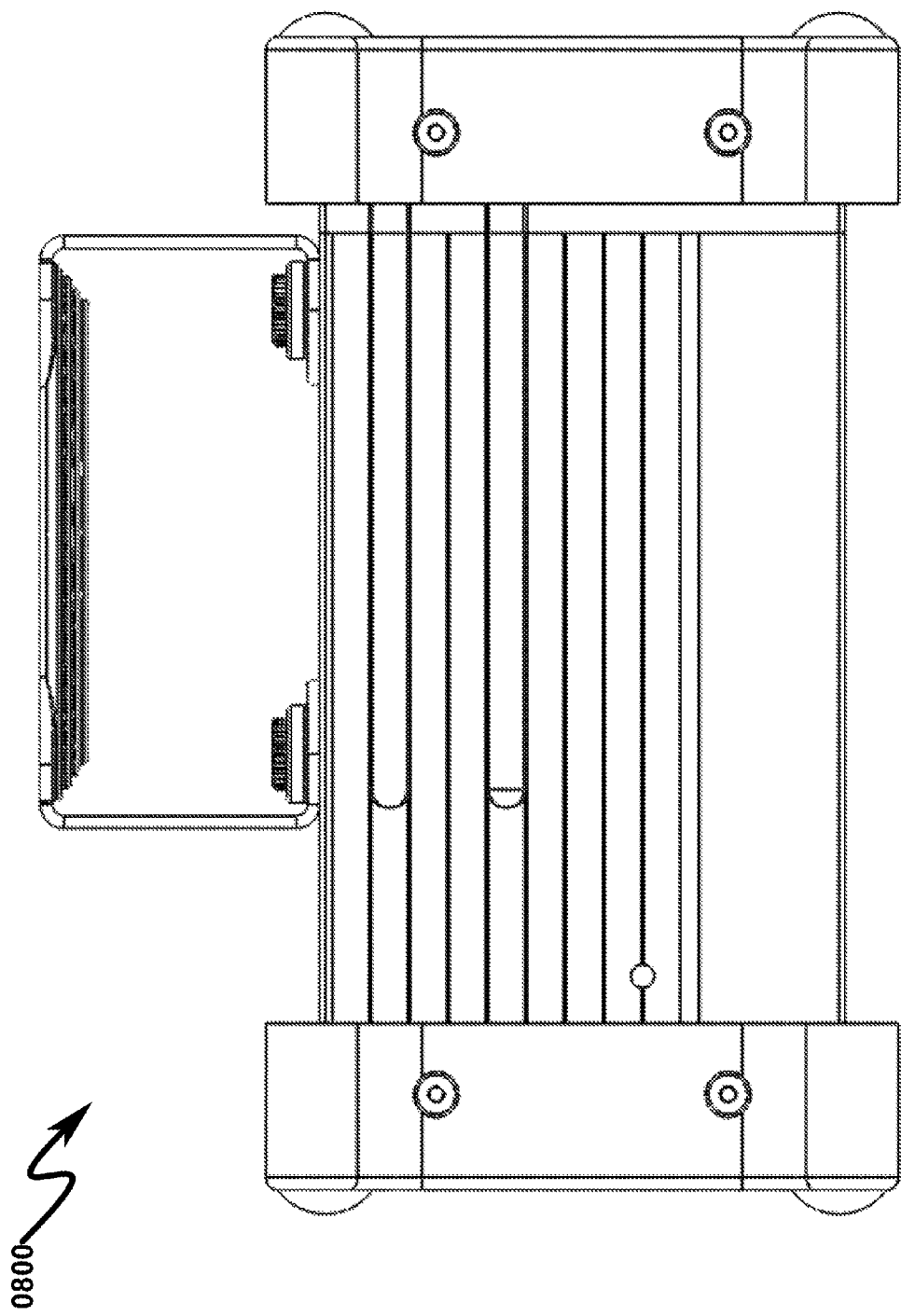
FIG. 8 illustrates a left side view of a preferred exemplary system embodiment.
Figure 9:
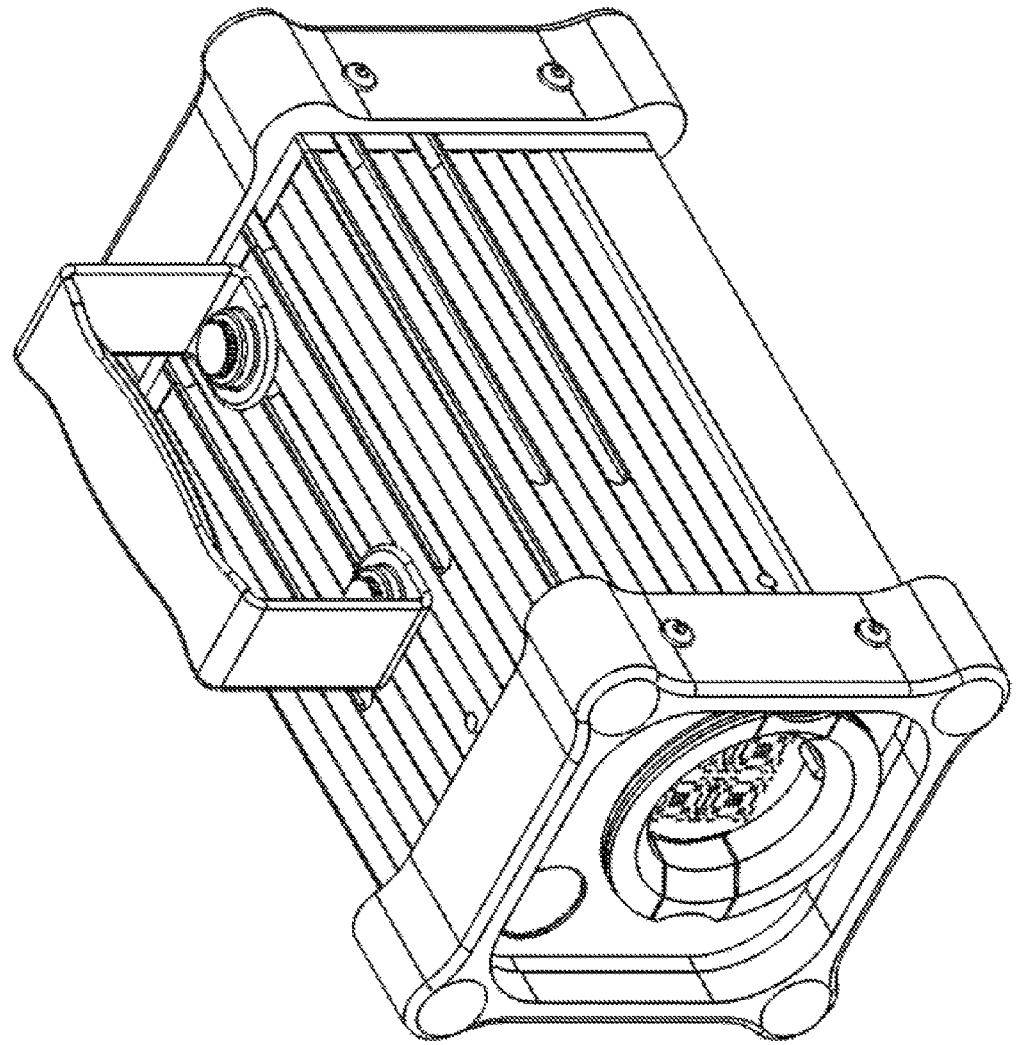
FIG. 9 illustrates a top right front perspective view of a preferred exemplary system embodiment.
Figure 10:
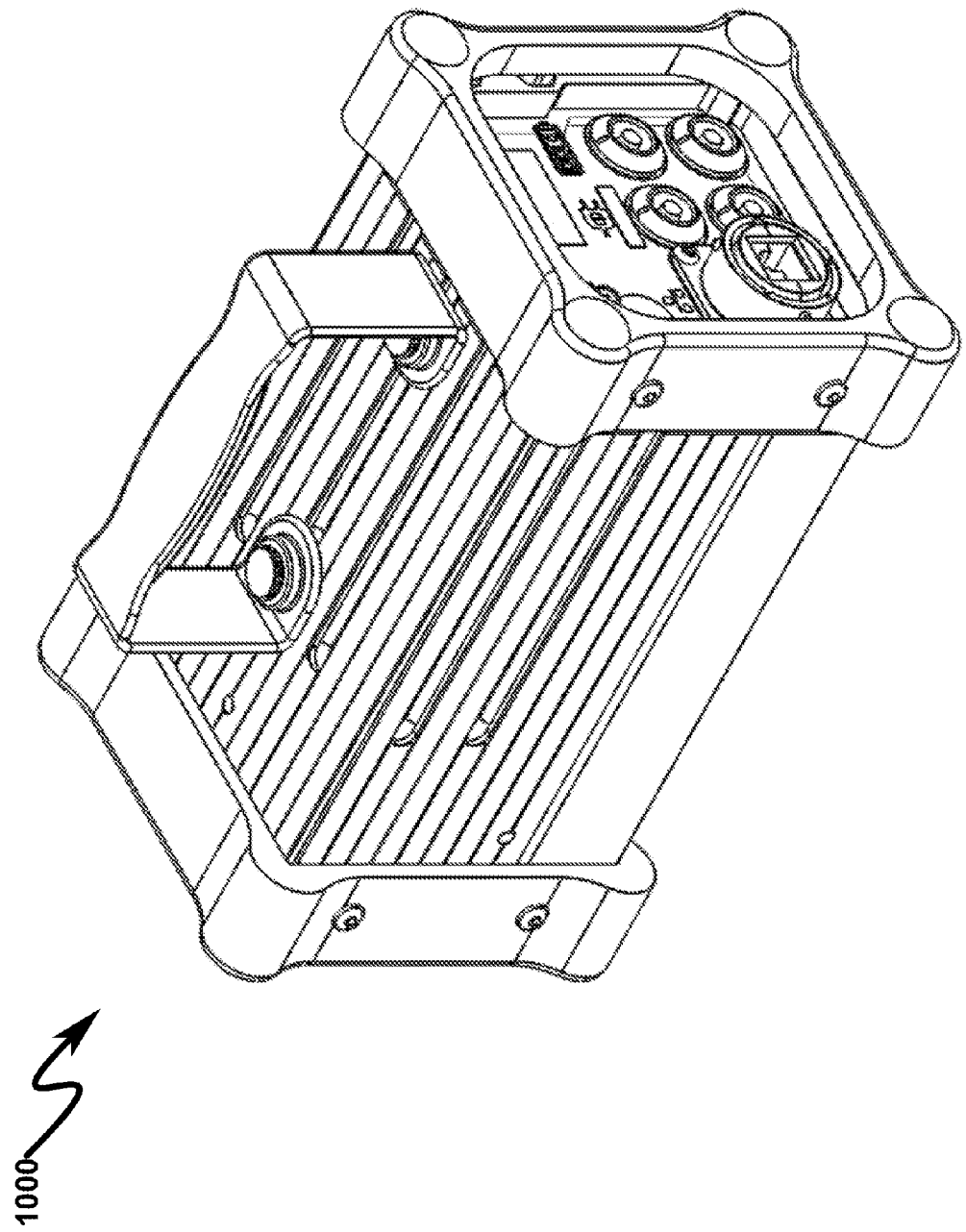
FIG. 10 illustrates a top right back perspective view of a preferred exemplary system embodiment.
Figure 11:
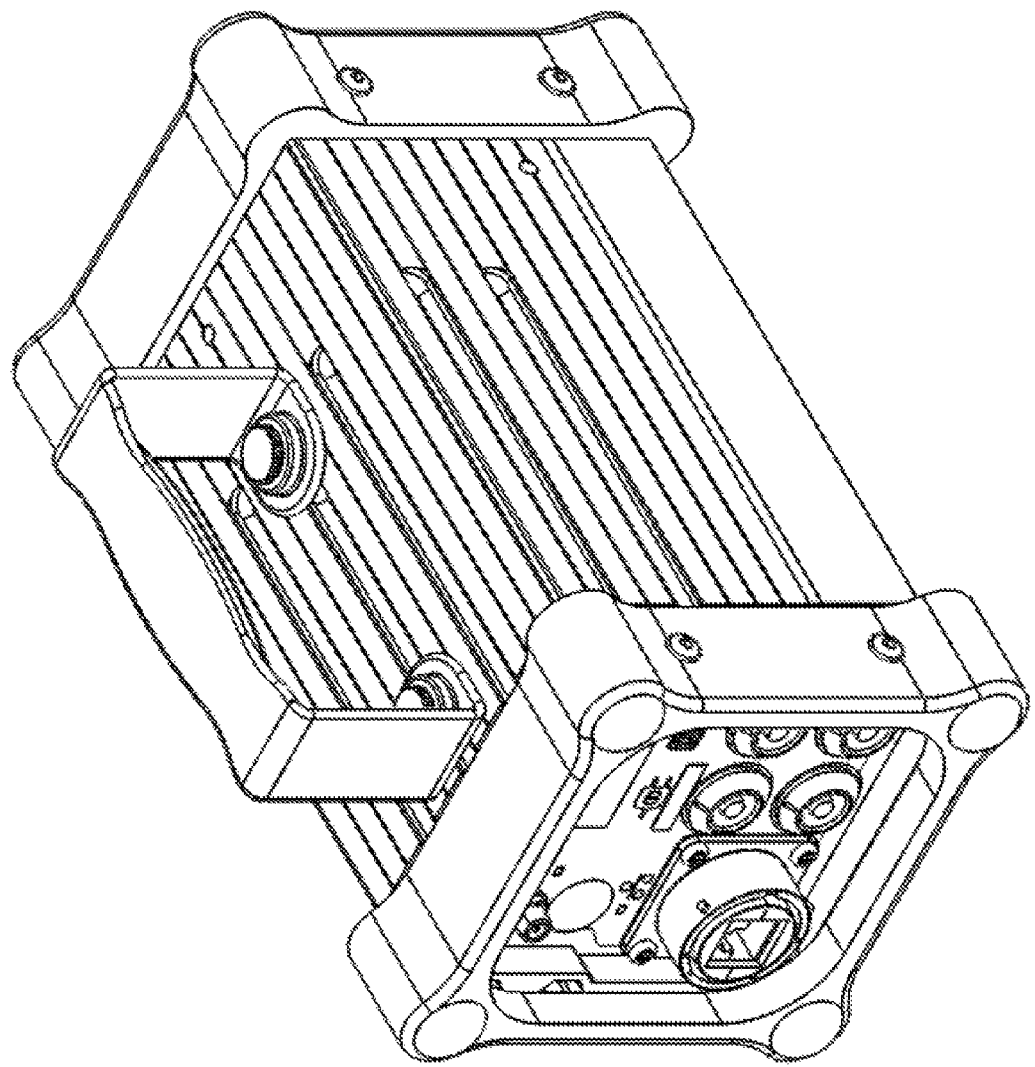
FIG. 11 illustrates a top left back perspective view of a preferred exemplary system embodiment.
Figure 12:
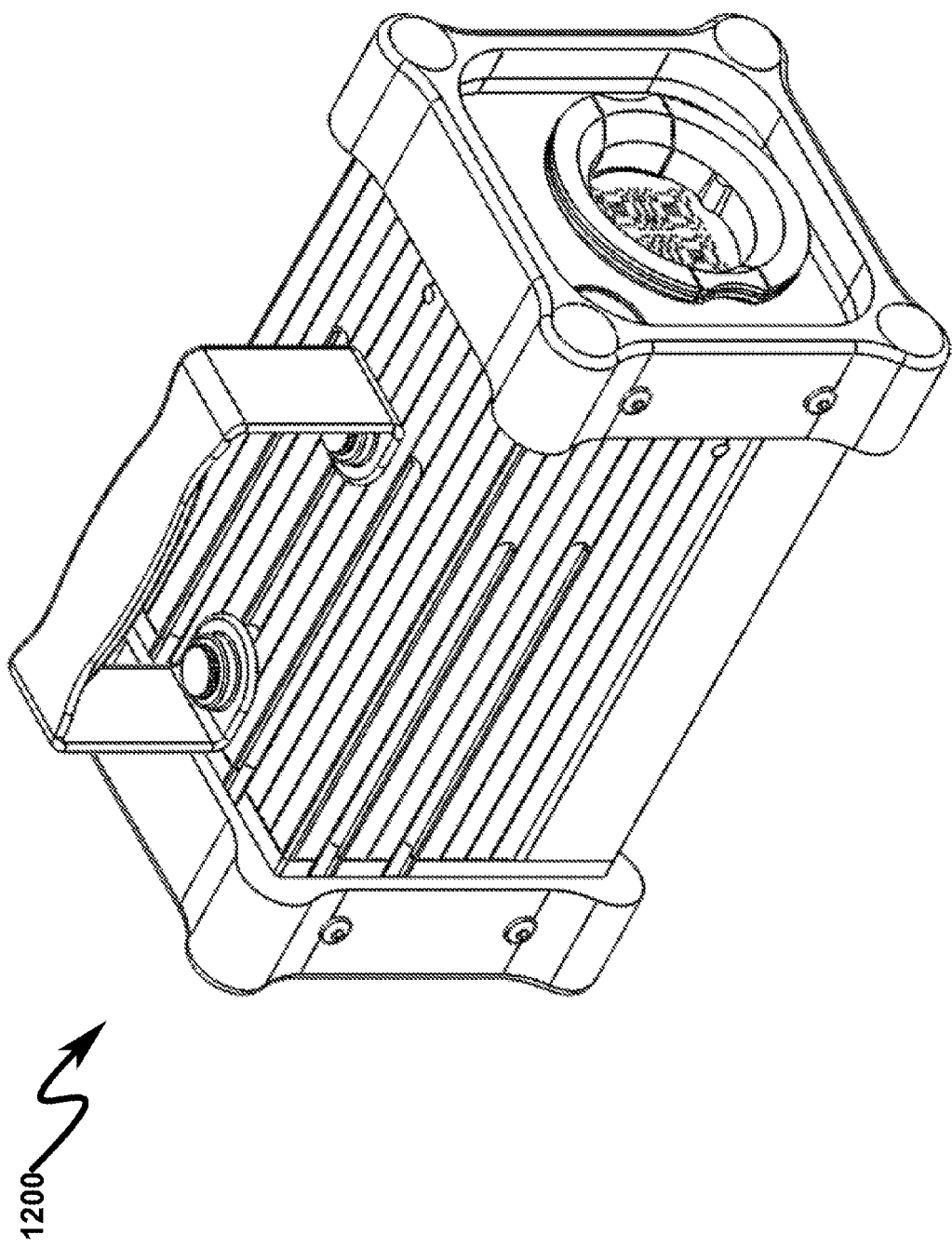
FIG. 12 illustrates a top left front perspective view of a preferred exemplary system embodiment.
Figure 16:
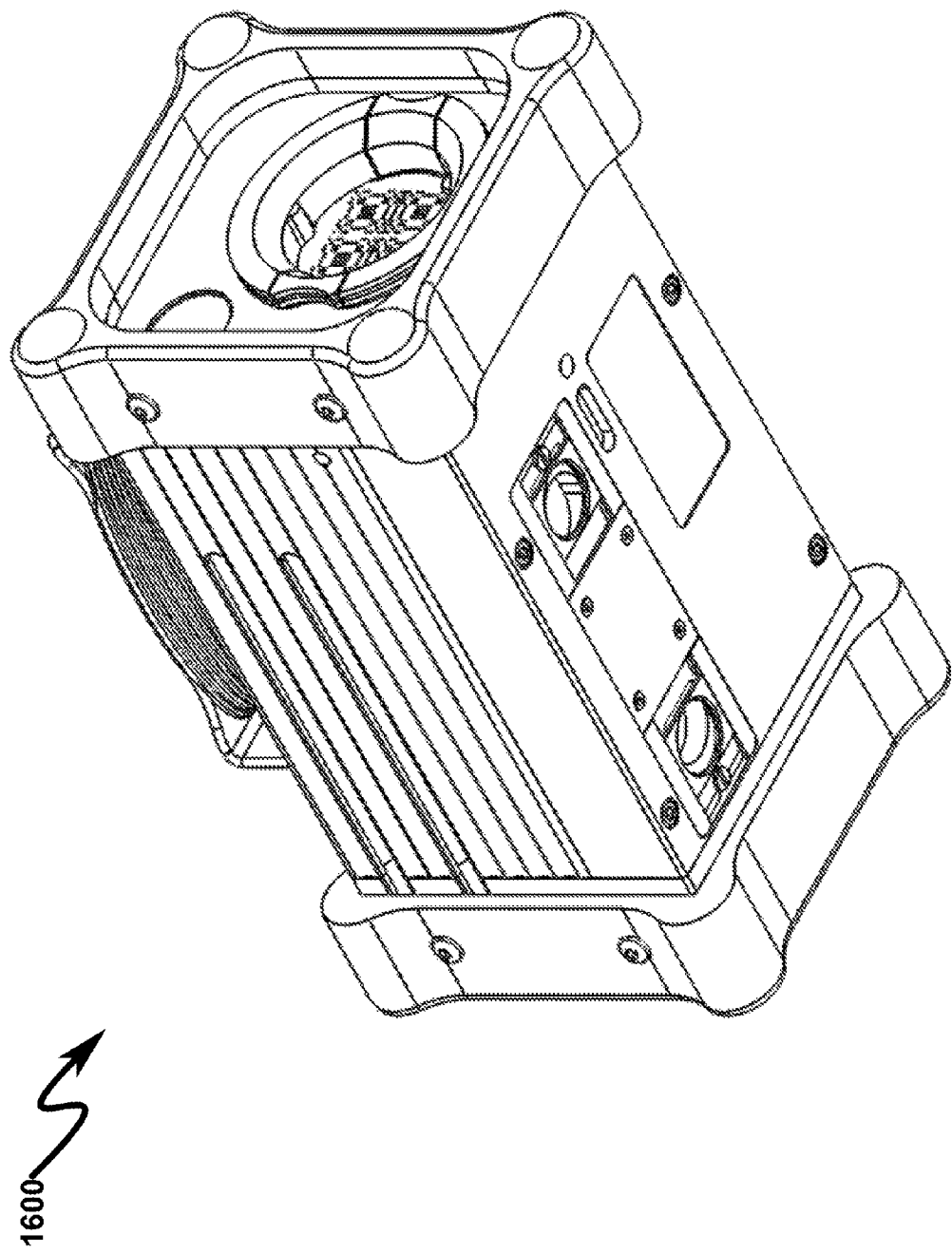
FIG. 16 illustrates a bottom left front perspective view of a preferred exemplary system embodiment.
Figure 18:
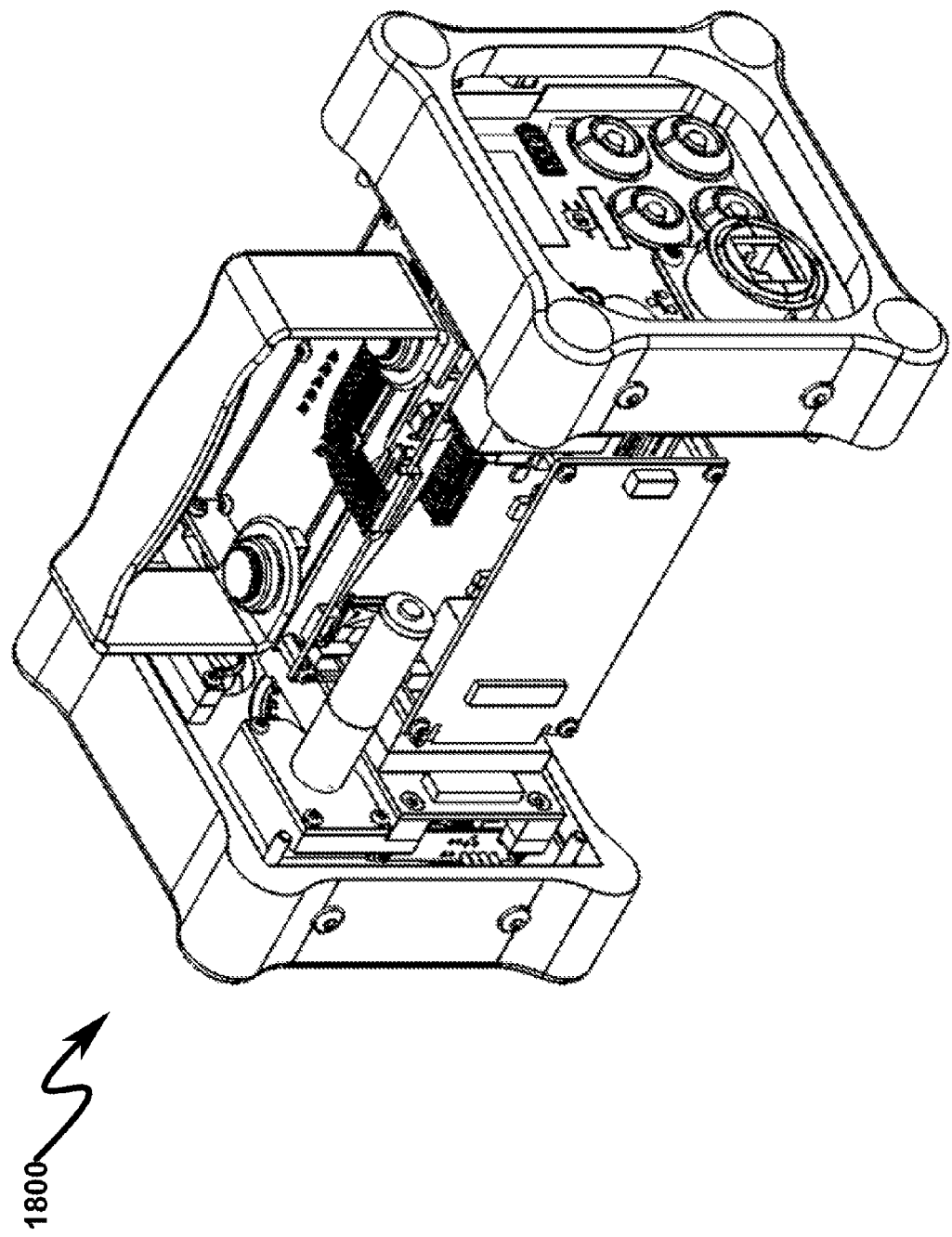
FIG. 18 illustrates a top right back perspective view of a preferred exemplary system embodiment depicting internal components and construction.
Figure 19:
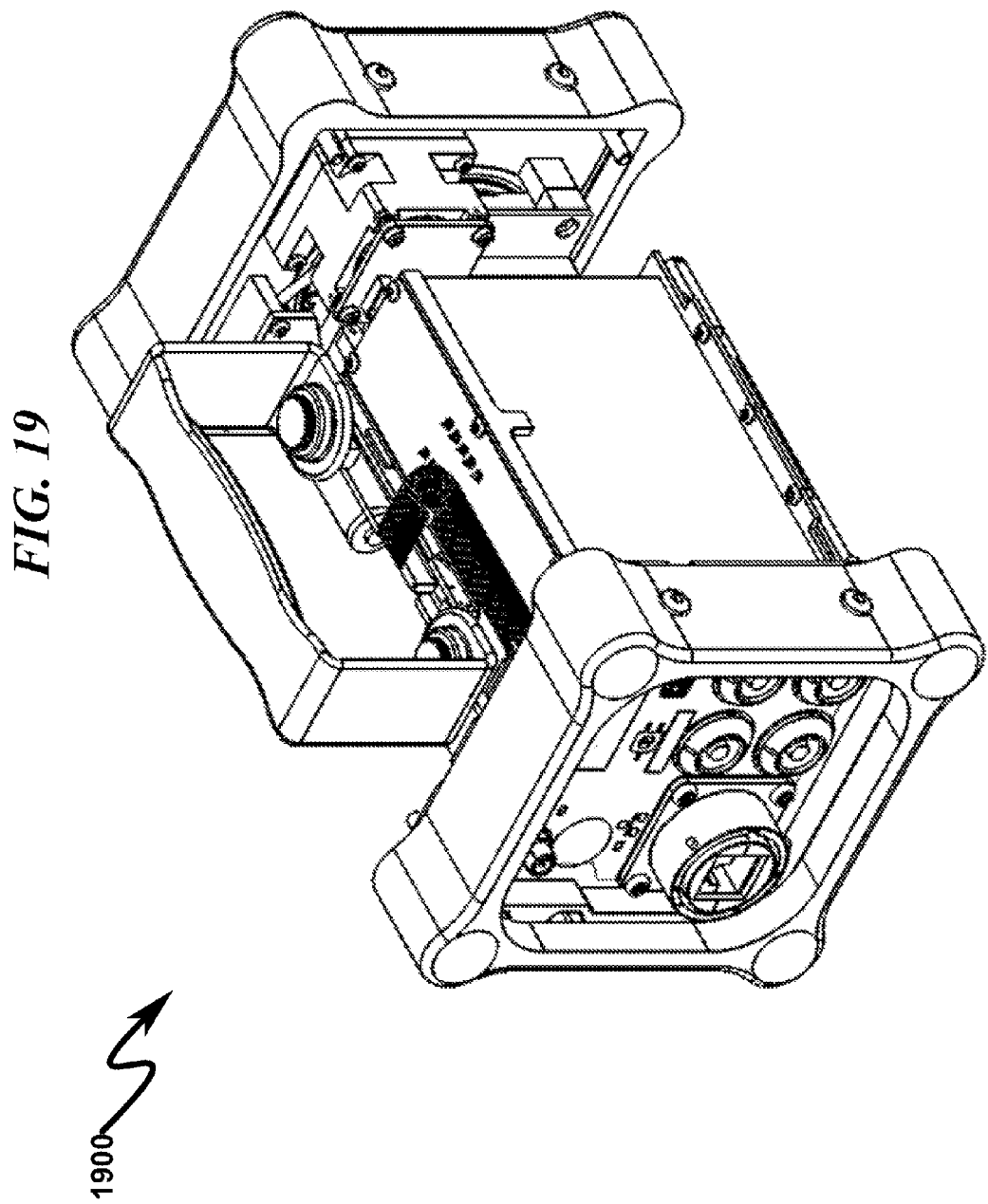
FIG. 19 illustrates a top left back perspective view of a preferred exemplary system embodiment depicting internal components and construction.
Figure 20:
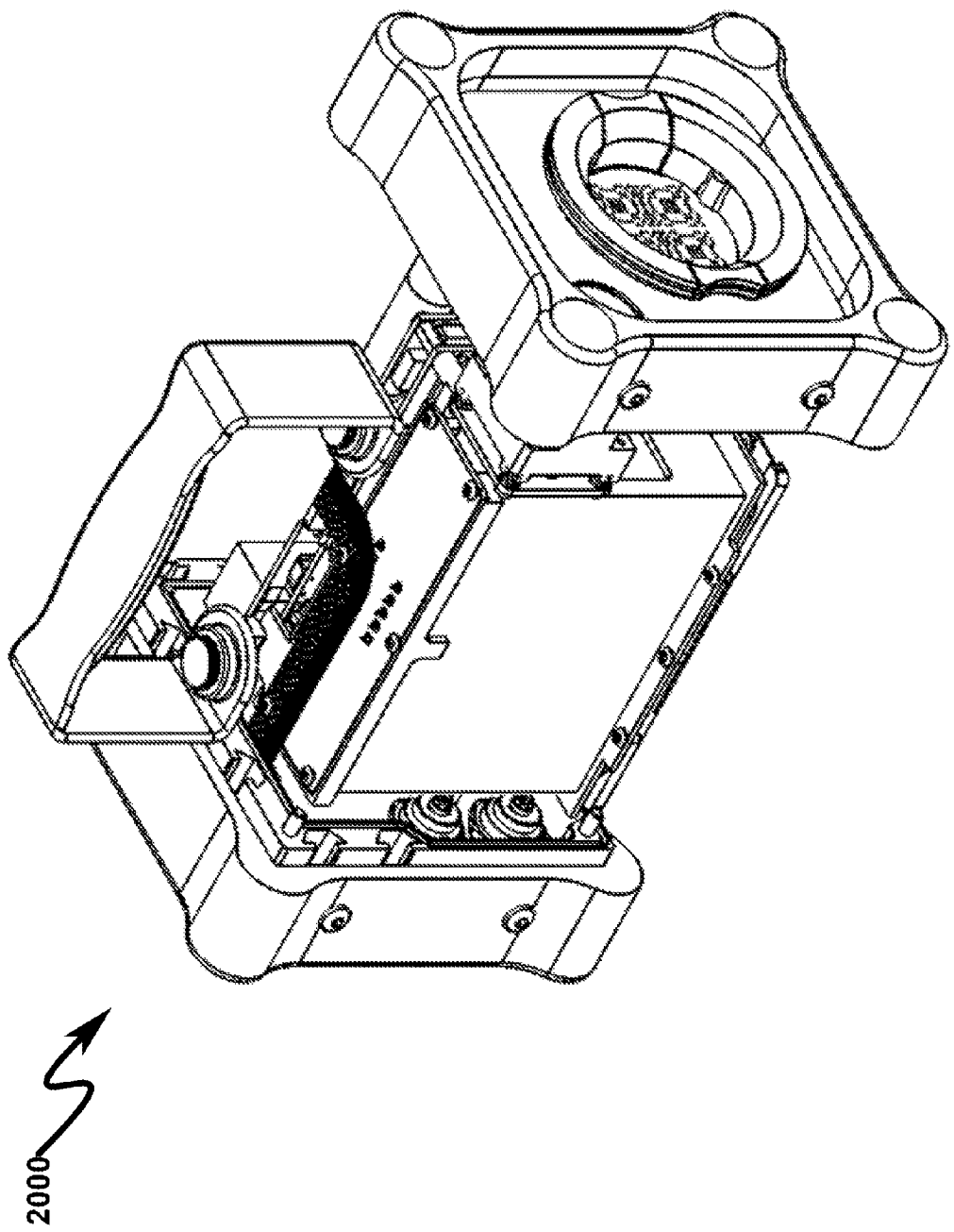
FIG. 20 illustrates a top left front perspective view of a preferred exemplary system embodiment depicting internal components and construction.
Figure 21:
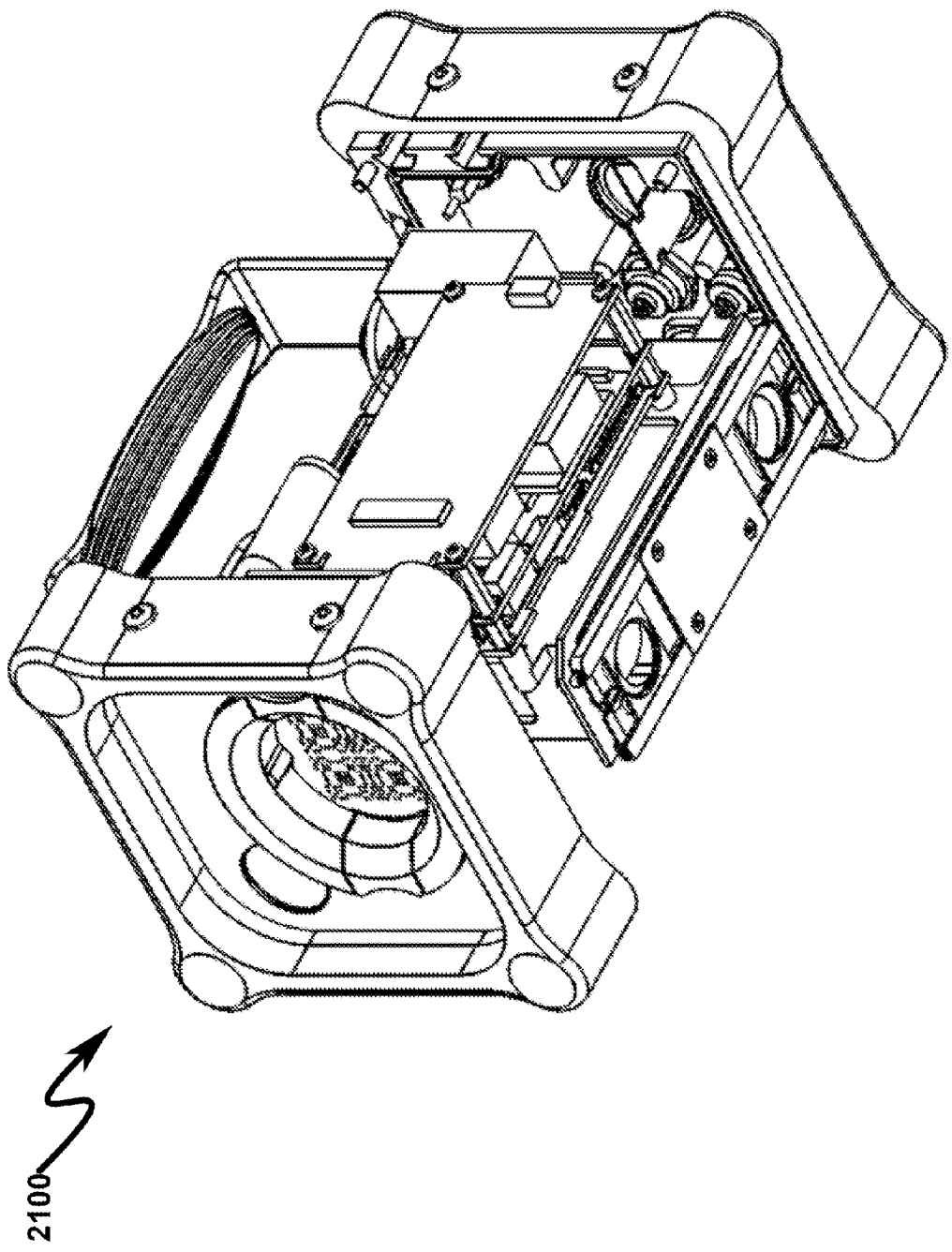
FIG. 21 illustrates a bottom right front perspective view of a preferred exemplary system embodiment depicting internal components and construction.
Figure 22:
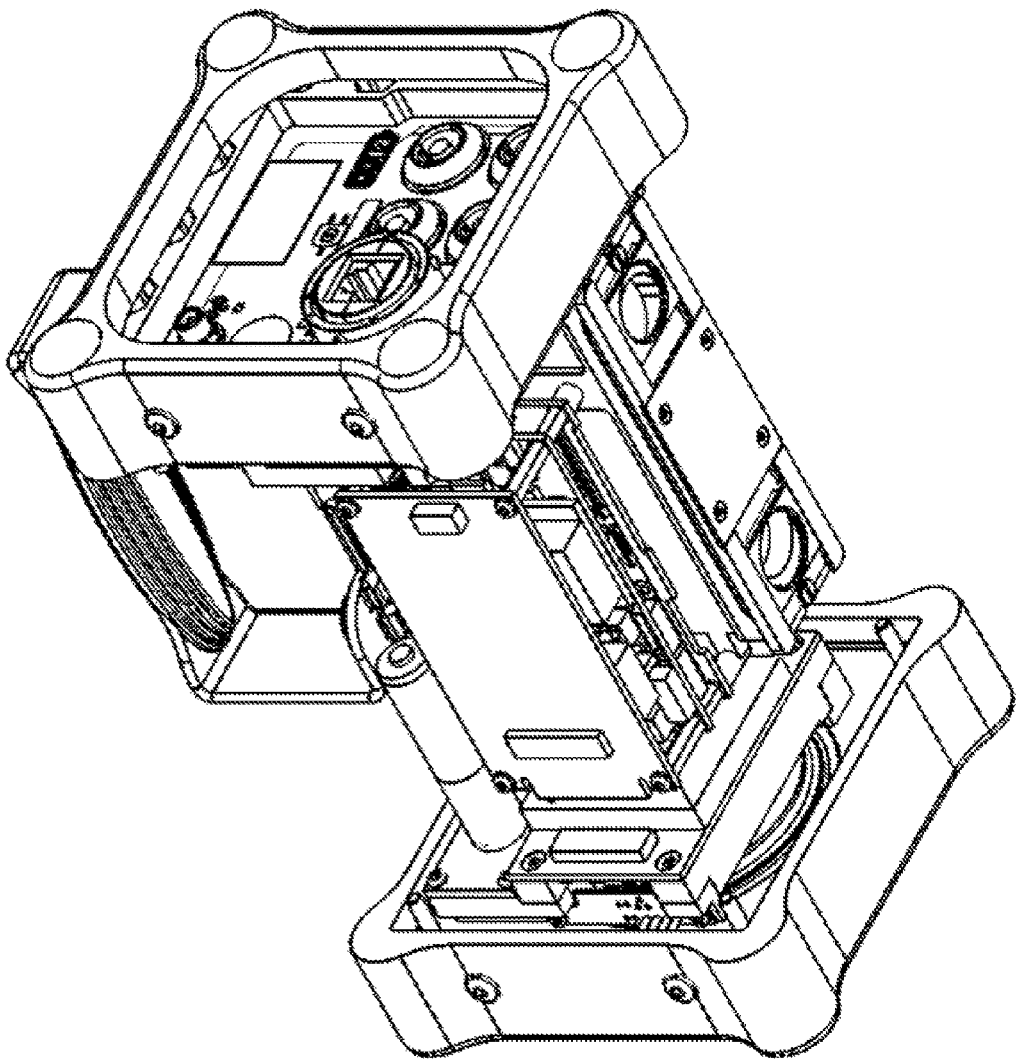
FIG. 22 illustrates a bottom right back perspective view of a preferred exemplary system embodiment depicting internal components and construction.
Figure 23:
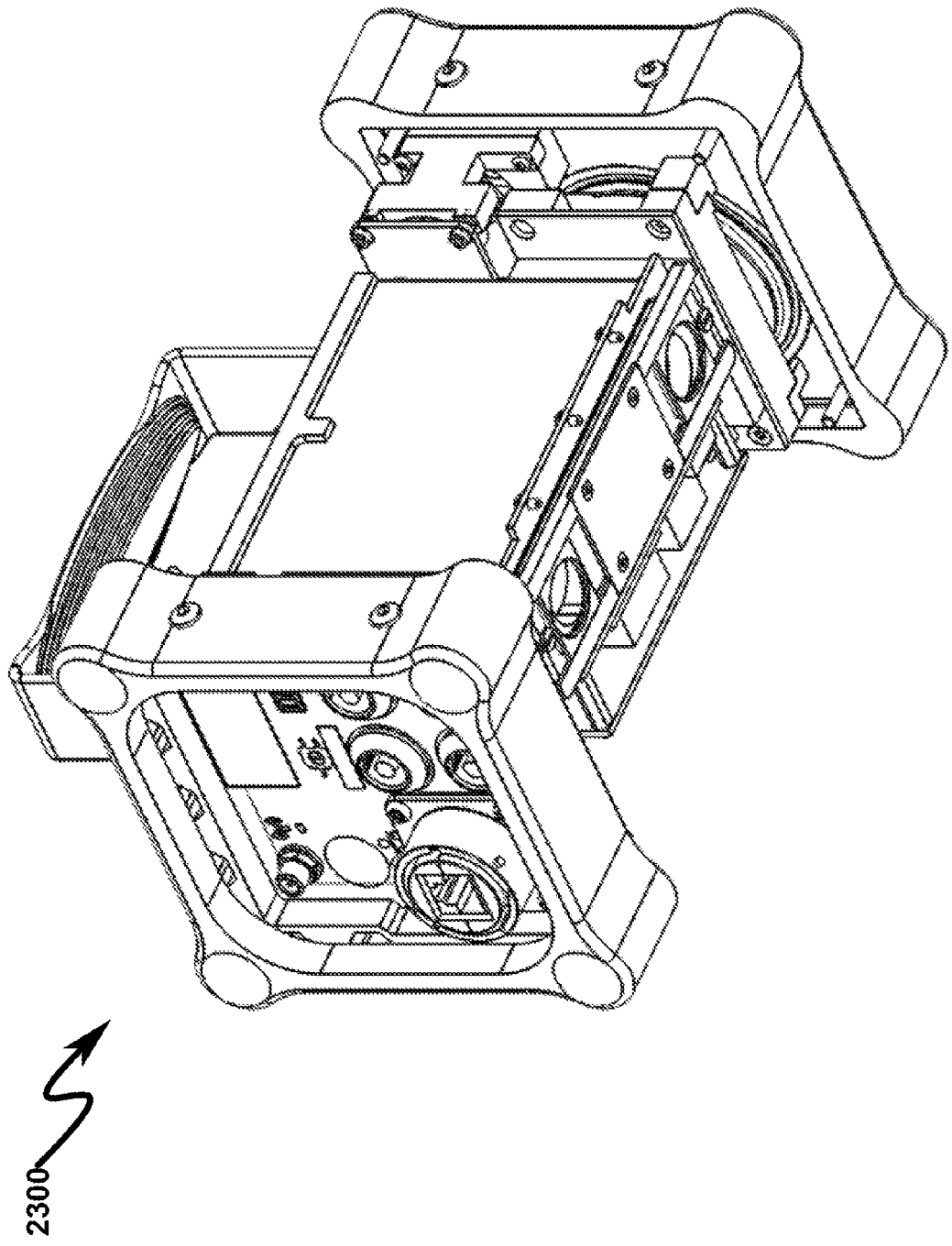
FIG. 23 illustrates a bottom left back perspective view of a preferred exemplary system embodiment depicting internal components and construction.

The various views depicted in FIG. 5 (0500)-FIG. 8 (0800) depict the outer top, bottom, front, back, right side, and left side views of an exemplary system embodiment. The various views depicted in FIG. 9 (0900)-FIG. 16 (1600) provide perspective views of a typical outer RCE containment enclosure and typical placement of major system components that interface outside of the RCE. The various views depicted in FIG. 17 (1700)-FIG. 24 (2400) provide more detail as to subsystem component placement internal to the outer shell of the RCE.

Figure 6:
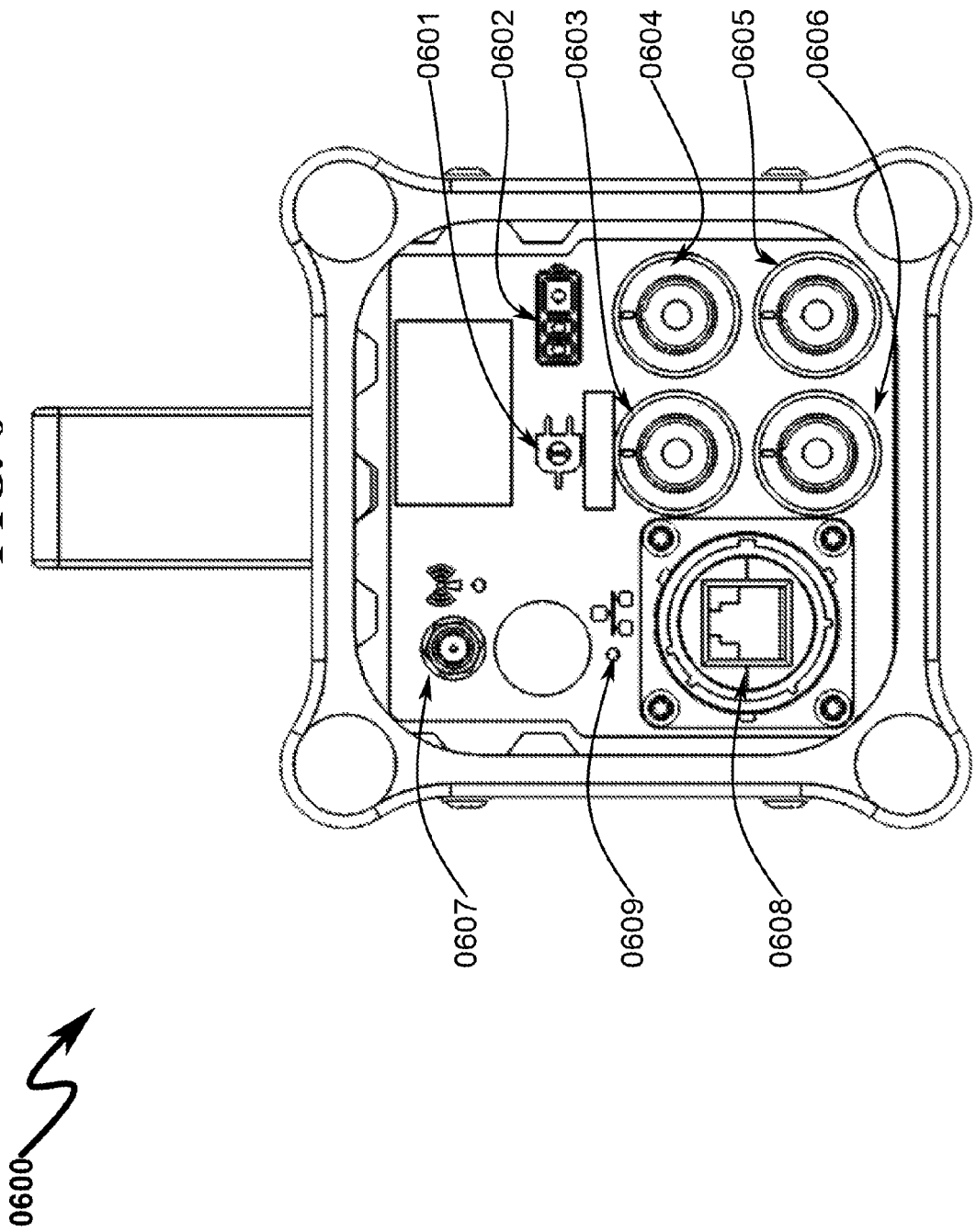
FIG. 6 illustrates a back view of a preferred exemplary system embodiment.
Figure 7:
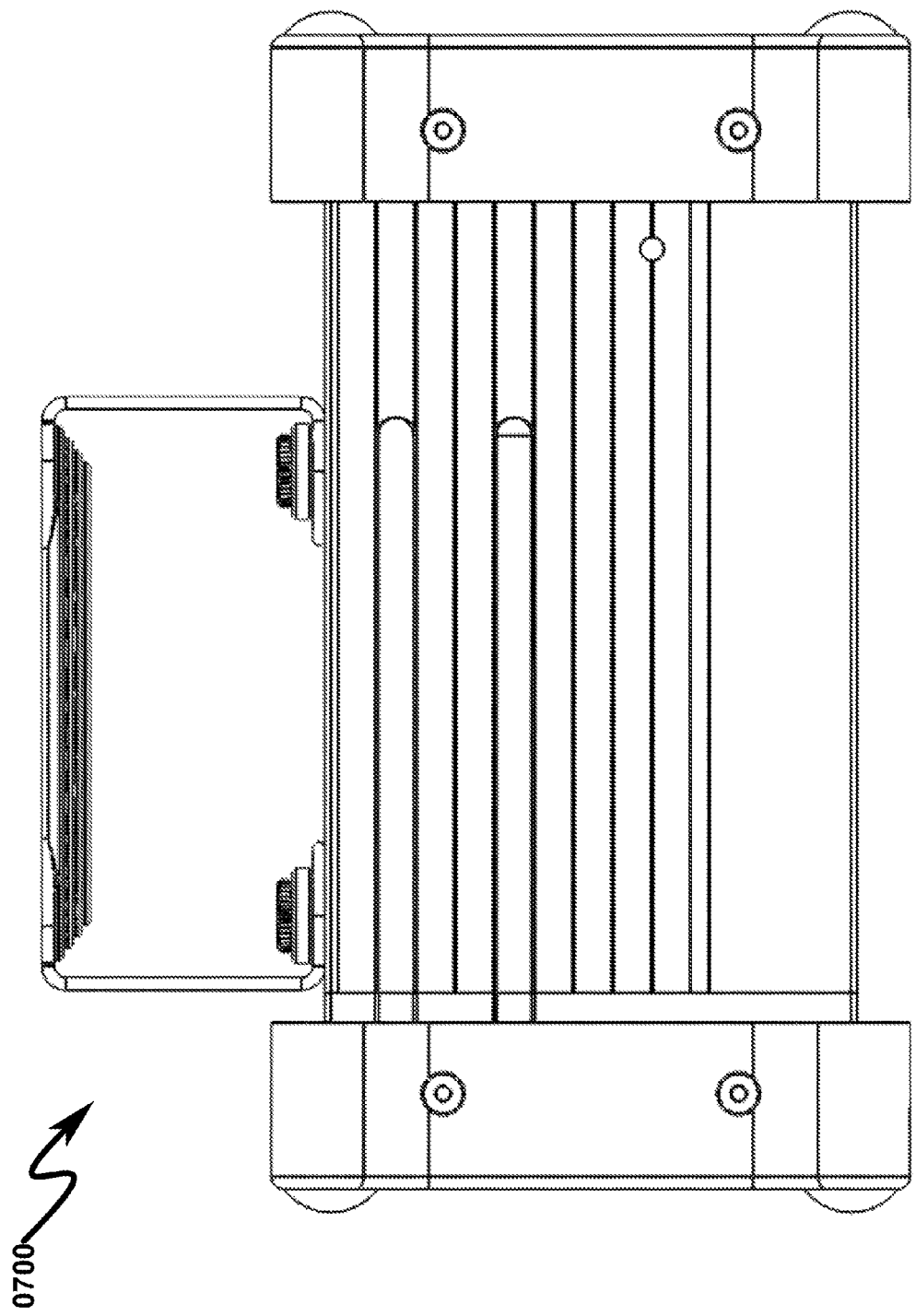
FIG. 7 illustrates a right side view of a preferred exemplary system embodiment.

With respect to the front view of FIG. 5 (0500), the system incorporates a camera aperture mask (CAM) (0501) retained by a modular plastic holder (MPH) (0502) and may incorporate a photo camera (0503) to capture images of the area being monitored by the radiation sensor behind the CAM (0501). With respect to the rear view depicted in FIG. 6 (0600), the system may be configured with a power indicator (0601), battery status indicator (0602), and a variety of external interfaces (0603, 0604, 0605, 0606) to support camera movement, flash, and other accessories. Communication with the host computer system is accomplished via wireless antenna link (0607) or wired Ethernet interface (0608) that may have corresponding link connection status indicators (0609).

Disassembly Views (2500)-(4000)

Figure 25:
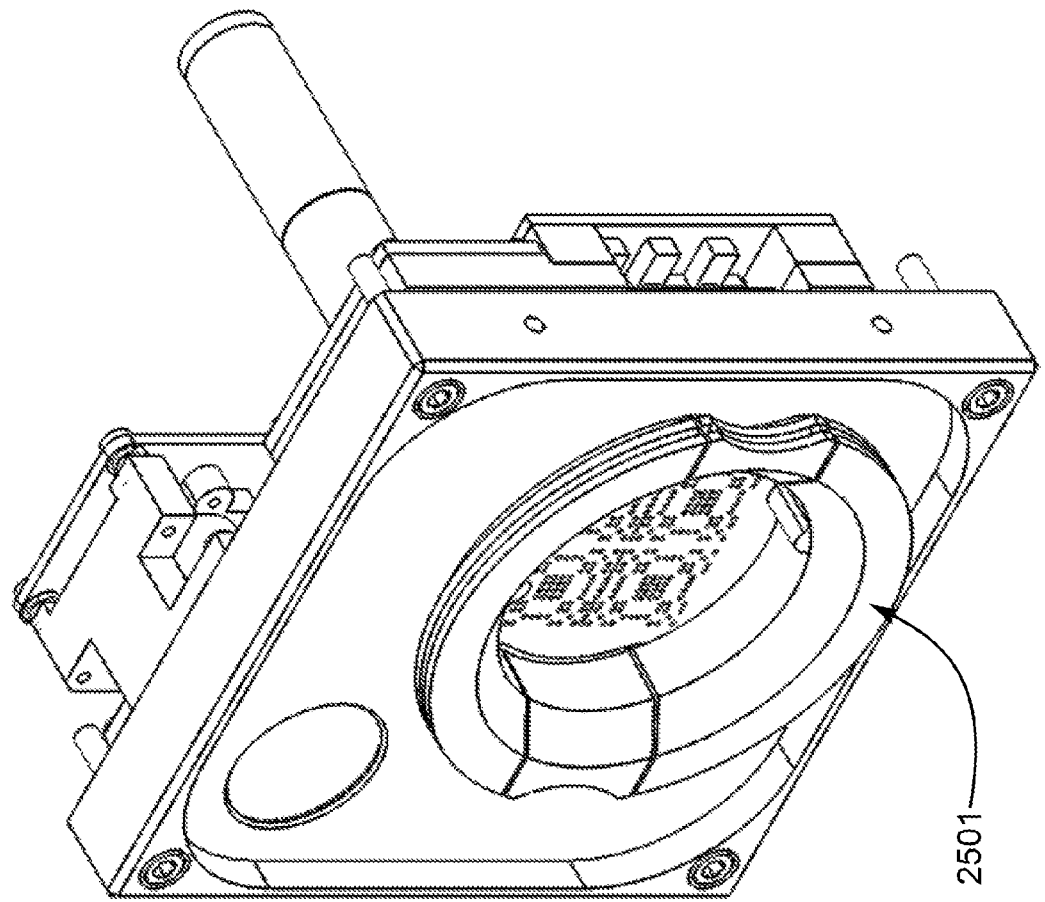
FIG. 25 illustrates a top right front perspective view of a preferred exemplary system embodiment depicting front panel assembly detail.

Much of the present invention system functionality may be understood by inspection of the disassembly views depicted in FIG. 25 (2500)-FIG. 40 (4000). These disassembly views may be generally described as follows:

FIG. 25 (2500) depicts the front of the system without the RCE external enclosure and internal CCD electronics. The CAM (2501) incorporating the MPH is illustrated in this view.

FIG. 26 (2600) depicts the rear of the system without the RCE external enclosure and internal CCD electronics. The mask rotation motor (2601) is illustrated in this view.

FIG. 27 (2700) depicts the rear of the system without the RCE external enclosure and internal CCD electronics. The optical photographic sensor assembly (2701) is illustrated in this view.

Figure 28:
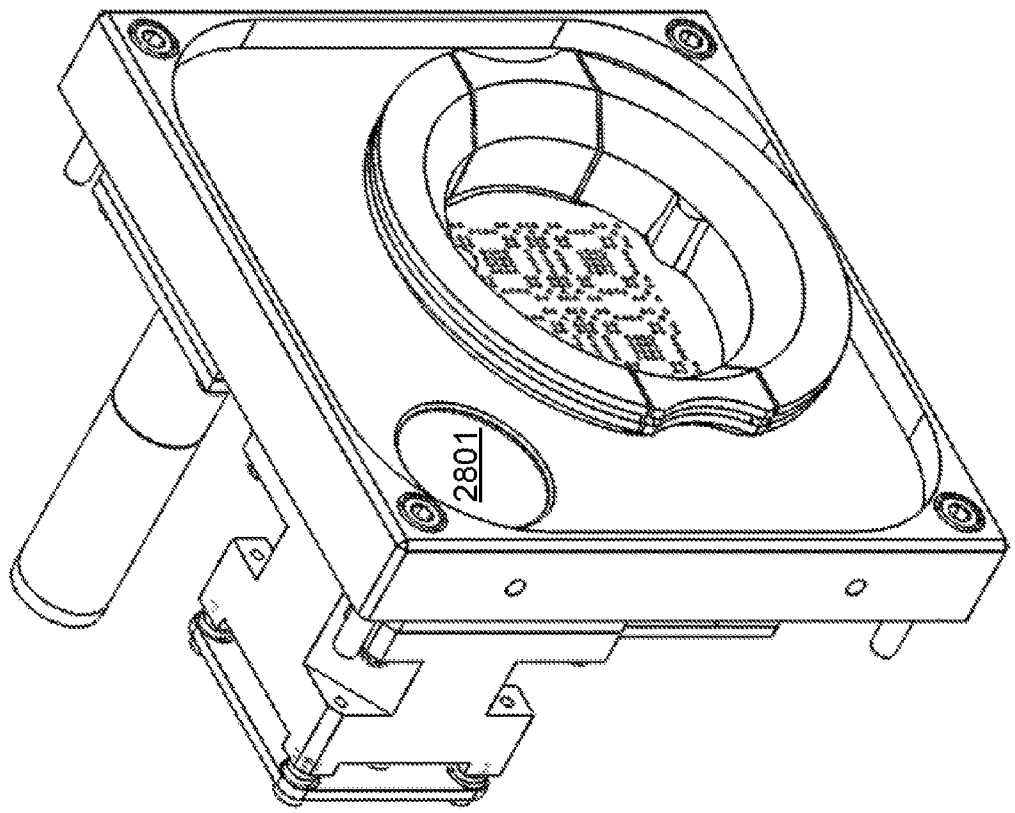
FIG. 28 illustrates a top left front perspective view of a preferred exemplary system embodiment depicting front panel assembly detail.

FIG. 28 (2800) depicts the front of the system without the RCE external enclosure and internal CCD electronics. The aperture port for the photo camera (2801) is illustrated in this view.

Figure 29:
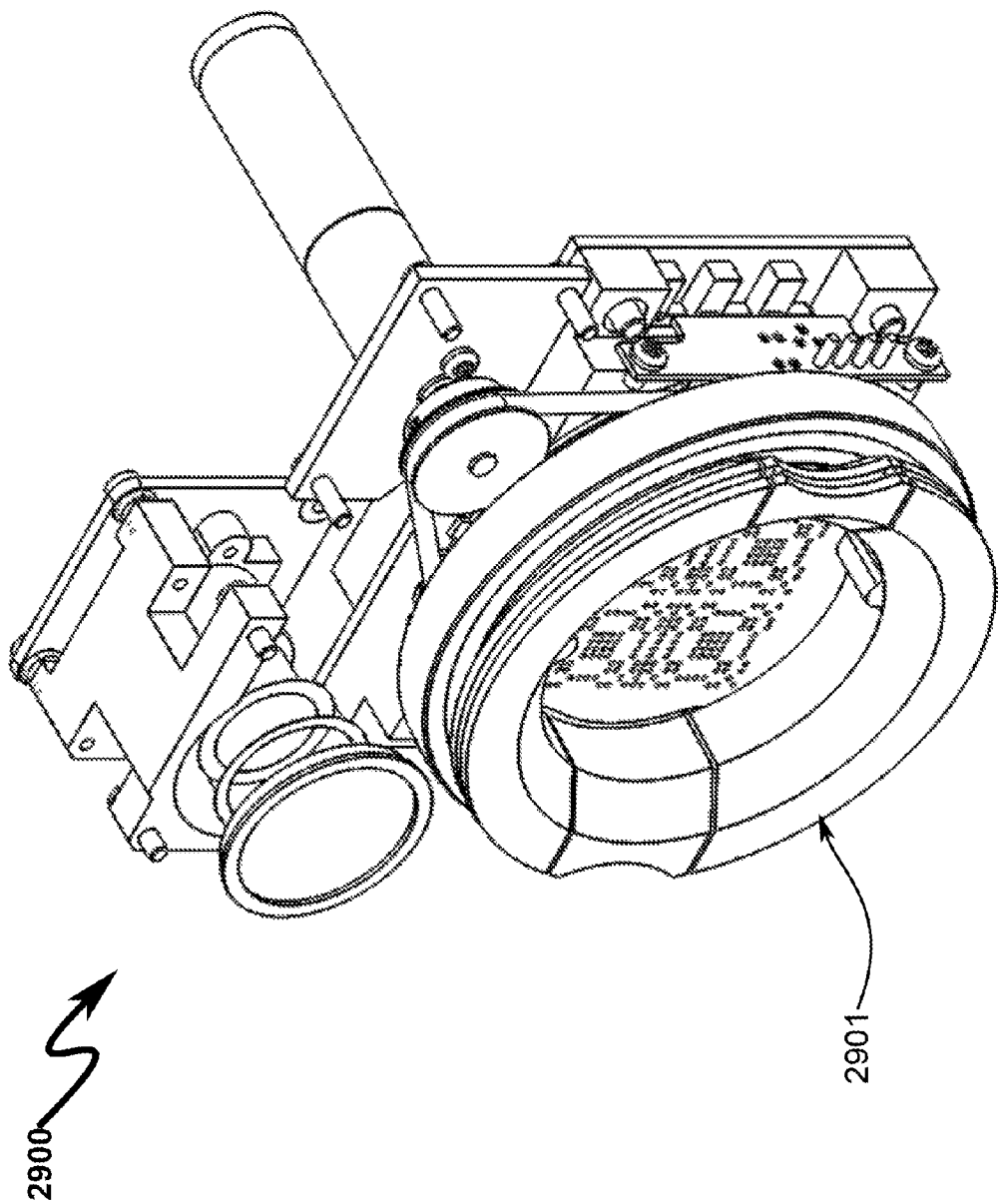
FIG. 29 illustrates a top right front perspective view of a preferred exemplary system embodiment depicting front panel assembly detail with the external front panel wall removed.

FIG. 29 (2900) depicts the front of the system without the front faceplate and more fully depicts the CAM (2901) MPH assembly and linkages between the mask rotation motor (MRM) and the CAM.

FIG. 30 (3000) depicts the rear of the system without the front faceplate and more fully illustrates the photographic sensor module (3001).

Figure 31:
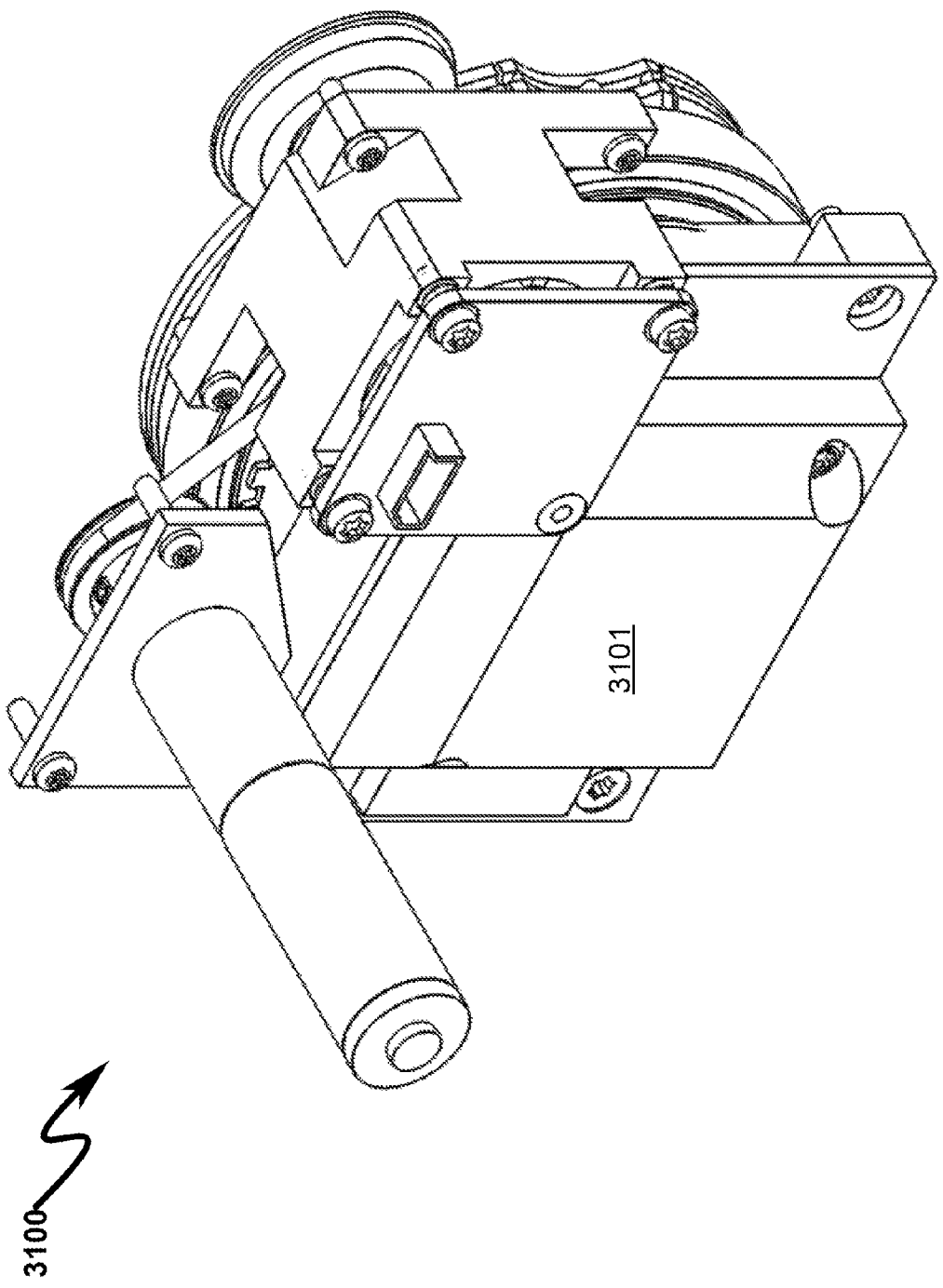
FIG. 31 illustrates a top left back perspective view of a preferred exemplary system embodiment depicting front panel assembly detail with the external front panel wall removed.

FIG. 31 (3100) depicts the front of the system without the front faceplate and more fully illustrates the RSD module (3101).

Figure 32:
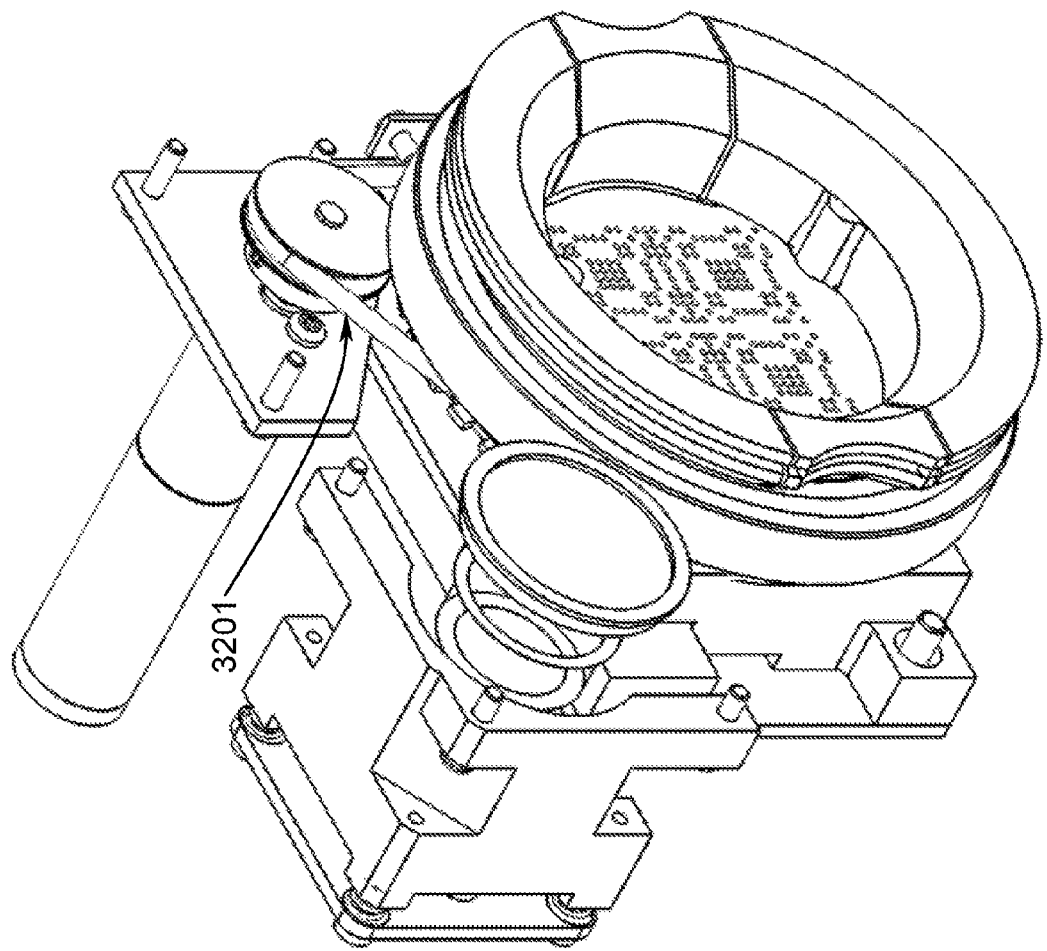
FIG. 32 illustrates a top left front perspective view of a preferred exemplary system embodiment depicting front panel assembly detail with the external front panel wall removed.

FIG. 32 (3200) depicts the front of the system without the front faceplate and more fully illustrates the timing belt (3201) connecting the MRM and CAM.

Figure 33:
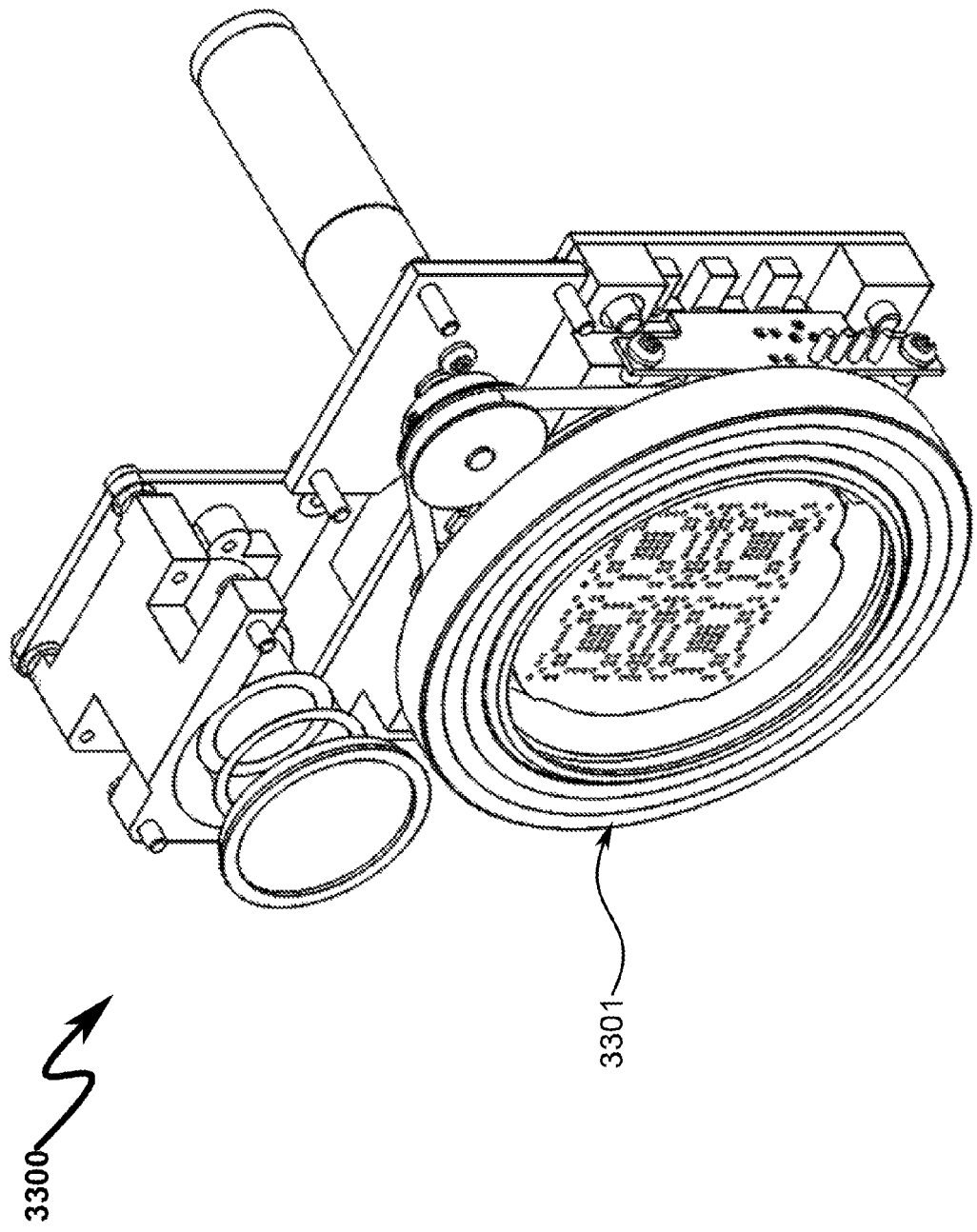
FIG. 33 illustrates a top right front perspective view of a preferred exemplary system embodiment depicting front panel assembly detail with the external front panel wall removed and the MPH partially disassembled.

FIG. 33 (3300) depicts the front of the system with the CAM partially disassembled (3301).

Figure 34:
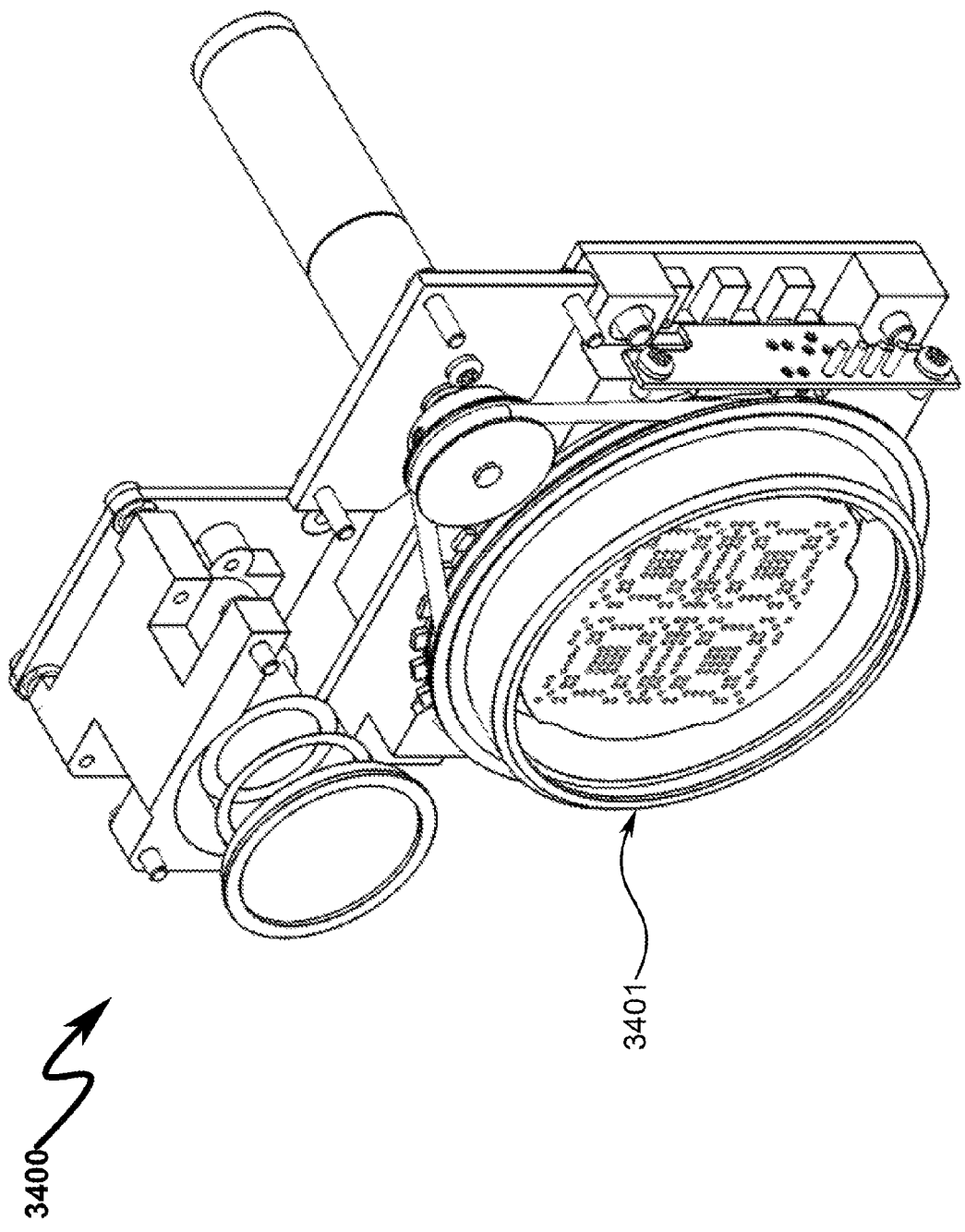
FIG. 34 illustrates a top right front perspective view of a preferred exemplary system embodiment depicting front panel assembly detail with the external front panel wall removed and the MPH partially disassembled.

FIG. 34 (3400) depicts the front of the system with the CAM partially disassembled (3401).

Figure 35:
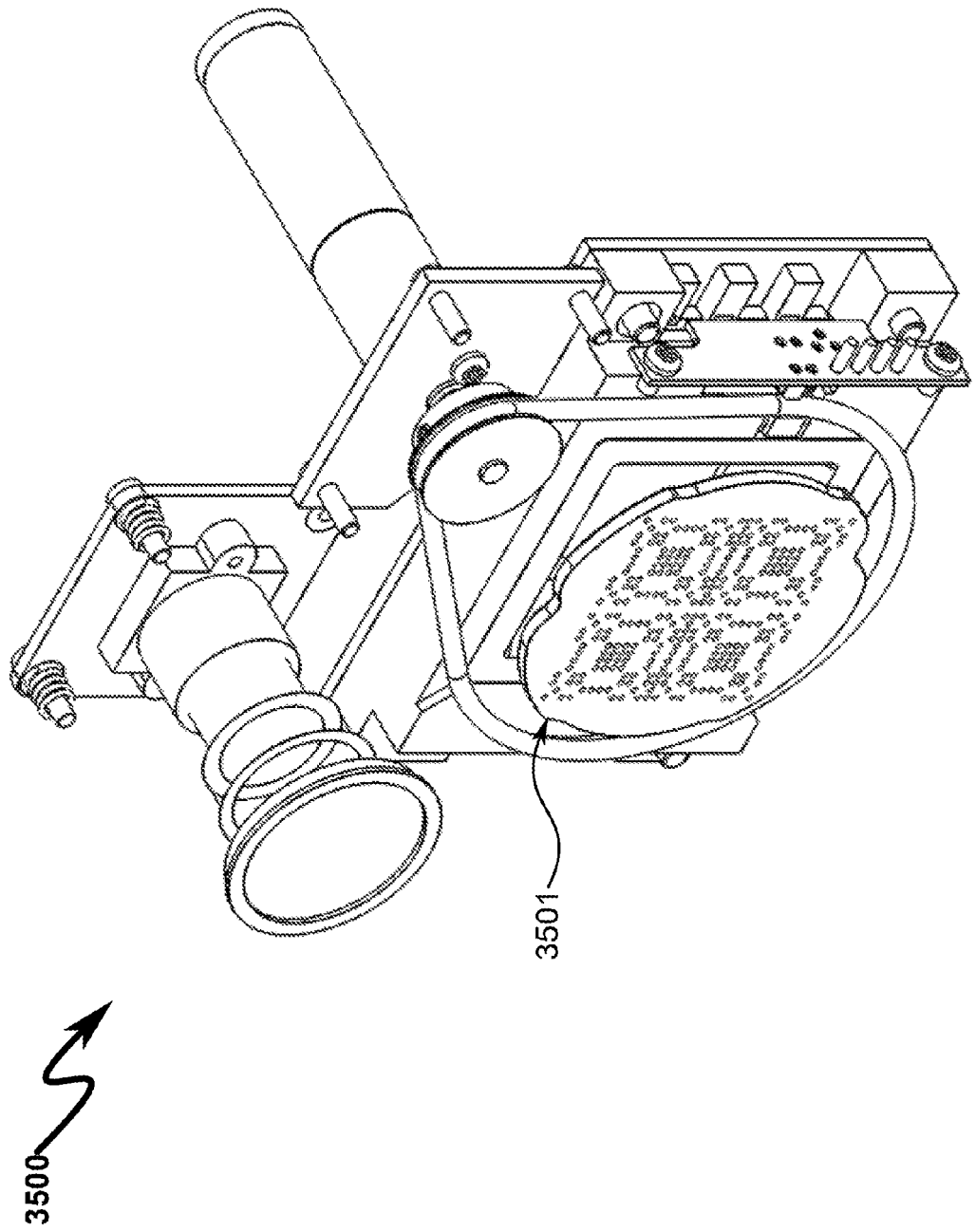
FIG. 35 illustrates a top right front perspective view of a preferred exemplary system embodiment depicting front panel assembly detail with the external front panel wall removed and the MPH disassembled and aperture mask isolated.

FIG. 35 (3500) depicts the front of the system with the CAM disassembled and the aperture mask isolated (3501).

Figure 36:
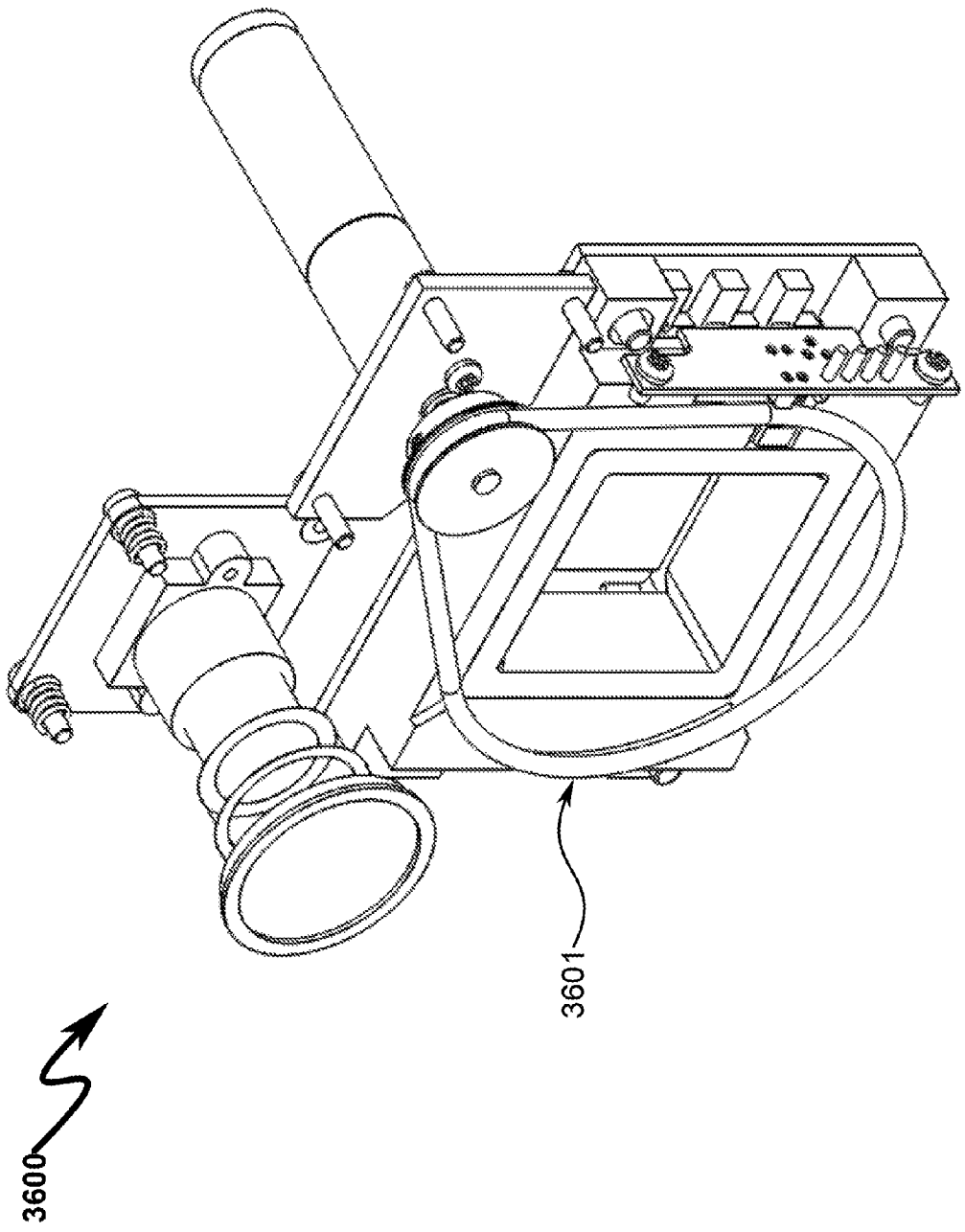
FIG. 36 illustrates a top right front perspective view of a preferred exemplary system embodiment depicting front panel assembly detail with the external front panel wall and CAM removed.

FIG. 36 (3600) depicts the front of the system with the CAM disassembled and the CAM rotation timing belt isolated (3601).

Figure 37:
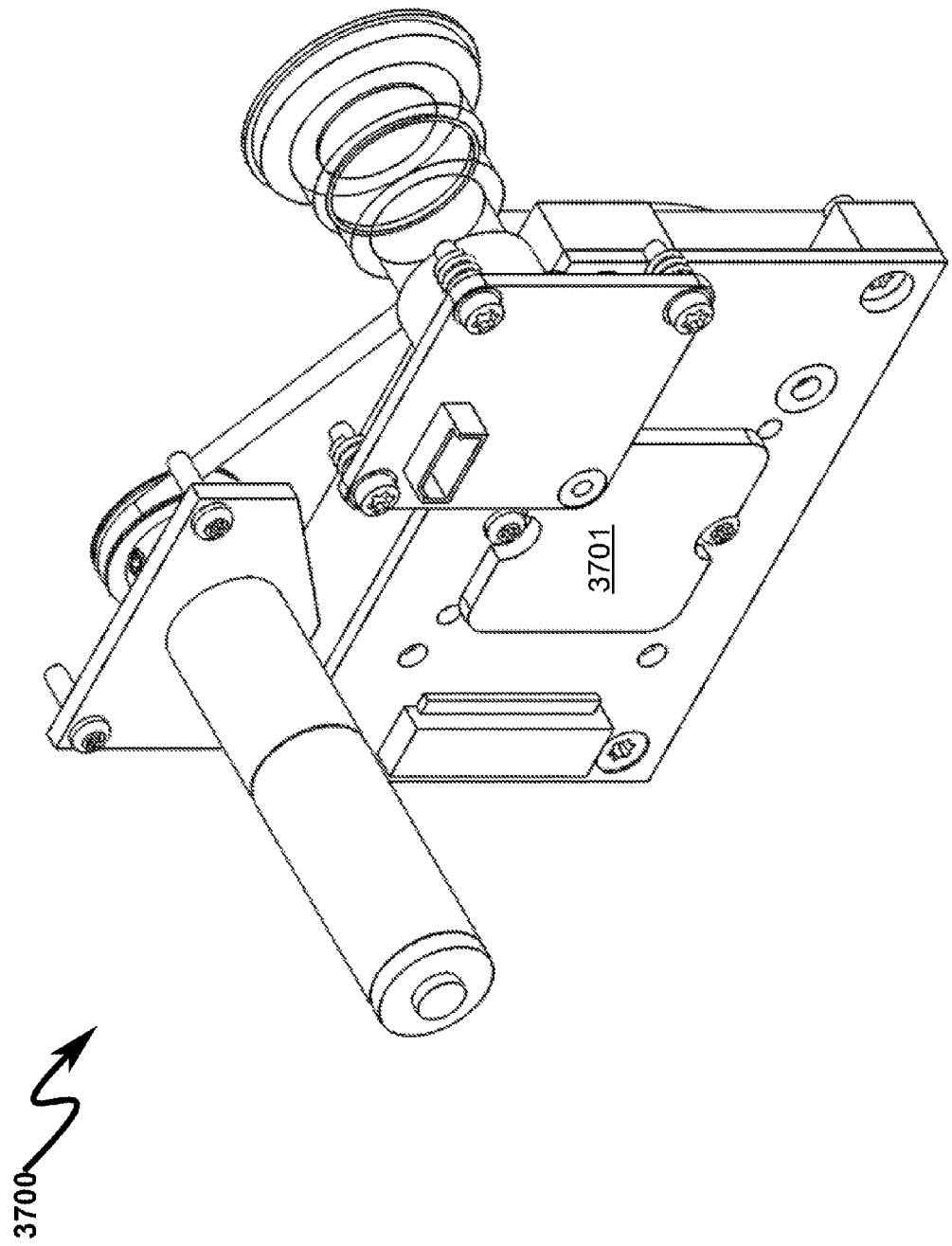
FIG. 37 illustrates a top left rear perspective view of a preferred exemplary system embodiment depicting front panel assembly detail with the RSD cover removed.

FIG. 37 (3700) depicts the rear of the system with the radiation sensor/detector (RSD) partially disassembled (3701).

Figure 38:
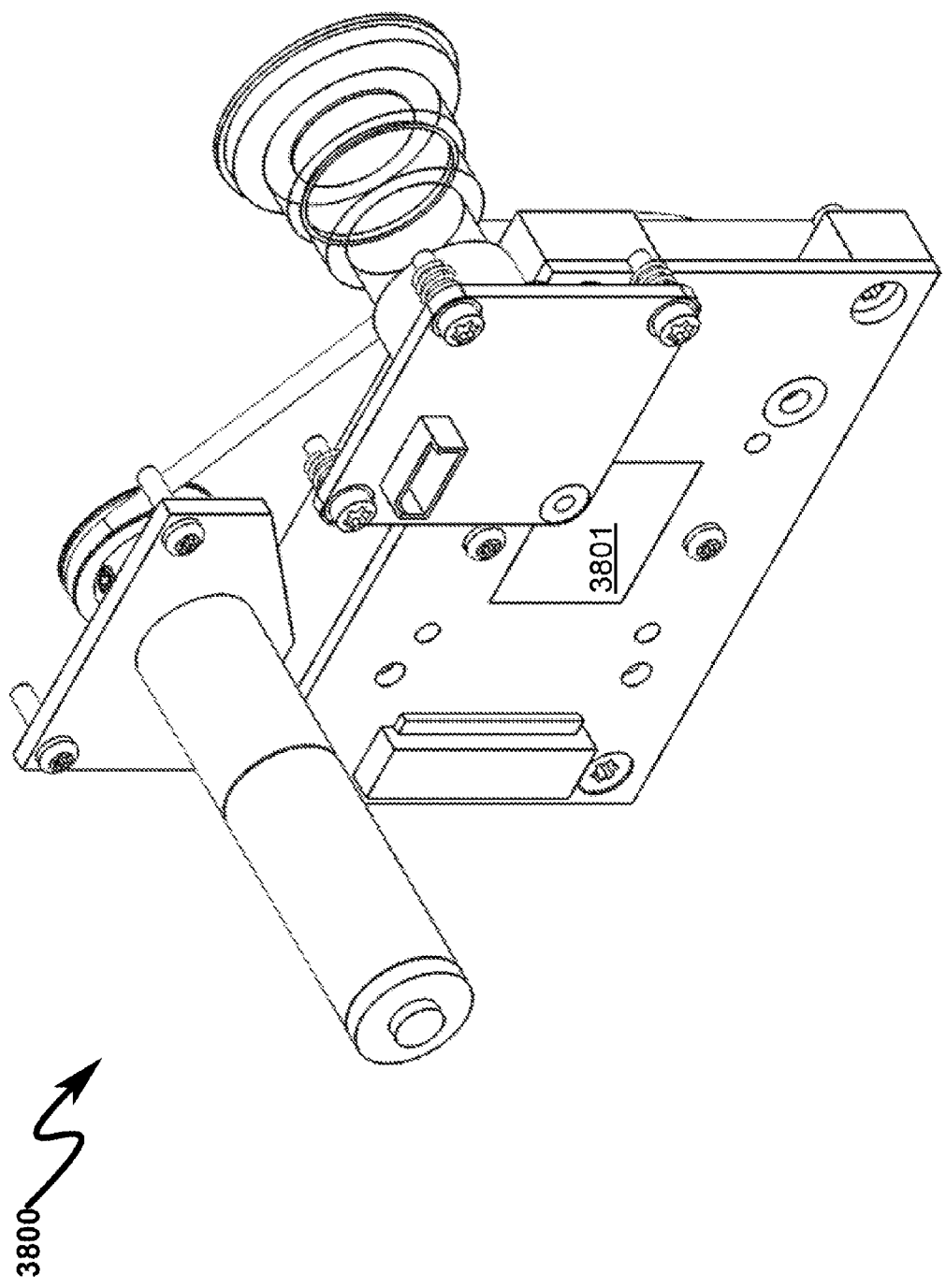
FIG. 38 illustrates a top left rear perspective view of a preferred exemplary system embodiment depicting front panel assembly detail with the RSD cover removed.

FIG. 38 (3800) depicts the rear of the system with the RSD removed and the RSD aperture detailed (3801).

Figure 39:
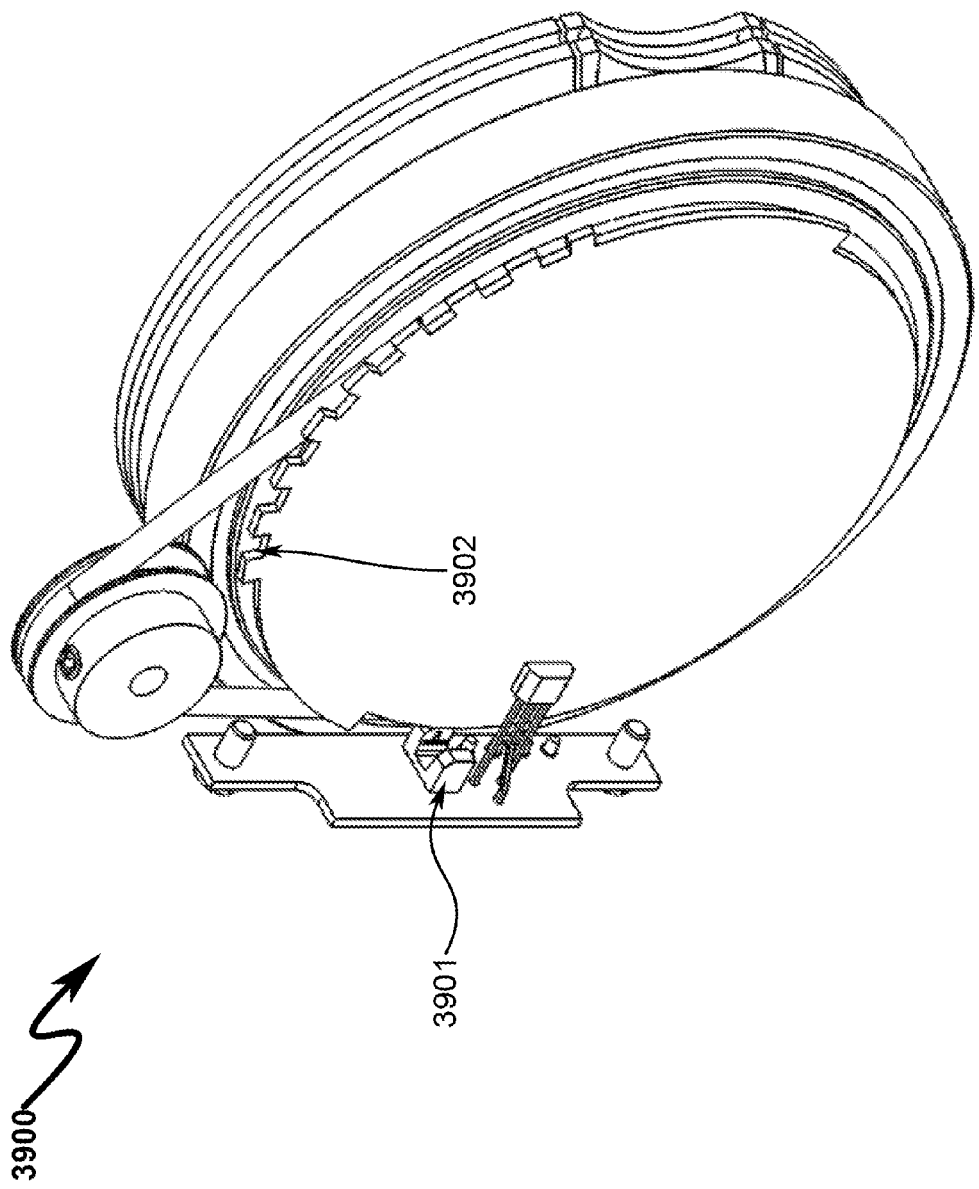
FIG. 39 illustrates a top left rear perspective view of a preferred exemplary system embodiment depicting front panel assembly detail of the CAM, rotation detection sensor (RDS), and coded identification indicia (CII) sensor.

FIG. 39 (3900) depicts the rear detail of the CAM assembly and illustrates the RDS (3901) (optical sensor in this embodiment) used to detect angular motion of the CAM via notches (3902) formed in the CAM perimeter.

FIG. 40 (4000) depicts the rear detail of the CAM assembly (partially disassembled) and illustrates a Hall-effect sensor (4001) used to detect coded indicia (4002) associated with the CAM.

One skilled in the art will recognize that the assembly provided in these figures is only illustrative of the present invention and not limitive of the invention scope.

CAM and Modular Plastic Holder (MPH) (4100)-(5600)

Figure 41:
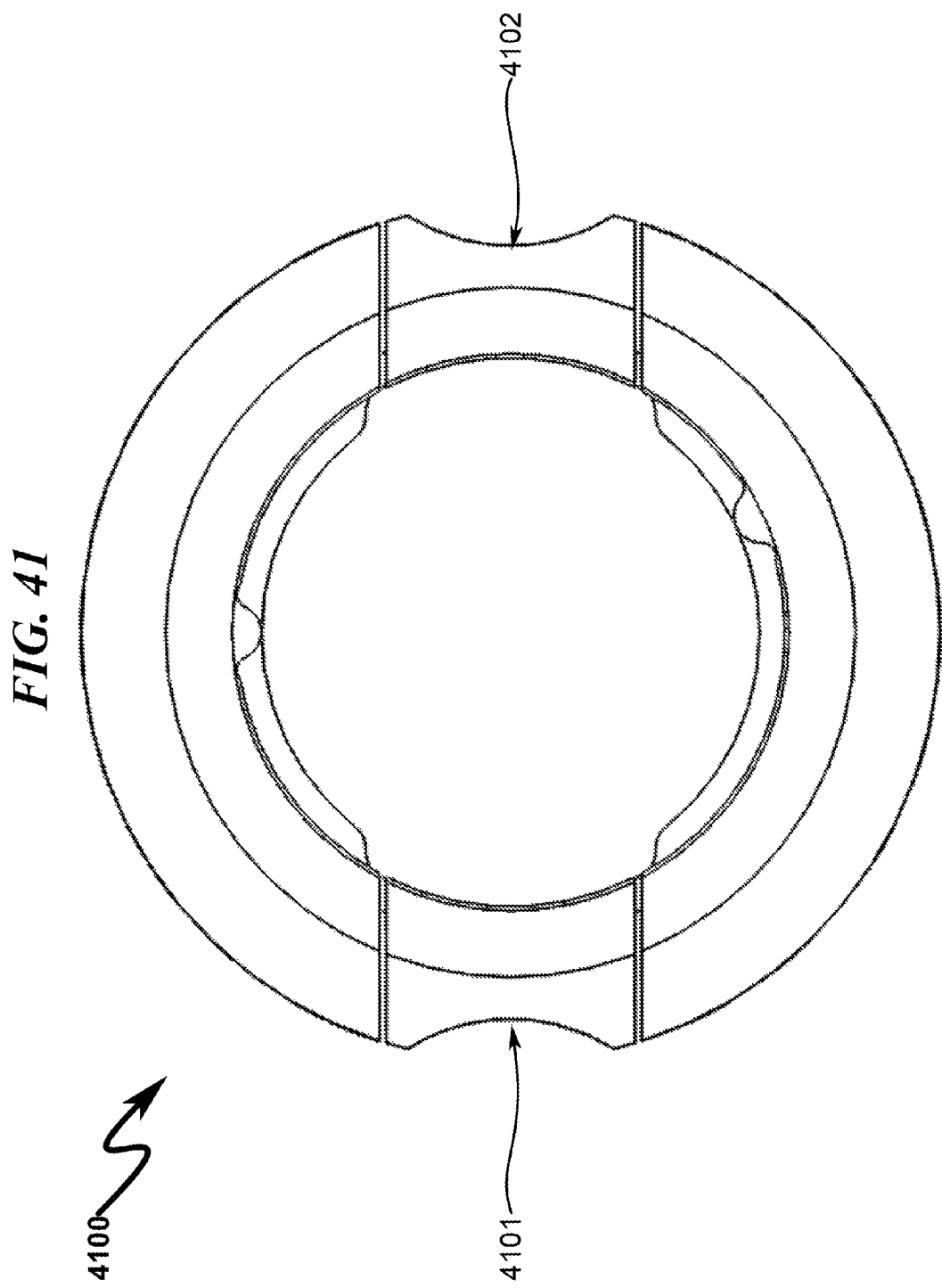
FIG. 41 illustrates a front view of a preferred exemplary modular plastic holder (MPH) used to retain a coded camera aperture mask (CAM)
Figure 57:
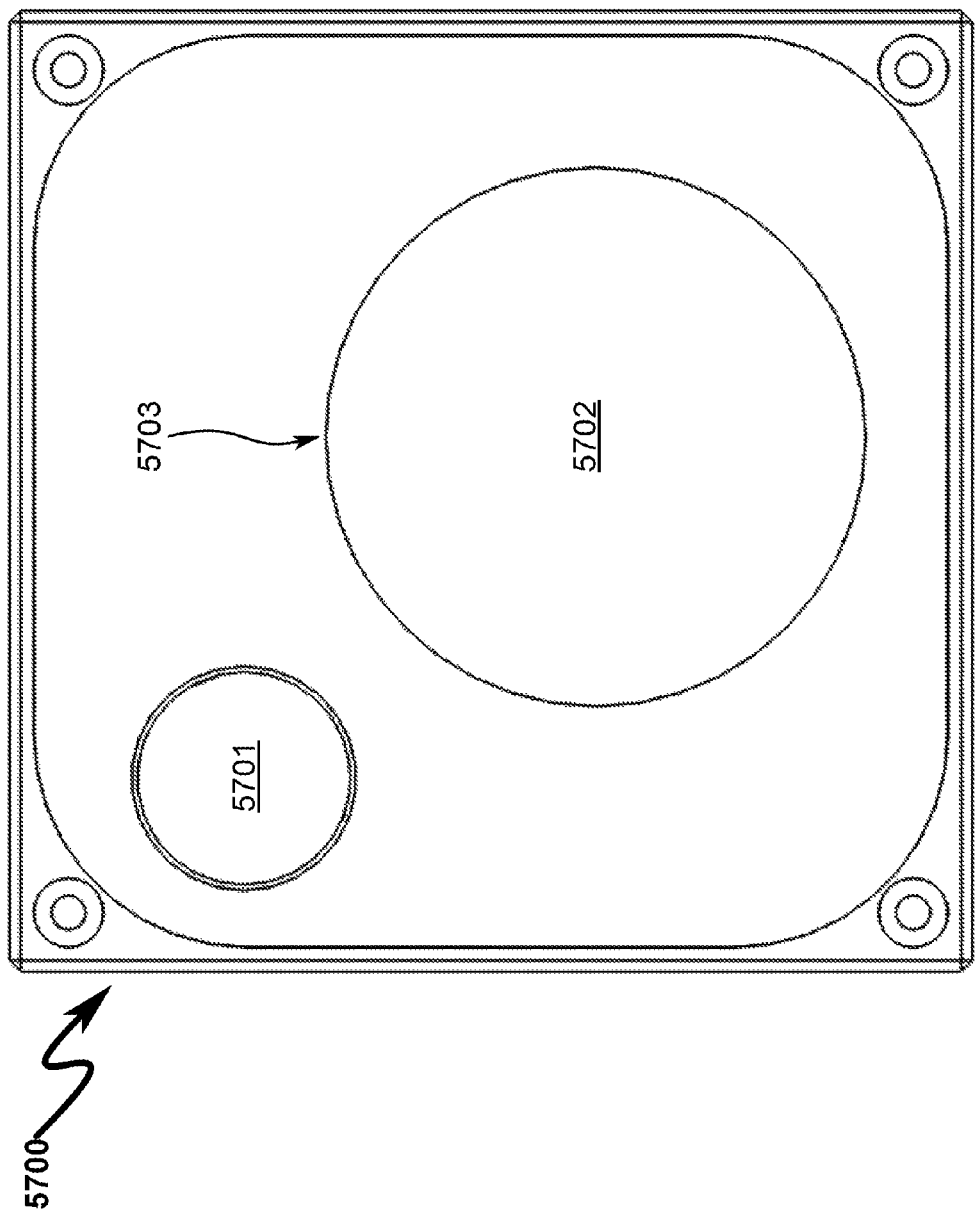
FIG. 57 illustrates a front view of an exemplary camera front panel wall useful in some preferred invention embodiments.
Figure 58:
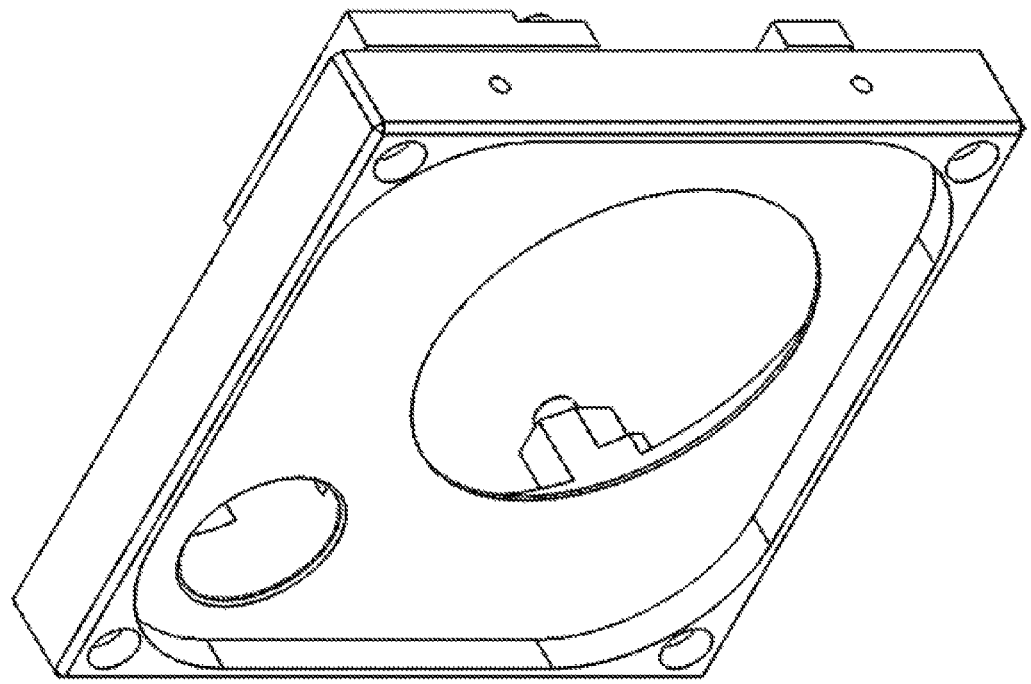
FIG. 58 illustrates a front perspective view of an exemplary camera front panel wall useful in some preferred invention embodiments.
Figure 59:
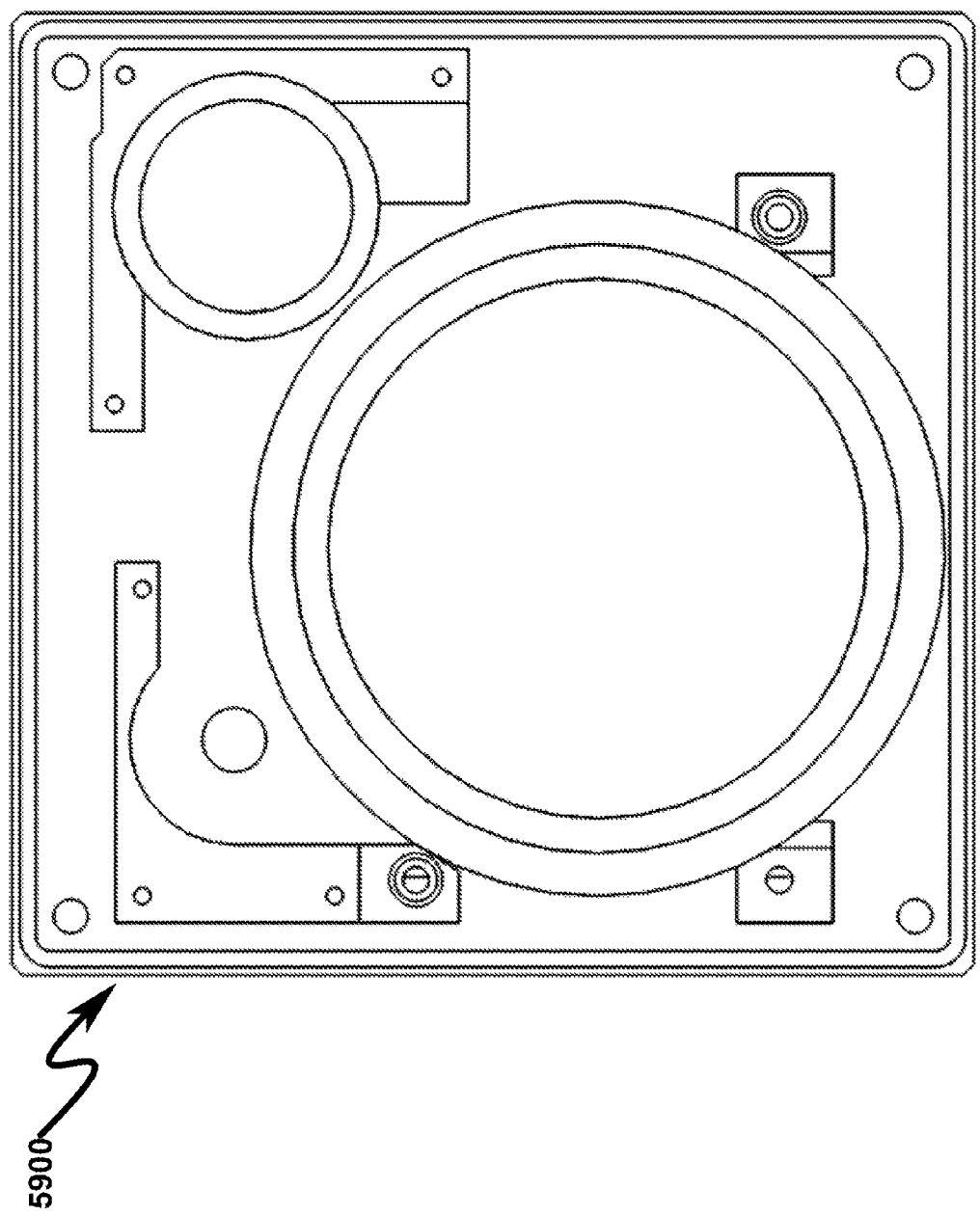
FIG. 59 illustrates a rear view of an exemplary camera front panel wall useful in some preferred invention embodiments.

The CAM optimally comprises an aperture mask contained in a modular plastic holder (MPH). The MPH may have many forms, but a preferred exemplary embodiment is depicted in views of FIG. 41 (4100)-FIG. 48 (4800). As depicted, the MPH has several useful attributes:

The MPH incorporates two opposing finger-activated retention clips (4101, 4102) (as seen in FIG. 41 (4100)) that are used to engage/disengage the CAM from the camera aperture front panel (FIG. 57 (5700)-FIG. 60 (6000)).

Figure 47:
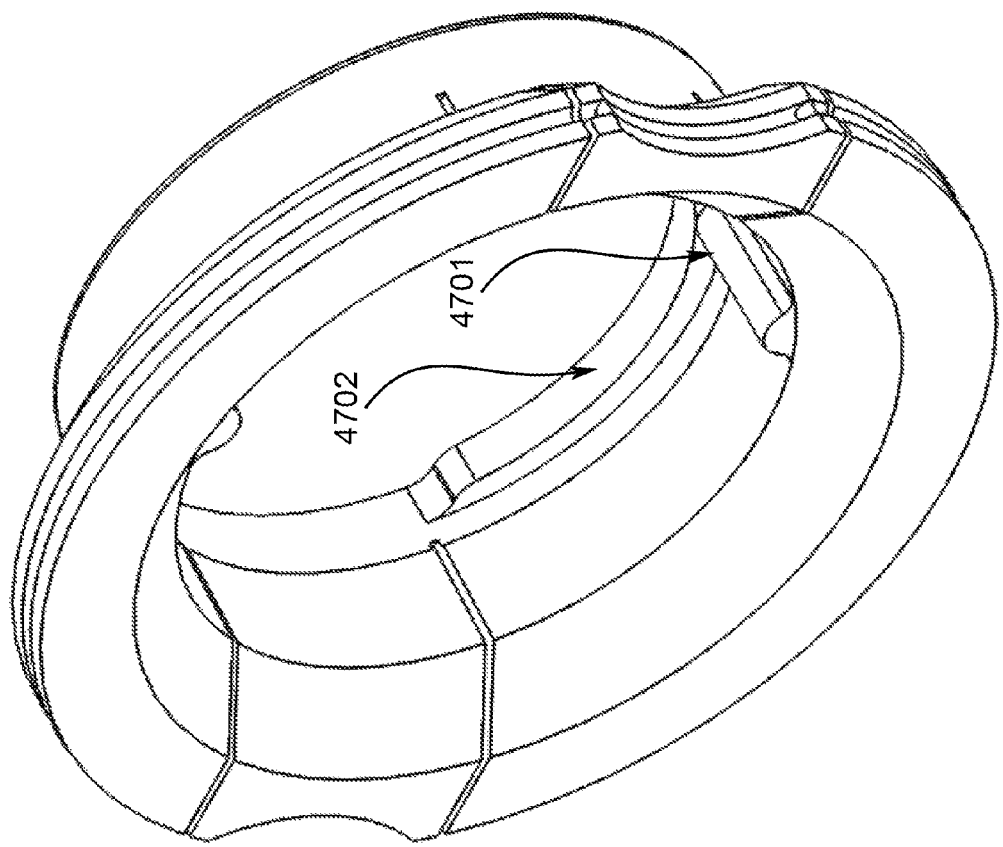
FIG. 47 illustrates a front perspective view of a preferred exemplary modular plastic holder (MPH) used to retain a coded camera aperture mask (CAM)

The CAM may contain one or more alignment tabs (4701) as depicted in FIG. 47 (4700) to ensure proper alignment between the CAM and the front faceplate FIG. 57 (5700)-FIG. 60 (6000)).

Figure 42:
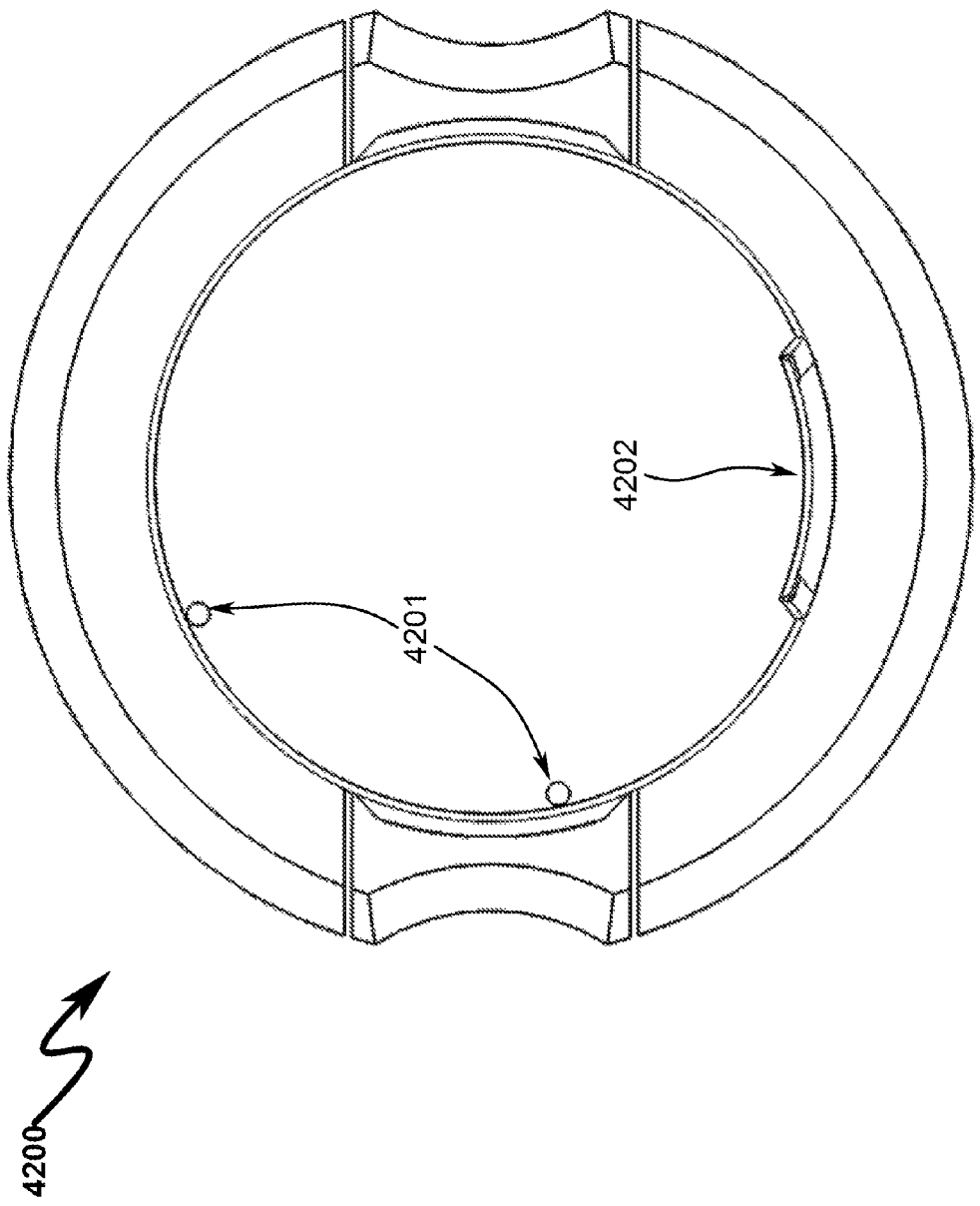
FIG. 42 illustrates a back view of a preferred exemplary modular plastic holder (MPH) used to retain a coded camera aperture mask (CAM)
Figure 43:
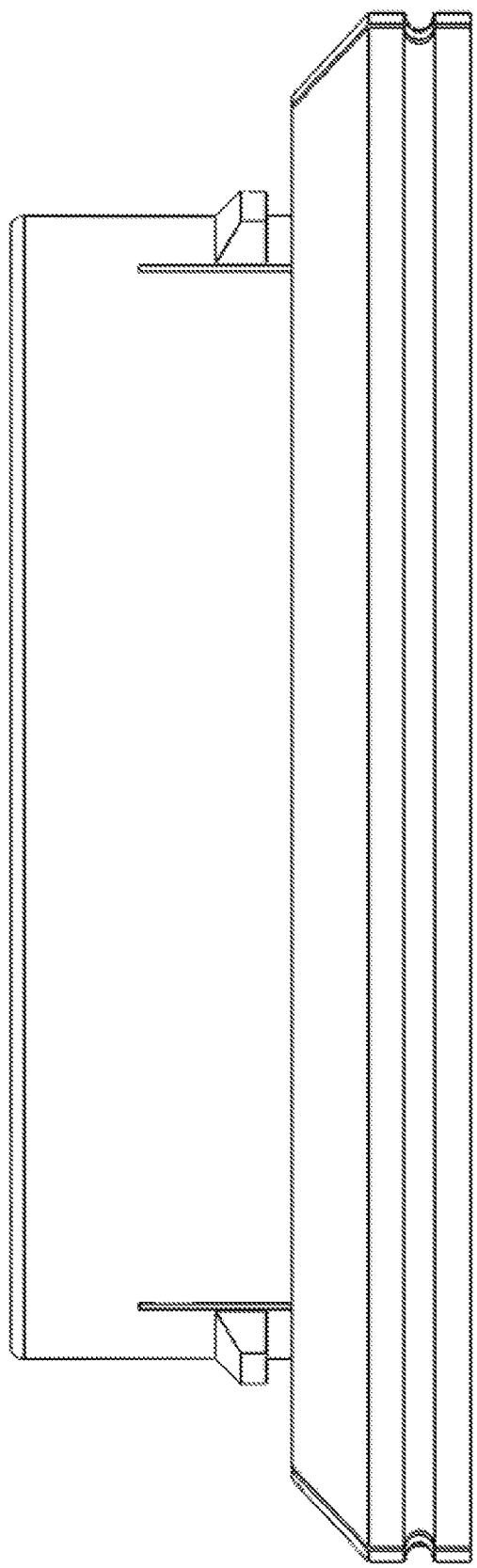
FIG. 43 illustrates a top view of a preferred exemplary modular plastic holder (MPH) used to retain a coded camera aperture mask (CAM)
Figure 44:
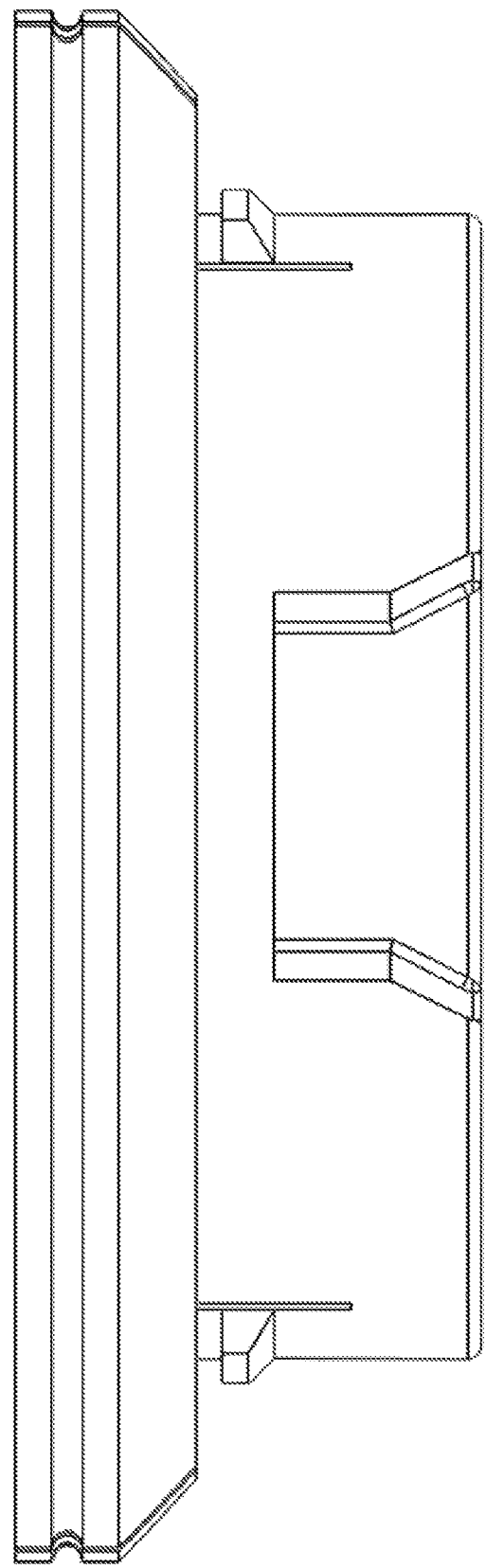
FIG. 44 illustrates a bottom view of a preferred exemplary modular plastic holder (MPH) used to retain a coded camera aperture mask (CAM)

The CAM may provide for capture (4202, 4702) of an aperture mask within the CAM as depicted in FIG. 42 (4200) and FIG. 47 (4700).

Figure 48:
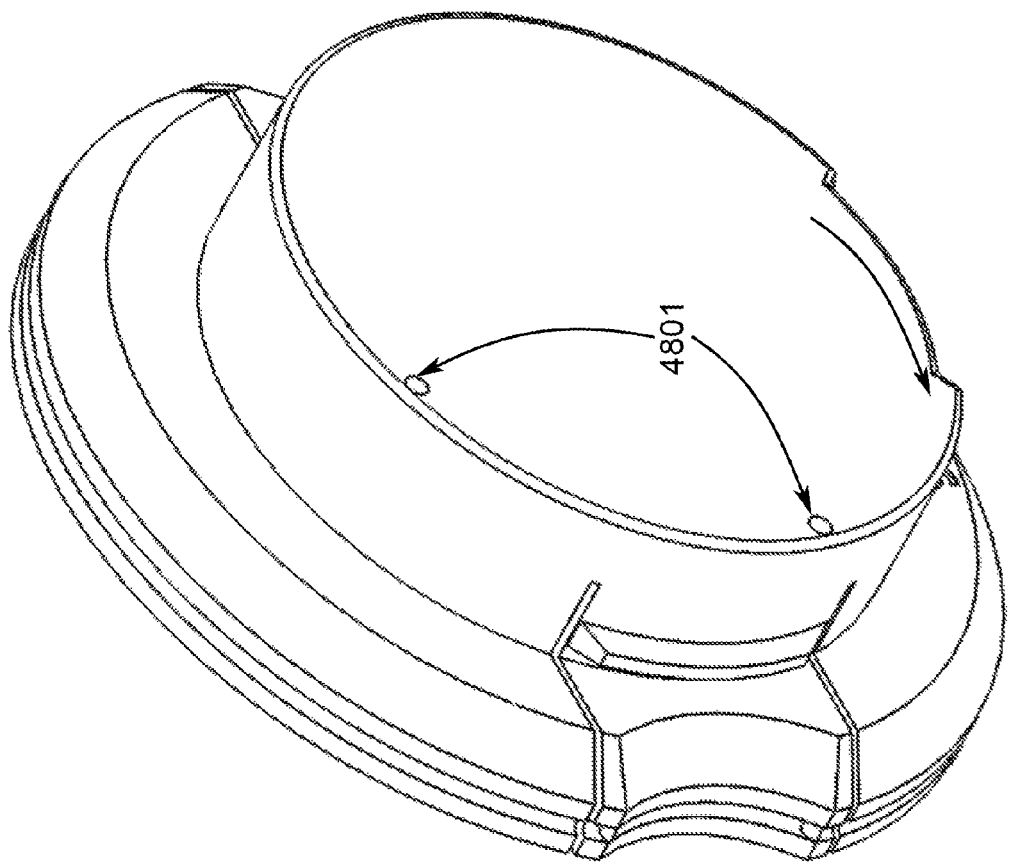
FIG. 48 illustrates a rear perspective view of a preferred exemplary modular plastic holder (MPH) used to retain a coded camera aperture mask (CAM)

The CAM may provide for placement of magnetic inserts (4201, 4801) to enable identification of the CAM by a Hall-effect sensor as depicted in FIG. 42 (4200) and FIG. 48 (4800).

Figure 49:
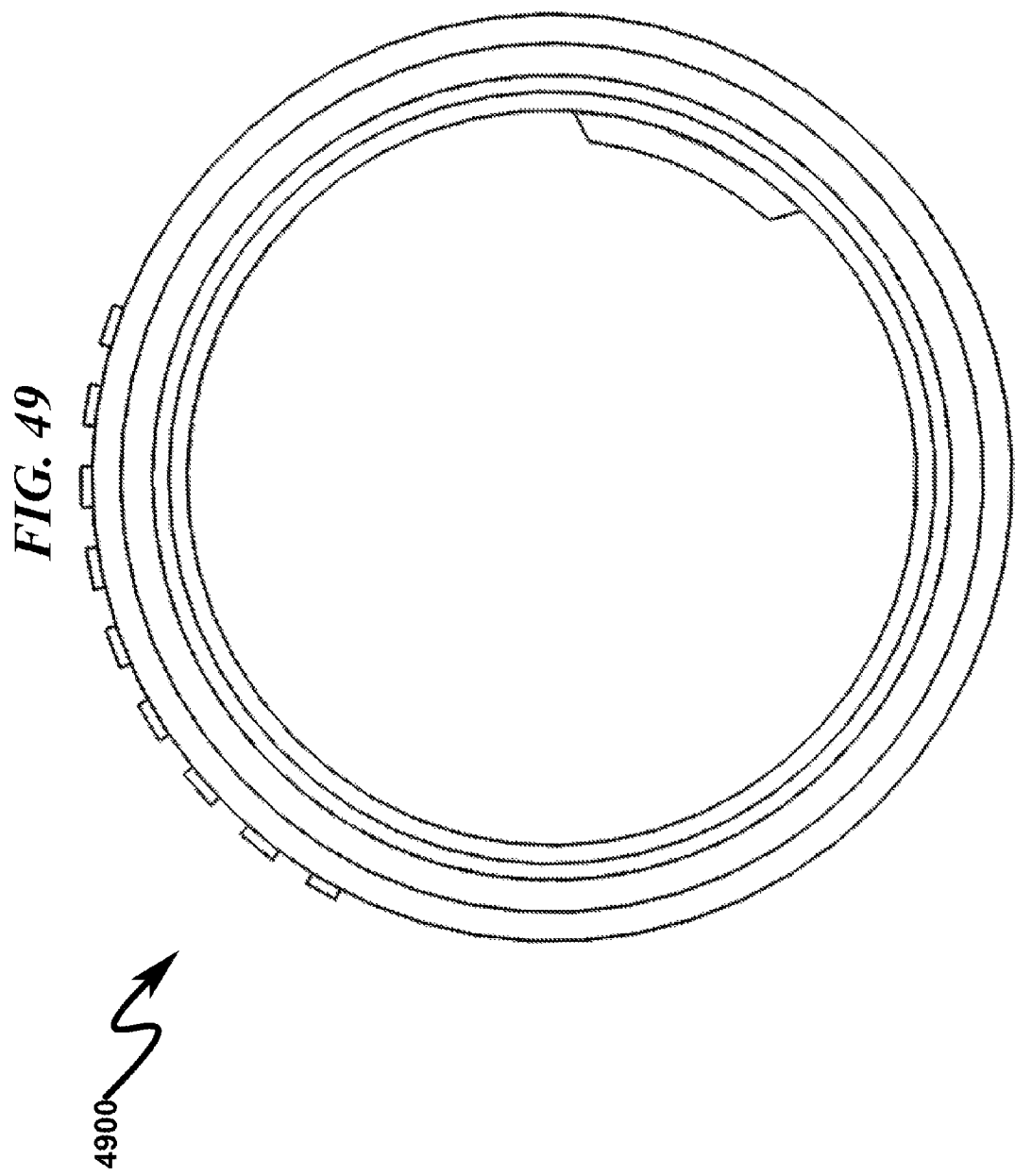
FIG. 49 illustrates a front view of an exemplary integrated ball bearing support for the CAM within the MPH.
Figure 50:
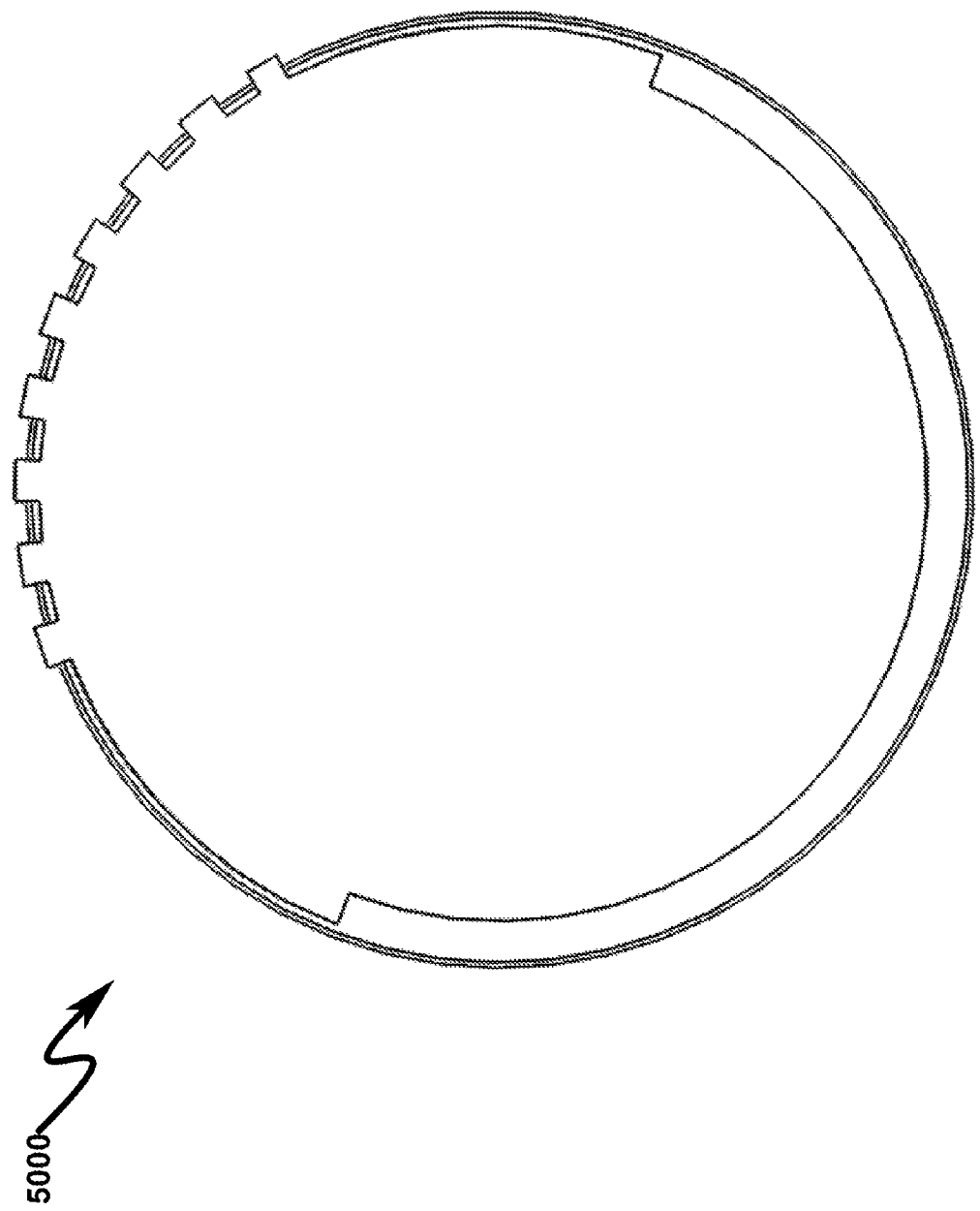
FIG. 50 illustrates a back view of an exemplary integrated ball bearing support for the CAM within the MPH.
Figure 51:
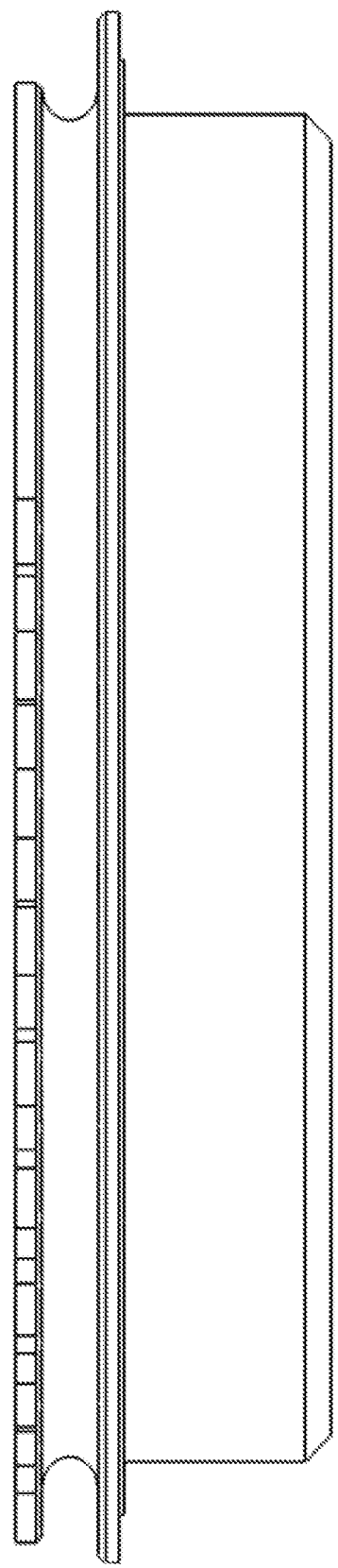
FIG. 51 illustrates a top view of an exemplary integrated ball bearing support for the CAM within the MPH.
Figure 52:
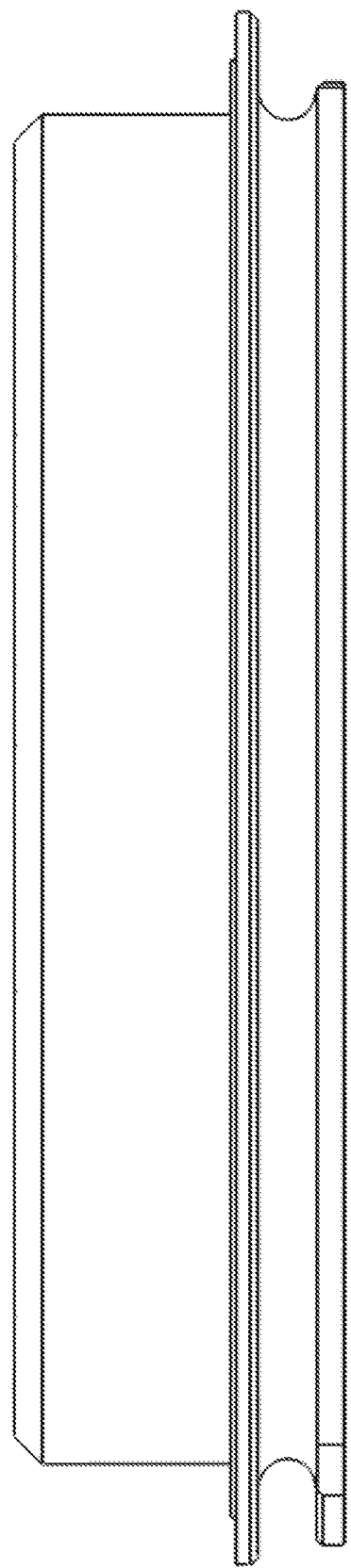
FIG. 52 illustrates a bottom view of an exemplary integrated ball bearing support for the CAM within the MPH.
Figure 54:
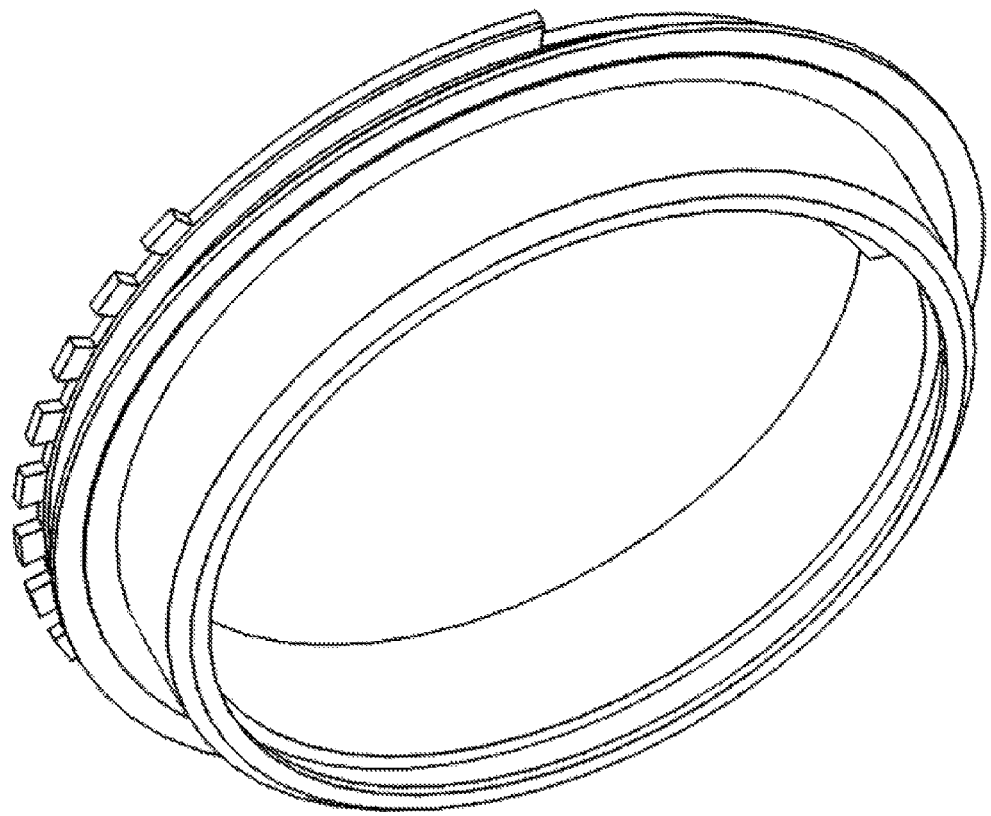
FIG. 54 illustrates a front right perspective view of an exemplary integrated ball bearing support for the CAM within the MPH.
Figure 55:
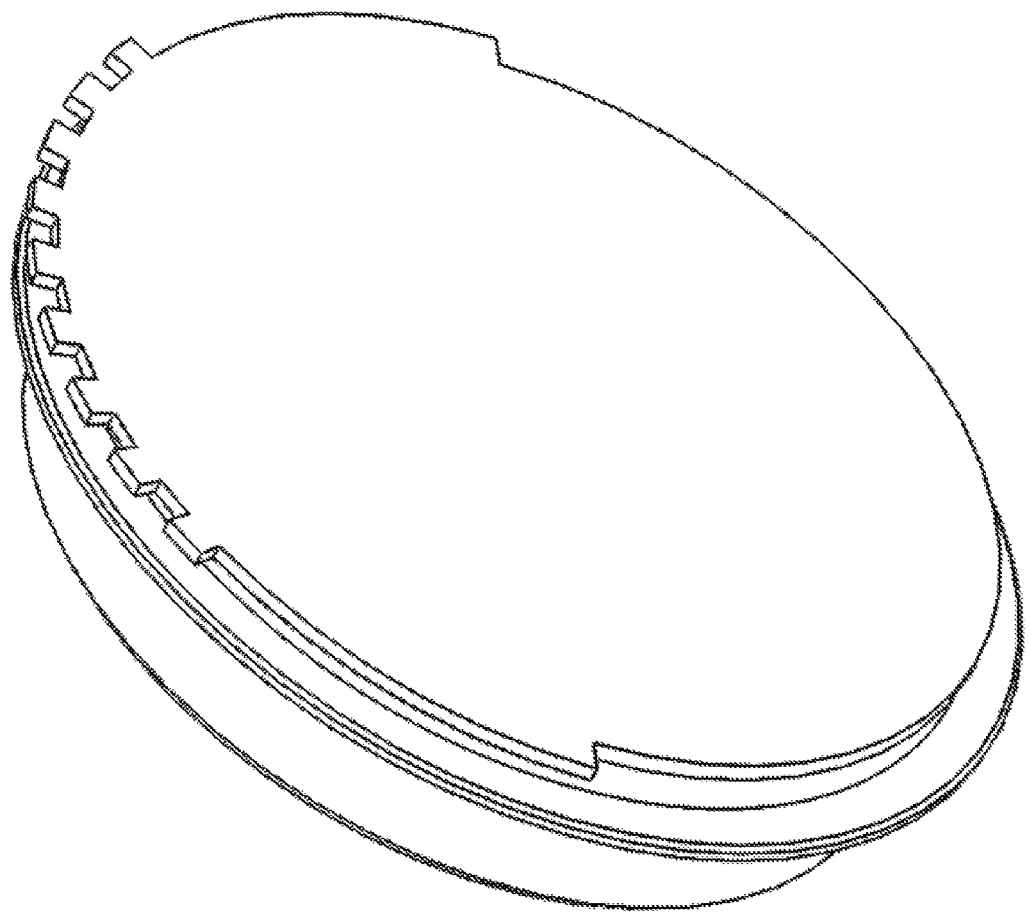
FIG. 55 illustrates a back right perspective view of an exemplary integrated ball bearing support for the CAM within the MPH.

The CAM may incorporate peripheral notches as depicted in FIG. 49 (4900)-FIG. 56 (5600) to enable the rotational angle of the CAM to be determined via an optical sensor.

One skilled in the art will recognize that the assembly provided in these figures is only illustrative of the present invention and not limitive of the invention scope.

Exemplary External Front Panel Wall (5700)-(6000)

The present invention may incorporate a wide variety of front panel wall structures to mechanically couple the RSD to the RCE. One exemplary front panel wall structure is depicted in the front and back views illustrated in FIG. 57 (5700)-FIG. 60 (6000). Here the depicted embodiment incorporates a photography (photo image) capture window (5701) and a RSD capture window (5702) in which the CAM is positioned for rotation. The internal surface of the RSD capture window (5703) optimally contains an integrated ball bearing support for the CAM within the MPH.

Typical Operational Characteristics (6100)-(6200)

As depicted in the drawings, an exemplary invention embodiment operates as follows. First, a camera aperture mask (CAM) (typically retained by a modular plastic holder (MPH) as depicted in FIG. 41 (4100)-FIG. 48 (4800) is installed in the camera aperture.

To insert the CAM within its MPH on the camera, the operator need only to press the clip lock mechanism of the MPH as depicted in FIG. 41 (4100) and follow the orientation of the corresponding mounting groove with that of the raised guide on the camera integrated ball bearing support as depicted in FIG. 57 (5700). Once the clip lock mechanism is released, the CAM within its MPH remains conveniently fixed within the camera integrated ball bearing support.

Figure 13:
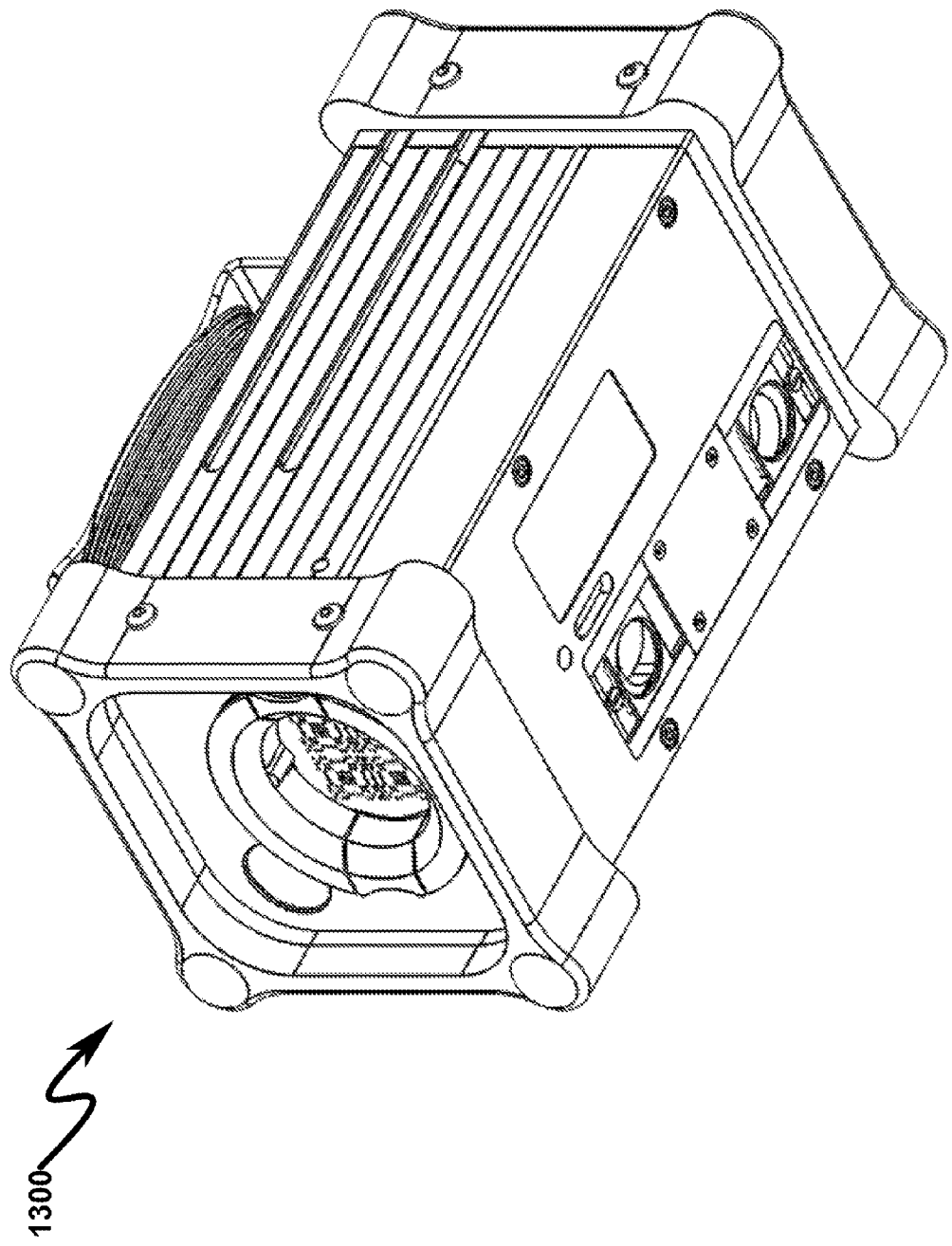
FIG. 13 illustrates a bottom right front perspective view of a preferred exemplary system embodiment.
Figure 14:
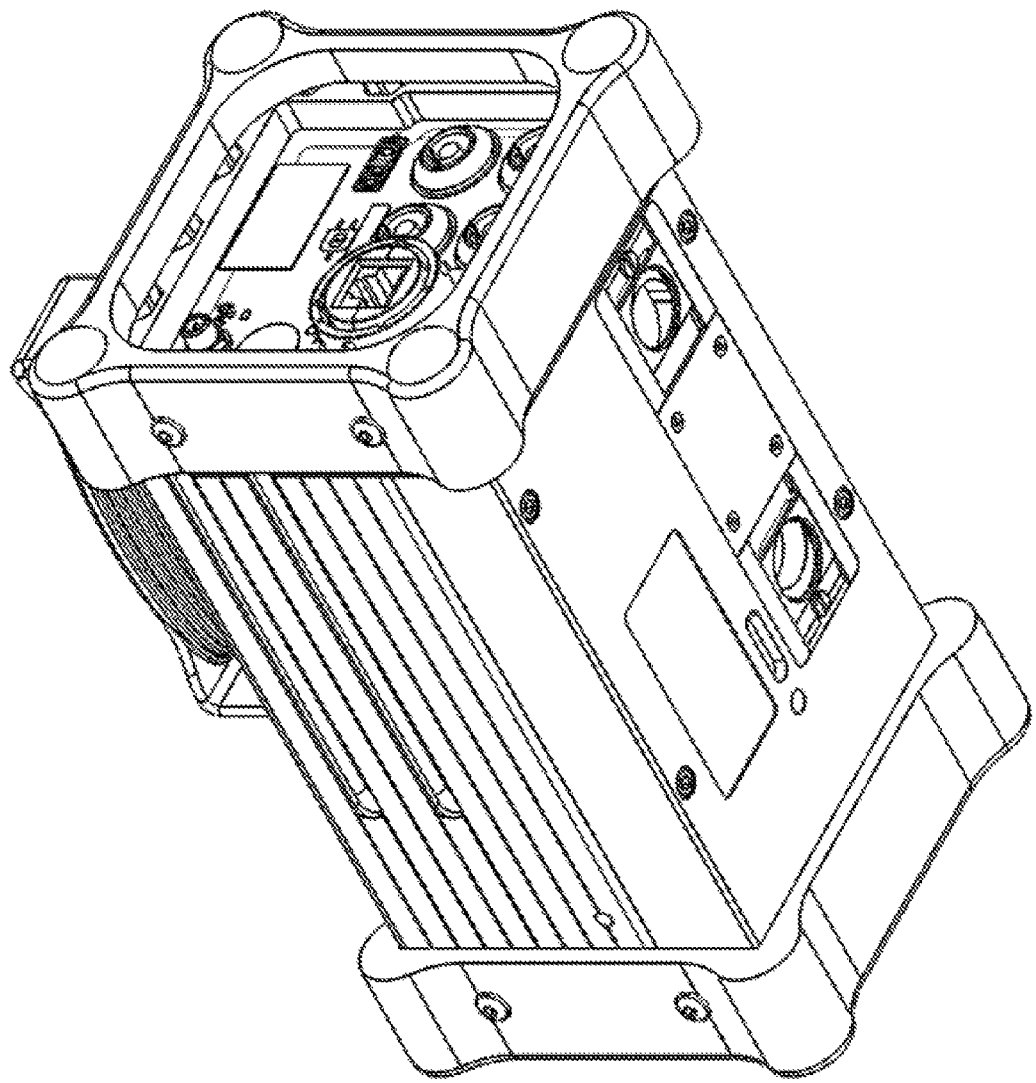
FIG. 14 illustrates a bottom right back perspective view of a preferred exemplary system embodiment.
Figure 15:
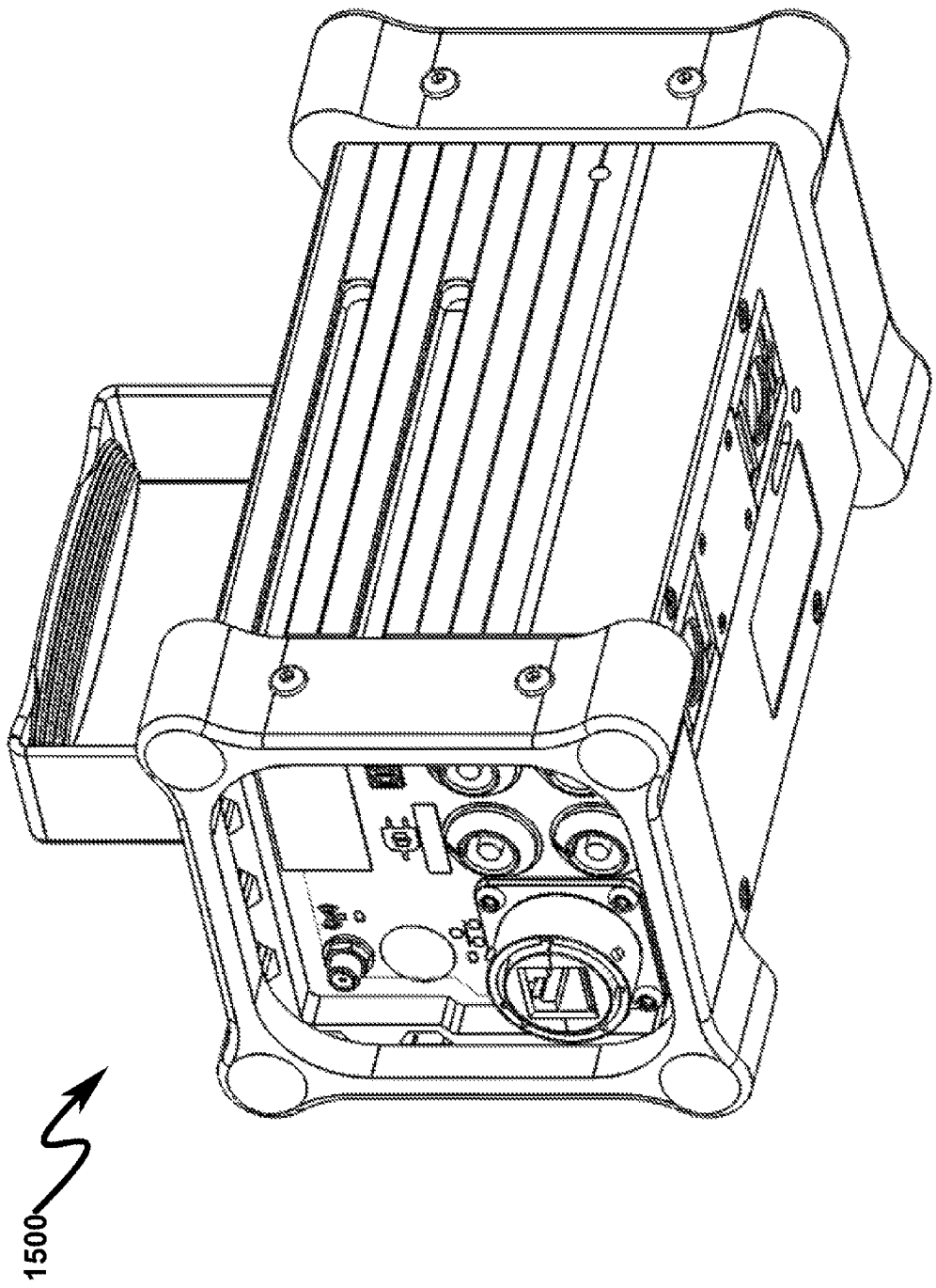
FIG. 15 illustrates a bottom left back perspective view of a preferred exemplary system embodiment.

The CAM is uniquely identified by placing a plurality (typically up to nine) of small magnet inserts (4002)/(4801) on the back side of the MPH as depicted in FIG. 40 (4000)/FIG. 48 (4800), and directly machine a corresponding number of uniform square edges (3902) on the associated ball bearing support as depicted in FIG. 39 (3900). It can be shown in FIG. 13 (1300) that the positions of both magnet inserts and square edges are continuously controlled with the Hall-effect reader and optical sensor respectively.

Figure 61:
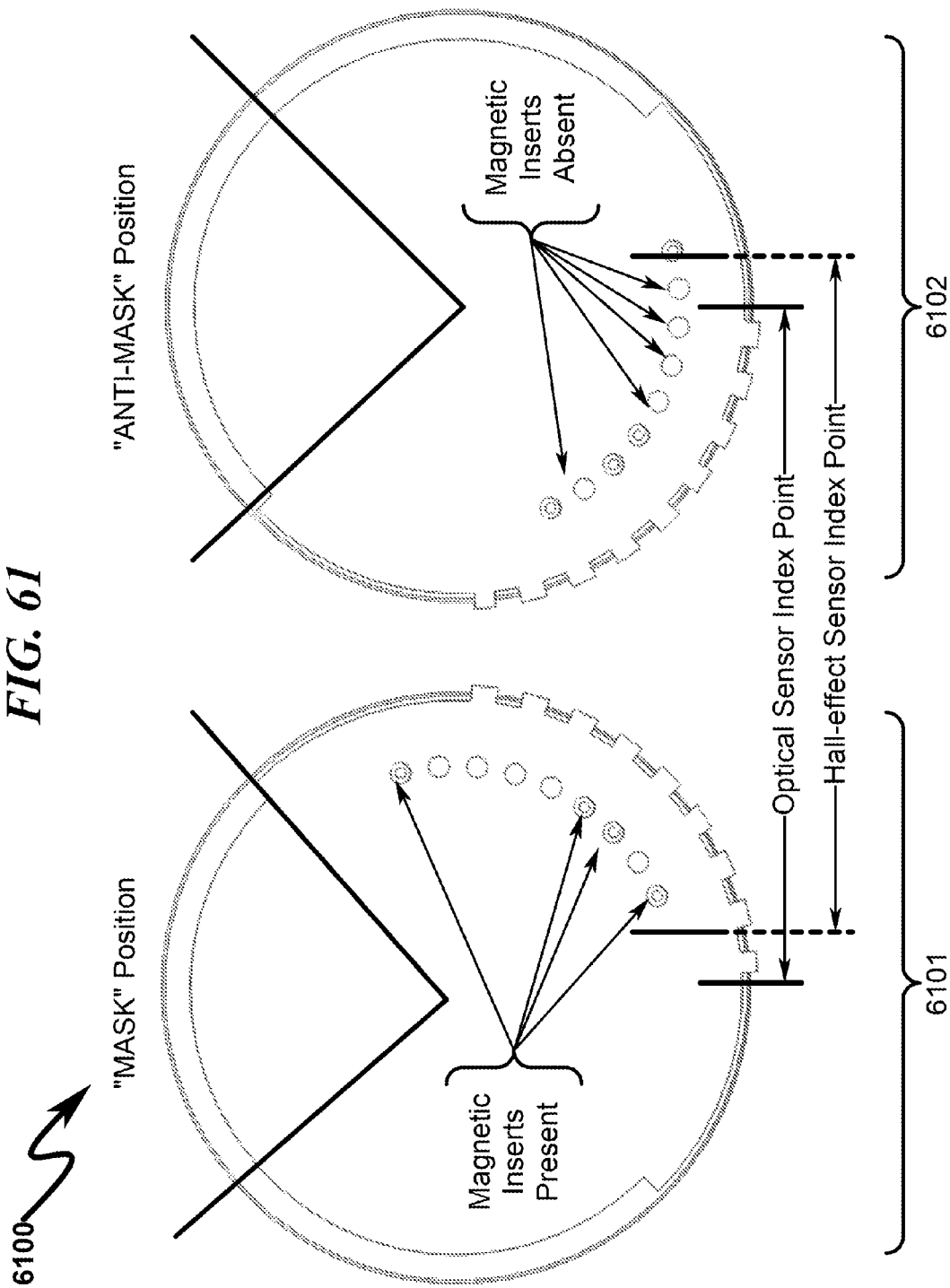
FIG. 61 illustrates an exemplary CAM configuration depicting "mask" and "anti-mask" positioning as well as CAM features supporting Hall-effect magnetic identification and optical sensor angular position sensing.
Figure 62:
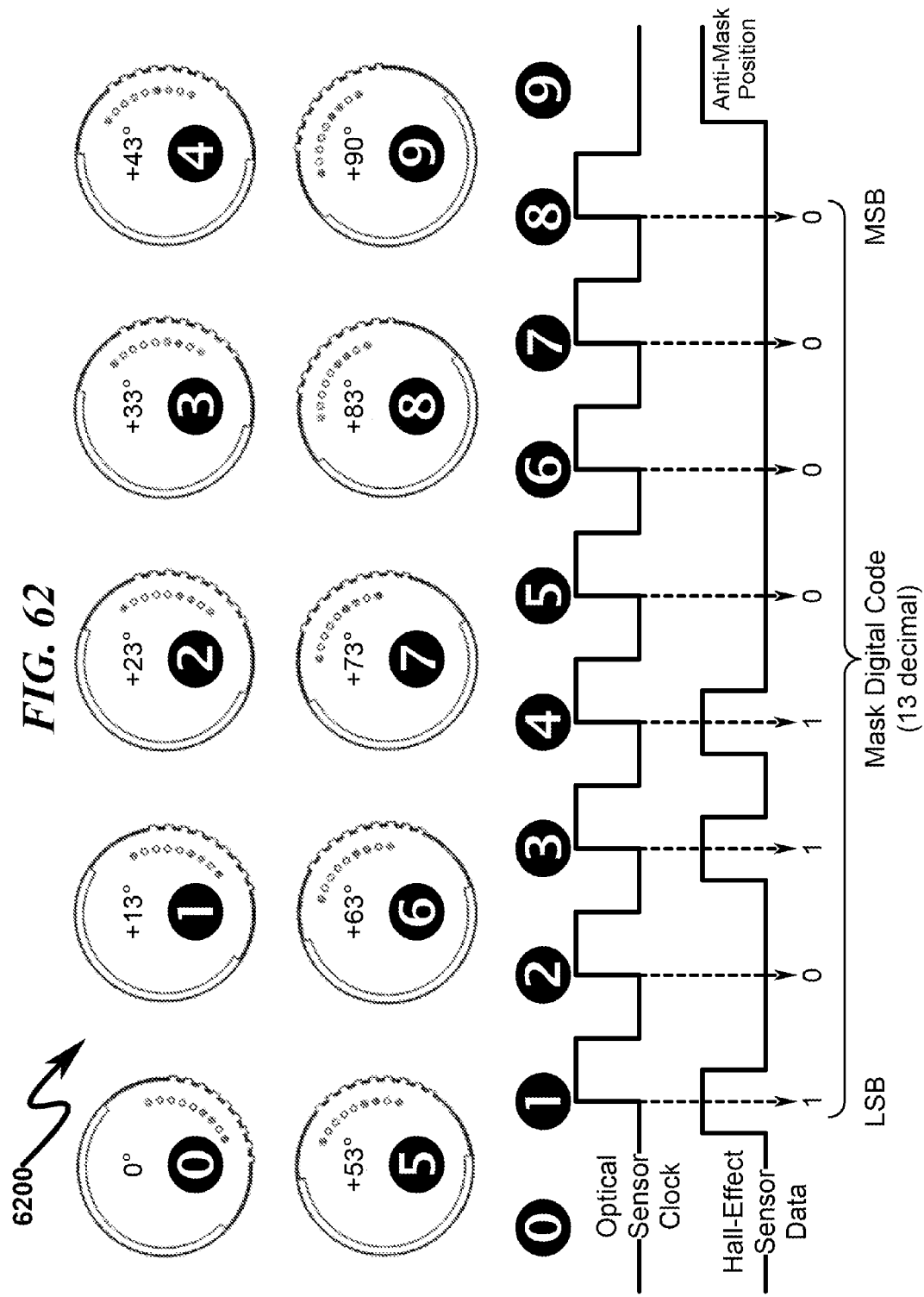
FIG. 62 illustrates an exemplary CAM configuration depicting a variety of angular positions and the associated optical sensor/Hall-effect sensor signal levels associated with these positions.

The camera operation mode for mask identification and rotation between "mask" (6101) and "anti-mask" (6102) positions is illustrated in FIG. 61 (6100) and FIG. 62 (6200). According to these diagrams, when the MPH retaining the CAM is rotating, the corresponding square edges provide a clock with enough time intervals to check the presence or absence of the small magnet inserts. A logic value '1' is assigned if a magnet is detected by the Hall-effect reader during these time intervals, but if there is no detection of magnets, the quoted logic value is '0'. The resulting sequence of these two logical values allows establishing the CAM digital code. This means that it is necessary to rotate the CAM in use from "mask" to "anti-mask" positions to fully read its digital code. In addition, all but the last magnetic insert positions are filled or not filled with magnets and used for mask identification. In contrast, the last magnetic insert (which is always filled with a magnet) may normally serve to indicate the "anti-mask" position.

The code for the aperture mask may be arbitrarily chosen, but in the example provided in FIG. 61 (6100), the code is depicted as being a byte (8 bits) in length and having a binary value corresponding to decimal 13, indicating a rank 13 aperture mask. One skilled in the art will recognize that both the aperture mask rank and thickness may be encoded in these magnetic indicators in a variety of functionally equivalent methods, and that the bit length of the code may vary based on a wide variety of application context factors.

As depicted in FIG. 61 (6100), the CAM utilizes a series of square edges around the periphery of the CAM to detect the CAM rotational position using an optical sensor. Other equivalent modes of rotational detection may be utilized without departing from the spirit and scope of the invention. For example, holes within the CAM may be used for rotation sensing purposes, additional hall sensors may be used for rotation sensing, or other forms of optical recognition may be used in this circumstance. One skilled in the art will recognize that the embodiment depicted herein is exemplary and that other forms of rotational sensing may be utilized in this application.

FIG. 62 (6200) depicts the CAM of FIG. 61 (6100) wherein the CAM is rotated from MASK to ANTI-MASK positions and along this rotational path (comprising identified CAM positions 0-9), each of the 8 bits of the CAM coded identification indicia (CII) are read along the rotational path by using the optical sensor to generate the digital clock necessary for sampling the Hall-effect sensor output. As can be seen in this example, the least significant bit (LSB) of the CII is read first and the most significant bit (MSB) of the CII is read last, after which the anti-mask CII is indicated. One skilled in the art will recognize that this bit ordering is exemplary and not limitive of the invention scope.

Exemplary Camera Aperture Masks (CAMs) (6300)

The present invention allows the use of various coded camera aperture masks (CAMs) that provide for a direct background noise subtraction by means of a procedure called mask/anti-mask. This procedure greatly contributes to the reduced size and weight of the present invention regarding existing methods of manual camera masking and thus reduces the need to shield the radiation sensor/detector. The CAMs may be generally designed by CEA LIST (see and included by reference: M. Gmar, M. Agelou, F. Carrel and V. Schoepff, "GAMPIX: A New Generation Of Gamma Camera", *Nucl. Instrum. Methods Phys. Res. A*, Vol. 652, pp. 638-640, 2011) based on the MURA (Modified Uniformly Redundant Array) patterns (see and included by reference: S. R. Gottesman, E. E. Fenimore, "New Family Of Binary Arrays For Coded Aperture Imaging," *Appl. Optics*, vol. 28, pp. 4344-4352, 1989).

Figure 63:
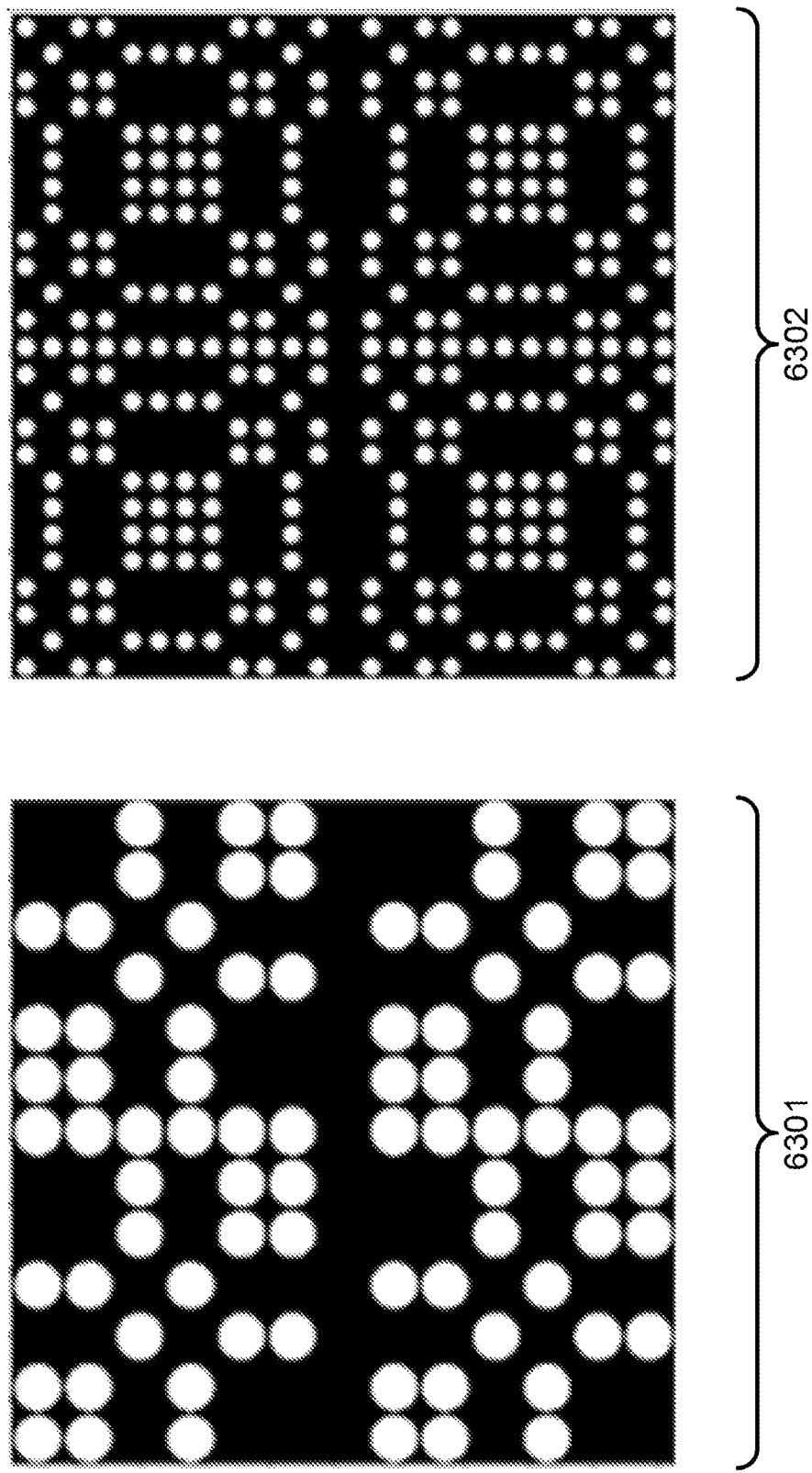
FIG. 63 illustrates an exemplary coded mask configurations with rank 7 and rank 13.

As depicted in FIG. 63 (6300), three coded aperture masks containing a binary array or pattern of open and closed circular cells and uniformly distributed under a particular sequence are considered as optimal in many preferred invention embodiments:

aperture mask with a rank 7 and 4 mm thickness, which is used by default as the reference coded aperture mask, especially in the case of unknown radioactive sources (as generally depicted in FIG. 63 (6300, 6301));

aperture mask with a rank 7 and 8 mm thickness for precise measurements of incident photon with energies above ~1 MeV (as generally depicted in FIG. 63 (6300, 6301)); and aperture mask with a rank 13 and 2 mm thickness, which is typically used for precise measurements of incident photon with energies below ~100 keV (as generally depicted in FIG. 63 (6300, 6302)).

In many anticipated applications, the embodiments of the present invention camera system may often be used in extreme conditions with high radiation levels. Therefore, considering the ALARA principle regarding personal dosimetry, the present invention represents a compact plug-and-play instrument capable of quickly changing the CAMs in order to prevent unnecessary radiation exposures to the camera operator.

Exemplary System Application Context (6400)

Figure 64:
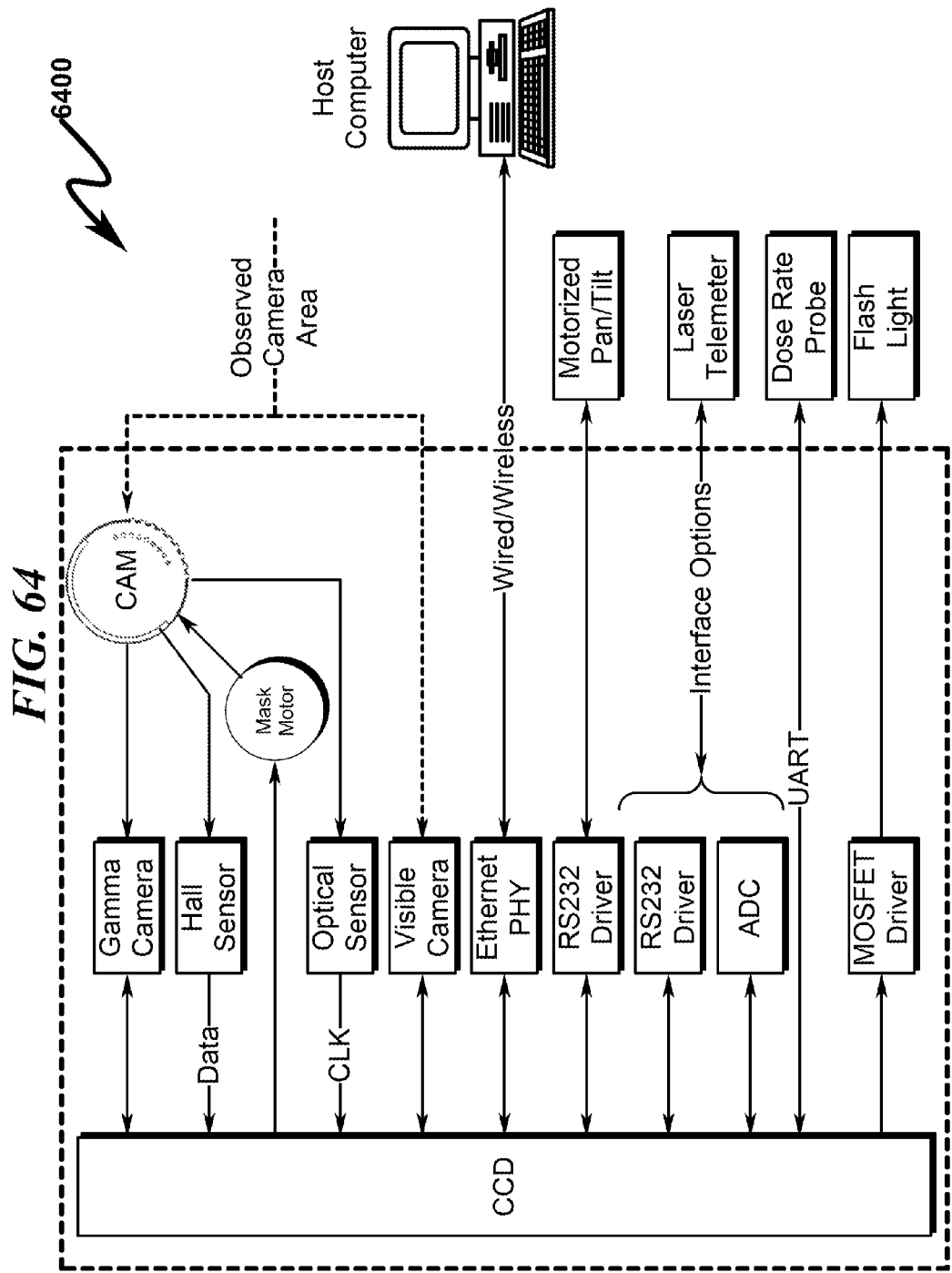
FIG. 64 illustrates a system application context depicting typical accessories connected to the camera system.

A typical system application context depicting accessories that may be connected to the radiation camera system is depicted in FIG. 64 (6400). Not illustrated in this diagram are keyboard and status indicators as well as power supply components and support for portable battery operation, as these components are well known to those in the electrical arts.

Preferred Embodiment Feature List

While the present invention may be deployed in a wide variety of configurations, a preferred exemplary invention feature list may include the following attributes as integrated within a deployable plug-and-play and remotely controlled radiation camera:

Remote Operation. Camera power may be supplied by a host computer system (HCS) with a connection cable of up to 100 meters in length. The system may also be operated in a wireless fashion to the HCS.

Pan/Tilt. The camera may incorporate remotely controlled horizontal (pan) and/or vertical (tilt) rotation mechanisms (by means of an external motorized tripod) that allow changing the orientation of the camera detection head from a host computer system (HCS). Another application of the pan and tilt rotation mechanism may be for performing panoramic measurements of the survey area.

Battery Operation. Battery operation of the system may be configured to allow communication with the HCS to occur through WIFI, thus enabling wireless operation of the camera system.

CAM Identification. The camera system allows automated identification and rotation for the CAMs. With the help of a mask rotation motor (MRM) (based on a small electric DC motor, a transmission timing belt, optical sensor and a Hall-effect reader as depicted in FIG. 39 (3900)-FIG. 40 (4000)), the type of mask placed into the camera is automatically identified and its associated position ("mask" or "anti-mask") is automatically detected as well.

Mask/Anti-Mask Orientation. The same MRM hardware allows for a remote rotation of the CAM between "mask" and "anti-mask" positions. The "anti-mask" position is simply achieved by rotating clockwise the mask orthogonally (90°) from its "mask" position.

Modular CAM. Each CAM is conveniently wrapped inside a modular plastic holder (MPH) with an associated identifying digital code implement using magnetic small inserts within the MPH. In such a manner, the CAM itself is fully protected against external contamination and it may be easily mounted on the camera system without any additional (neither standard nor specific) tooling. This is possible by simply using a clip lock mechanism as depicted in FIG. 41 (4100)-FIG. 47 (4700).

One skilled in the art will recognize that these specific preferred embodiment features are only exemplary of a wide variety of feature combinations possible when constructing the present invention in its many forms.

External Accessories

The present invention anticipates that some preferred embodiments may be configured to include external devices or accessories such as a WIFI antenna, flash-lamp, dose rate probe, battery charger, laser telemeter, etc.

Automatic Rotation Timing Adjustment

The present invention anticipates that some preferred embodiments may be configured to automatically estimate and adapt mask/anti-mask rotation periods according to measurement environment (measured radiation source strength and background radiation detected by the radiation sensor/detector) in order to minimize the number of mask rotations and optimize the time to obtain a meaningful image.

Automatic Shutter Frame Time Adjustment

The present invention anticipates that some preferred embodiments may be configured to automatically estimate and adapt the appropriate radiation sensor/detector shutter frame time according to measurement environment (radiation source strength and background radiation detected by the radiation sensor/detector) in order to display a meaningful image in the minimum amount of time.

Historical Frame-by-Frame Analysis

The present invention anticipates that some preferred embodiments may be configured to automatically perform historical data analysis on data retrieved from the radiation sensor/detector on a frame-by-frame basis. This allows a dynamic follow-up of the hotspot localization evolution as well as an historical saving of the whole gamma imaging analysis results. The user can go back or forward to a specific frame for comparison purposes or to eliminate possible radiation measurement artifacts.

Dose Rate Estimation by Distance

The present invention anticipates that some preferred embodiments may be configured to automatically estimate the radiation dose at the same location of the measured radioactive hotspot if the distance between this location and the measurement point is provided by the user. This radiation dose may be directly estimated by connecting an external laser telemeter to the camera.

Dose Rate Direct Measurement

The present invention anticipates that some preferred embodiments may be configured to directly measure radiation dosing information by connecting an external dose rate meter to the camera. This alternate embodiment configuration permits the corresponding ambient dose equivalent rate measured at the same camera location can be used for any of the following:

Radiation protection purposes. Accurate dose rate measurements provide for enhanced protection for personnel using the equipment.

Failure diagnosis. For example, if there is an effective background but the photon detector gives no counts.

Determining the eventual presence of other radioactive hotspots outside the camera field-of-view.

Field-of-View Illumination

The present invention anticipates that some preferred embodiments may be configured to integrate an external flash-lamp option to be able to automatically frame and take pictures of the camera field-of-view scene of interest, even in the worst illumination conditions.

Field-of-View Image Capture

The present invention anticipates that some preferred embodiments may be configured to integrate an external imaging camera or video monitor to be able to automatically frame and take pictures of the visual camera field-of-view scene of interest associated with the radiation sensor/detector.

Camera Sensors for Measurement Traceability

The present invention anticipates the use of a variety of sensors associated with the camera to provide for measurement traceability. These include but are not limited to the following types of sensors:

3-Axis Accelerometer

The incorporation of a 3-axis accelerometer in the system can provide information about possible camera movements during measurements.

3-Axis Magnetometer

The incorporation of a 3-axis magnetometer in the system can provide information about the hotspot direction relative to the terrestrial magnetic north.

Temperature

The incorporation of a 3-axis magnetometer in the system can be used to control the internal temperature of the camera.

Exemplary Command Structure

The HCS may communicate with the CCD using a variety of protocols and command structures, but a preferred exemplary command set is provided in the following table that illustrates command identifications, the functions performed by the CCD, the applicable devices for the command, and the data type value used in the command.

| Command ID | Function | Device | Value |
|---|---|---|---|
| 0x01 | Status | All | UINT16 |
| 0x02 | Capacity (min) | Battery | UINT16 |
| 0x03 | Capacity (%) | Battery | UINT16 |
| 0x04 | Initialization | Mask | UINT16 |
| 0x05 | Rotate CW | Mask | UINT16 |
| 0x06 | Rotate CCW | Mask | UINT16 |
| 0x07 | Mask Type | Mask | UINT16 |
| 0x08 | Position | Mask | UINT16 |
| 0x09 | Unit | Telemeter, Magnetometer, Temperature sensor | UINT32 |
| 0x0A | Distance | Telemeter | UINT32 |
| 0x0B | Angle | Telemeter | UINT32 |
| 0x0C | Inclination | Magnetometer | UINT32 |
| 0x0D | Field Strength | Magnetometer | UINT32 |
| 0x0E | X value | Accelerometer | UINT32 |
| 0x0F | Y value | Accelerometer | UINT32 |
| 0x10 | Z value | Accelerometer | UINT32 |
| 0x11 | Temperature | Temperature Sensor | UINT32 |
| 0x12 | Reboot | Camera System | UINT8 |
| 0x13 | Reset USB | Camera System | UINT8 |
| 0x14 | System Time | System | INT64 |

One skilled in the art will recognize that this command list is illustrative and not limitive of the invention scope.

Exemplary Advantages

The present invention operates to provide several advantages over the prior art. For example, existing radiation cameras (including gamma radiation cameras) are bulky and fully manual. This requires manual installation of aperture masks, manual rotation of the aperture mask, manual positioning of the camera, and manual collection of data. All of these manual operations increase the exposure time in the field-of-view of the radiation source and thus increase the risk of radiation dose for the operator. In addition, the prior art imposes several constraints while guaranteeing the radiation protection of the persons manipulating such instruments.

In contrast, the present invention provides an automatic remotely controlled radiation camera that improves the reduction in operator exposure time with the well-known ALARA principles relating to ionizing radiation exposure of the operators during measurements.

Preferred Embodiment System Summary

The present invention preferred exemplary system embodiment anticipates a wide variety of variations in the basic theme of construction, but can be generalized as a radiation camera system comprising:

(a) radiation sensor/detector (RSD);
(b) coded camera aperture mask (CAM);
(c) mask rotation motor (MRM);
(d) rotation detection sensor (RDS);
(e) radiation camera enclosure (RCE); and
(f) computing control device (CCD);
wherein
the RCE is configured to mechanically couple the RSD, the CAM, the MRM, the RDS, and the CCD;
the CAM is configured to cover the RSD and collimate radiation external to the RCE that is presented to the RSD;
the MRM is configured to rotate the CAM under direction of the CCD;

the CAM further comprises coded identification indicia (CII);

the CAM further comprises a plurality of rotation indicia that identify the current rotation angle of the CAM;

the RDS is configured to detect the rotation indicia;

the CCD is configured to capture detected radiation data from the RSD and transmit the detected radiation data via a digital communications medium (DCM) to a host computer system (HCS);

the CCD is configured to receive rotation commands from the HCS via the DCM and activate the MRM in response to the rotation commands; and the CCD is configured to capture rotation data from the RDS and transmit the rotation data via the DCM to the HCS.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a radiation camera method, the method operating in conjunction with a radiation camera system comprising:

(a) radiation sensor/detector (RSD);
(b) coded camera aperture mask (CAM);
(c) mask rotation motor (MRM);
(d) rotation detection sensor (RDS);
(e) radiation camera enclosure (RCE); and
(f) computing control device (CCD);

wherein the RCE is configured to mechanically couple the RSD, the CAM, the MRM, the RDS, and the CCD;

the CAM is configured to cover the RSD and collimate radiation external to the RCE that is presented to the RSD;

the MRM is configured to rotate the CAM under direction of the CCD;

the CAM further comprises coded identification indicia (CII);

the CAM further comprises a plurality of rotation indicia that identify the current rotation angle of the CAM;

the RDS is configured to detect the rotation indicia;

the CCD is configured to capture detected radiation data from the RSD and transmit the detected radiation data via a digital communications medium (DCM) to a host computer system (HCS);

the CCD is configured to receive rotation commands from the HCS via the DCM and activate the MRM in response to the rotation commands; and the CCD is configured to capture rotation data from the RDS and transmit the rotation data via the DCM to the HCS;

wherein the method comprises the steps of:

(1) rotating the CAM with the MRM under direction of the CCD;

(2) capturing detected radiation data from the RSD with the CCD and transmitting the detected radiation data via the DCM to the HCS;

(3) detecting the rotation indicia on the CAM with the RDS;

(4) receiving rotation commands with the CCD from the HCS via the DCM and activating the MRM in response to the rotation commands; and (5) capturing rotation data with the CCD from the RDS and transmitting the rotation data via the DCM to the HCS.

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the system further comprises a horizontal panning motor (HPM) controlled by the CCD and configured to enable horizontal panning (azimuthal rotation) of the RCE.

An embodiment wherein the system further comprises a vertical tilting motor (VTM) controlled by the CCD and configured to enable vertical tilting of the RCE.

An embodiment wherein the RDS comprises an optical sensor.

An embodiment wherein the DCM is selected from a group consisting of: hardwired digital communication link; and wireless digital communication link.

An embodiment wherein the CII comprises a series of magnets impregnated within a modular plastic holder (MPH) that retains the CAM.

An embodiment wherein the CCD is configured to read CAM identification data from a sensor operable to interpret the CII, and further configured to transmit the CAM identification information to the HCS.

An embodiment wherein the rotation commands comprise commands to rotationally position the CAM in orthogonal "mask" and "anti-mask" positions.

An embodiment wherein the RSD comprises a gamma radiation detector.

An embodiment wherein the CAM is selected from a group consisting of: aperture mask with rank 13 and 2 mm thickness; aperture mask with rank 7 and 4 mm thickness; and aperture mask with rank 7 and 8 mm thickness.

An embodiment wherein the system further comprises an optical camera configured to capture the field-of-view images associated with the RSD and communicate the field-of-view images to the CCD.

An embodiment wherein the system further comprises a stroboscopic flash controlled by the CCD that is configured to illuminate the field-of-view of the RSD.

An embodiment wherein the CAM is automatically rotated under control of the CCD based on a mask/anti-mask time period automatically calculated by the CCD based on source radiation and background radiation measurements retrieved by the CCD from the RSD.

An embodiment wherein the RSD further comprises a shutter frame time control that is automatically adjusted by the CCD based on source radiation and background radiation measurements retrieved by the CCD from the RSD.

An embodiment wherein the CCD maintains historical data of radiation images on a frame-by-frame basis as retrieved from the RSD.

An embodiment wherein the system further comprises a laser telemeter configured to measure the distance between the RSD and a radiation source and transmit the distance measurement to the CCD to permit dose rate estimate associated with exposure to the radiation source by the CCD.

An embodiment wherein the system further comprises a radiation dose rate meter configured to capture data on radiation dosing external to the RSD and communicate the data to the CCD.

An embodiment wherein the system further comprises a 3-axis accelerometer configured to capture data on movement of the RSD and transmit the data to the CCD.

An embodiment wherein the system further comprises a 3-axis magnetometer configured to capture data on the axial position of the RSD with respect to terrestrial magnetic North and transmit the data to the CCD.

An embodiment wherein the system further comprises a temperature sensor configured to capture data on the temperature of the RSD and transmit the data to the CCD.

An embodiment wherein the system further comprises a temperature sensor configured on the HCS to capture data on the ambient temperature and control the operation of said CCD based on the measured ambient temperature.

An embodiment wherein the system is powered by said HCS via power over Ethernet (POE) wired connection.

An embodiment wherein the dose rate measured by the camera and the one measured by the external device are compared to verify whether there are radioactive sources outside the field-of-view of the RSD.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., hard disks and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A radiation camera system and method incorporating a radiation sensor/detector (RSD) and automated operation of coded camera aperture masks (CAMs) is disclosed that may be advantageously applied to real-time tracking of radiological hot spots in crisis, maintenance, decontamination, and/or maintenance scenarios. The system/method integrates automated camera RSD positioning, CAM identification, and CAM rotation. The system incorporates computerized controls in conjunction with remotely controlled horizontal/vertical tilting motors to direct the RSD aperture position and view of the RSD. CAMs may be installed in the camera manually and are automatically identified by the system via the use of encoding magnets that are detected using a Hall-effect sensor. The CAMs may be rotated after installation in the camera by computer control to predefined positions such as "mask" and "anti-mask" to affect the desired degree of radiation screening to be applied to the RSD.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

Within the context of the following CLAIMS, the CLAIM PREAMBLE should be considered as limiting the scope of the claimed invention. Within the context of the following CLAIMS, "wherein" clauses should be considered as limiting the scope of the claimed invention.

What is claimed is:

1. A radiation camera system comprising:
(a) radiation sensor/detector (RSD);
(b) coded camera aperture mask (CAM);
(c) CAM ID reader (CIR);
(d) mask rotation motor (MRM);
(e) rotation detection sensor (RDS);
(f) radiation camera enclosure (RCE); and
(g) computing control device (CCD);
wherein:
said RCE is configured to mechanically couple said RSD, said CAM, said MRM, said RDS, and said CCD;
said CAM is configured to cover said RSD and collimate radiation external to said RCE that is presented to said RSD;
said MRM is configured to rotate said CAM under direction of said CCD;
said CAM further comprises coded identification indicia (CII);
said CII encodes a unique CAM identification and aperture mask type being applied to said RSD via said CAM;
said CIR is configured to read said CII and transmit said unique CAM identification said aperture mask type to said CCD;

said CAM further comprises a plurality of rotation indicia (PRI) that identify the current rotation angle of said CAM;

said plurality of rotation indicia (PRI) are configured to provide a clock with time intervals configured to detect the presence or absence of said CII when said CAM is rotated;

said RDS is configured to detect said plurality of rotation indicia (PRI);

said CCD is configured to capture detected radiation data from said RSD and transmit said detected radiation data via a digital communications medium (DCM) to a host computer system (HCS);

said CCD is configured to receive rotation commands from said HCS via said DCM and activate said MRM in response to said rotation commands; and said CCD is configured to capture rotation data from said RDS and transmit said rotation data via said DCM to said HCS.

2. The radiation camera system of claim 1 wherein said system further comprises a horizontal panning motor (HPM) controlled by said CCD and configured to enable horizontal panning of said RCE.

3. The radiation camera system of claim 1 wherein said system further comprises a vertical tilting motor (VTM) controlled by said CCD and configured to enable vertical tilting of said RCE.

4. The radiation camera system of claim 1 wherein said RDS comprises an optical sensor.

5. The radiation camera system of claim 3, wherein said DCM is selected from a group consisting of: hardwired digital communication link; and wireless digital communication link.

6. The radiation camera system of claim 1 wherein said CII comprises a series of magnets impregnated within a modular plastic holder (MPH) that retains said CAM.

7. The radiation camera system of claim 1 wherein said CCD is configured to read CAM identification data from a sensor operable to interpret said CII and further configured to transmit said CAM identification information to said HCS.

8. The radiation camera system of claim 1 wherein said rotation commands comprise commands to rotationally position said CAM in orthogonal "mask" and "anti-mask" positions.

9. The radiation camera system of claim 1 wherein said RSD comprises a gamma radiation detector.

10. The radiation camera system of claim 1 wherein said CAM is selected from a group consisting of: aperture mask with rank 13 and 2 mm thickness; aperture mask with rank 7 and 4 mm thickness; and aperture mask with rank 7 and 8 mm thickness.

11. The radiation camera system of claim 1 wherein said system further comprises an imaging camera configured to automatically frame and take unobstructed pictures of the visual camera field-of-view scene images associated with said RSD and communicate said field-of-view scene images to said CCD.

12. The radiation camera system of claim 1 wherein said system further comprises a stroboscopic flash controlled by said CCD that is configured to illuminate the field-of-view of said RSD.

13. The radiation camera system of claim 1 wherein said CAM is automatically rotated under control of said CCD based on a mask/anti-mask time period automatically calculated by said HCS based on source radiation and background radiation measurements retrieved by said CCD from said RSD.

14. The radiation camera system of claim 1 wherein said RSD further comprises a shutter frame time control that is automatically adjusted by said HCS based on source radiation and background radiation measurements retrieved by said CCD from said RSD.

15. The radiation camera system of claim 1 wherein said CCD maintains historical data of radiation images on a frame-by-frame basis as retrieved from said RSD.

16. The radiation camera system of claim 1 wherein said system further comprises a laser telemeter configured to measure the distance between said RSD and a radiation source and transmit said distance measurement to said CCD wherein said CCD is configured to determine a dose rate estimate associated with exposure to said radiation source using said transmitted distance measurement.

17. The radiation camera system of claim 1 wherein said system further comprises an external radiation dose rate meter configured to capture data on and directly measure radiation dosing external to said RSD and communicate said data to said CCD.

18. The radiation camera system of claim 1 wherein said system further comprises a 3-axis accelerometer configured to capture data on movement of said RSD and transmit said data to said CCD.

19. The radiation camera system of claim 1 wherein said system further comprises a 3-axis magnetometer configured to capture data on the axial position of said RSD with respect to terrestrial magnetic North and transmit said data to said CCD.

20. The radiation camera system of claim 1 wherein said system further comprises a temperature sensor configured to capture data on the temperature of said RSD and transmit said data to said CCD.

21. A radiation camera method, said method operating in conjunction with a radiation camera system comprising:
 (a) radiation sensor/detector (RSD);
 (b) coded camera aperture mask (CAM);
 (c) CAM ID reader (CIR);
 (d) mask rotation motor (MRM);
 (e) rotation detection sensor (RDS);
 (f) radiation camera enclosure (RCE); and
 (g) computing control device (CCD);
wherein:
 said RCE is configured to mechanically couple said RSD, said CAM, said MRM, said RDS, and said CCD; said CAM is configured to cover said RSD and collimate radiation external to said RCE that is presented to said RSD;
 said MRM is configured to rotate said CAM under direction of said CCD;
 said CAM further comprises coded identification indicia (CII);
 said CII encodes a unique CAM identification and aperture mask type being applied to said RSD via said CAM;
 said CIR is configured to read said CII and transmit said unique CAM identification said aperture mask type to said CCD;
 said CAM further comprises a plurality of rotation indicia (PRI) that identify the current rotation angle of said CAM;

said plurality of rotation indicia (PRI) are configured to provide a clock with time intervals configured to detect the presence or absence of said CII when said CAM is rotated;

said RDS is configured to detect said plurality of rotation indicia (PRI);

said CCD is configured to capture detected radiation data from said RSD and transmit said detected radiation data via a digital communications medium (DCM) to a host computer system (HCS);

said CCD is configured to receive rotation commands from said HCS via said DCM and activate said MRM in response to said rotation commands; and said CCD is configured to capture rotation data from said RDS and transmit said rotation data via said DCM to said HCS;

wherein said method comprises the steps of:
(1) rotating said CAM with said MRM under direction of said CCD;
(2) capturing detected radiation data from said RSD with said CCD and transmitting said detected radiation data via said DCM to said HCS;
(3) detecting said rotation indicia on said CAM with said RDS;
(4) receiving rotation commands with said CCD from said HCS via said DCM and activating said MRM in response to said rotation commands; and
(5) capturing rotation data with said CCD from said RDS and transmitting said rotation data via said DCM to said HCS.

22. The radiation camera method of claim 21 wherein said system further comprises a horizontal panning motor (HPM) controlled by said CCD and configured to enable horizontal panning of said RCE.

23. The radiation camera method of claim 21 wherein said system further comprises a vertical tilting motor (VTM) controlled by said CCD and configured to enable vertical tilting of said RCE.

24. The radiation camera method of claim 21 wherein said RDS comprises an optical sensor.

25. The radiation camera method of claim 21 wherein said DCM is selected from a group consisting of: hardwired digital communication link; and wireless digital communication link.

26. The radiation camera method of claim 21 wherein said CII comprises a series of magnets impregnated within a modular plastic holder (MPH) that retains said CAM.

27. The radiation camera method of claim 21 wherein said CCD is configured to read CAM identification data from a sensor operable to interpret said CII and further configured to transmit said CAM identification information to said HCS.

28. The radiation camera method of claim 21 wherein said rotation commands comprise commands to rotationally position said CAM in orthogonal "mask" and "anti-mask" positions.

29. The radiation camera method of claim 21 wherein said RSD comprises a gamma radiation detector.

30. The radiation camera method of claim 21 wherein said CAM is selected from a group consisting of: aperture mask with rank 13 and 2 mm thickness; aperture mask with rank 7 and 4 mm thickness; and aperture mask with rank 7 and 8 mm thickness.

31. The radiation camera method of claim 21 wherein said system further comprises an imaging camera configured to automatically frame and take unobstructed pictures of the visual camera field-of-view scene images associated with said RSD and communicate said field-of-view scene images to said CCD.

32. The radiation camera method of claim 21 wherein said system further comprises a stroboscopic flash controlled by said CCD that is configured to illuminate the field-of-view of said RSD.

33. The radiation camera method of claim 21 wherein said CAM is automatically rotated under control of said CCD based on a mask/anti-mask time period automatically calculated by said HCS based on source radiation and background radiation measurements retrieved by said CCD from said RSD.

34. The radiation camera method of claim 21 wherein said RSD further comprises a shutter frame time control that is automatically adjusted by said HCS based on source radiation and background radiation measurements retrieved by said CCD from said RSD.

35. The radiation camera method of claim 21 wherein said CCD maintains historical data of radiation images on a frame-by-frame basis as retrieved from said RSD.

36. The radiation camera method of claim 21 wherein said system further comprises a laser telemeter configured to measure the distance between said RSD and a radiation source and transmit said distance measurement to said CCD wherein said CCD is configured to determine a dose rate estimate associated with exposure to said radiation source using said transmitted distance measurement.

37. The radiation camera method of claim 21 wherein said system further comprises an external radiation dose rate meter configured to capture data on and directly measure radiation dosing external to said RSD and communicate said data to said CCD.

38. The radiation camera method of claim 21 wherein said system further comprises a 3-axis accelerometer configured to capture data on movement of said RSD and transmit said data to said CCD.

39. The radiation camera method of claim 21 wherein said system further comprises a 3-axis magnetometer configured to capture data on the axial position of said RSD with respect to terrestrial magnetic North and transmit said data to said CCD.

40. The radiation camera method of claim 21 wherein said system further comprises a temperature sensor configured to capture data on the temperature of said RSD and transmit said data to said CCD.

41. A tangible non-transitory computer usable medium having computer-readable program code means embodied thereon comprising a radiation camera method, said method operating in conjunction with a radiation camera system comprising:
(a) radiation sensor/detector (RSD);
(b) coded camera aperture mask (CAM);
(c) CAM ID reader (CIR);
(d) mask rotation motor (MRM);
(e) rotation detection sensor (RDS);
(f) radiation camera enclosure (RCE); and
(g) computing control device (CCD);
wherein:
said RCE is configured to mechanically couple said RSD, said CAM, said MRM, said RDS, and said CCD;
said CAM is configured to cover said RSD and collimate radiation external to said RCE that is presented to said RSD;
said MRM is configured to rotate said CAM under direction of said CCD;

said CAM further comprises coded identification indicia (CII);

said CII encodes a unique CAM identification and aperture mask type being applied to said RSD via said CAM;

said CIR is configured to read said CII and transmit said unique CAM identification said aperture mask type to said CCD;

said CAM further comprises a plurality of rotation indicia (PRI) that identify the current rotation angle of said CAM;

said plurality of rotation indicia (PRI) are configured to provide a clock with time intervals configured to detect the presence or absence of said CII when said CAM is rotated;

said RDS is configured to detect said plurality of rotation indicia (PRI);

said CCD is configured to capture detected radiation data from said RSD and transmit said detected radiation data via a digital communications medium (DCM) to a host computer system (HCS);

said CCD is configured to receive rotation commands from said HCS via said DCM and activate said MRM in response to said rotation commands; and said CCD is configured to capture rotation data from said RDS and transmit said rotation data via said DCM to said HCS;

wherein said method comprises the steps of:
(1) rotating said CAM with said MRM under direction of said CCD;
(2) capturing detected radiation data from said RSD with said CCD and transmitting said detected radiation data via said DCM to said HCS;
(3) detecting said rotation indicia on said CAM with said RDS;
(4) receiving rotation commands with said CCD from said HCS via said DCM and activating said MRM in response to said rotation commands; and
(5) capturing rotation data with said CCD from said RDS and transmitting said rotation data via said DCM to said HCS.

42. The computer usable medium of claim 41 wherein said system further comprises a horizontal panning motor (HPM) controlled by said CCD and configured to enable horizontal panning of said RCE.

43. The computer usable medium of claim 41 wherein said system further comprises a vertical tilting motor (VTM) controlled by said CCD and configured to enable vertical tilting of said RCE.

44. The computer usable medium of claim 41 wherein said RDS comprises an optical sensor.

45. The computer usable medium of claim 41 wherein said DCM is selected from a group consisting of: hardwired digital communication link; and wireless digital communication link.

46. The computer usable medium of claim 41 wherein said CII comprises a series of magnets impregnated within a modular plastic holder (MPH) that retains said CAM.

47. The computer usable medium of claim 41 wherein said CCD is configured to read CAM identification data from a sensor operable to interpret said CII and further configured to transmit said CAM identification information to said HCS.

48. The computer usable medium of claim 41 wherein said rotation commands comprise commands to rotationally position said CAM in orthogonal "mask" and "anti-mask" positions.

49. The computer usable medium of claim 41 wherein said RSD comprises a gamma radiation detector.

50. The computer usable medium of claim 41 wherein said CAM is selected from a group consisting of: aperture mask with rank 13 and 2 mm thickness; aperture mask with rank 7 and 4 mm thickness; and aperture mask with rank 7 and 8 mm thickness.

51. The computer usable medium of claim 41, wherein said system further comprises an imaging camera configured to automatically frame and take unobstructed pictures of the visual camera field-of-view scene images associated with said RSD and communicate said field-of-view scene images to said CCD.

52. The computer usable medium of claim 41 wherein said system further comprises a stroboscopic flash controlled by said CCD that is configured to illuminate the field-of-view of said RSD.

53. The computer usable medium of claim 41 wherein said CAM is automatically rotated under control of said CCD based on a mask/anti-mask time period automatically calculated by said HCS based on source radiation and background radiation measurements retrieved by said CCD from said RSD.

54. The computer usable medium of claim 41 wherein said RSD further comprises a shutter frame time control that is automatically adjusted by said HCS based on source radiation and background radiation measurements retrieved by said CCD from said RSD.

55. The computer usable medium of claim 41 wherein said CCD maintains historical data of radiation images on a frame-by-frame basis as retrieved from said RSD.

56. The computer usable medium of claim 41 wherein said system further comprises a laser telemeter configured to measure the distance between said RSD and a radiation source and transmit said distance measurement to said CCD wherein said CCD is configured to determine a dose rate estimate associated with exposure to said radiation source using said transmitted distance measurement.

57. The computer usable medium of claim 41 wherein said system further comprises an external radiation dose rate meter configured to capture data on and directly measure radiation dosing external to said RSD and communicate said data to said CCD.

58. The computer usable medium of claim 41 wherein said system further comprises a 3-axis accelerometer configured to capture data on movement of said RSD and transmit said data to said CCD.

59. The computer usable medium of claim 41 wherein said system further comprises a 3-axis magnetometer configured to capture data on the axial position of said RSD with respect to terrestrial magnetic North and transmit said data to said CCD.

60. The computer usable medium of claim 41 wherein said system further comprises a temperature sensor configured to capture data on the temperature of said RSD and transmit said data to said CCD.

* * * * *